US011507315B2

(12) United States Patent
Sudo

(10) Patent No.: US 11,507,315 B2
(45) Date of Patent: Nov. 22, 2022

(54) MAGNETIC DISK DEVICE AND METHOD OF REORDERING PROCESS

(71) Applicants: Kabushiki Kaisha Toshiba, Tokyo (JP); Toshiba Electronic Devices & Storage Corporation, Tokyo (JP)

(72) Inventor: Daisuke Sudo, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 153 days.

(21) Appl. No.: 17/004,281

(22) Filed: Aug. 27, 2020

(65) Prior Publication Data

US 2021/0141566 A1 May 13, 2021

(30) Foreign Application Priority Data

Nov. 12, 2019 (JP) .............................. JP2019-204808

(51) Int. Cl.
*G06F 3/06* (2006.01)

(52) U.S. Cl.
CPC .......... *G06F 3/0659* (2013.01); *G06F 3/0611* (2013.01); *G06F 3/0614* (2013.01); *G06F 3/0653* (2013.01); *G06F 3/0676* (2013.01)

(58) Field of Classification Search
CPC .............................. G06F 3/0676; G06F 3/0659
See application file for complete search history.

(56) References Cited

U.S. PATENT DOCUMENTS

| 6,690,549 | B1* | 2/2004 | Aikawa | G11B 5/4813 |
| 6,789,132 | B2 | 9/2004 | Hoskins | |
| 7,061,714 | B1* | 6/2006 | Yu | G11B 5/5547 |
| | | | | 318/632 |
| 8,824,262 | B1* | 9/2014 | Liu | G11B 5/59627 |
| | | | | 360/77.04 |
| 9,830,939 | B1 | 11/2017 | Hamilton | |
| 10,042,785 | B1 | 8/2018 | Buch et al. | |
| 10,522,185 | B1* | 12/2019 | Hall | G11B 21/025 |
| 2012/0260047 | A1* | 10/2012 | Haines | G06F 13/16 |
| | | | | 711/E12.001 |

* cited by examiner

*Primary Examiner* — Tracy A Warren
(74) *Attorney, Agent, or Firm* — Allen & Overy LLP

(57) ABSTRACT

According to one embodiment, a magnetic disk device includes a first disk, a second disk, a first head, a second head, a first actuator including the first head, a second actuator including the second head, a first arithmetic unit executing a first reordering process of a command stored in a first queue corresponding to the first actuator, and a second arithmetic unit executing a second reordering process of a command stored in a second queue corresponding to the second actuator, the first arithmetic unit executing the second reordering process, the second arithmetic unit executing the first reordering process.

16 Claims, 15 Drawing Sheets

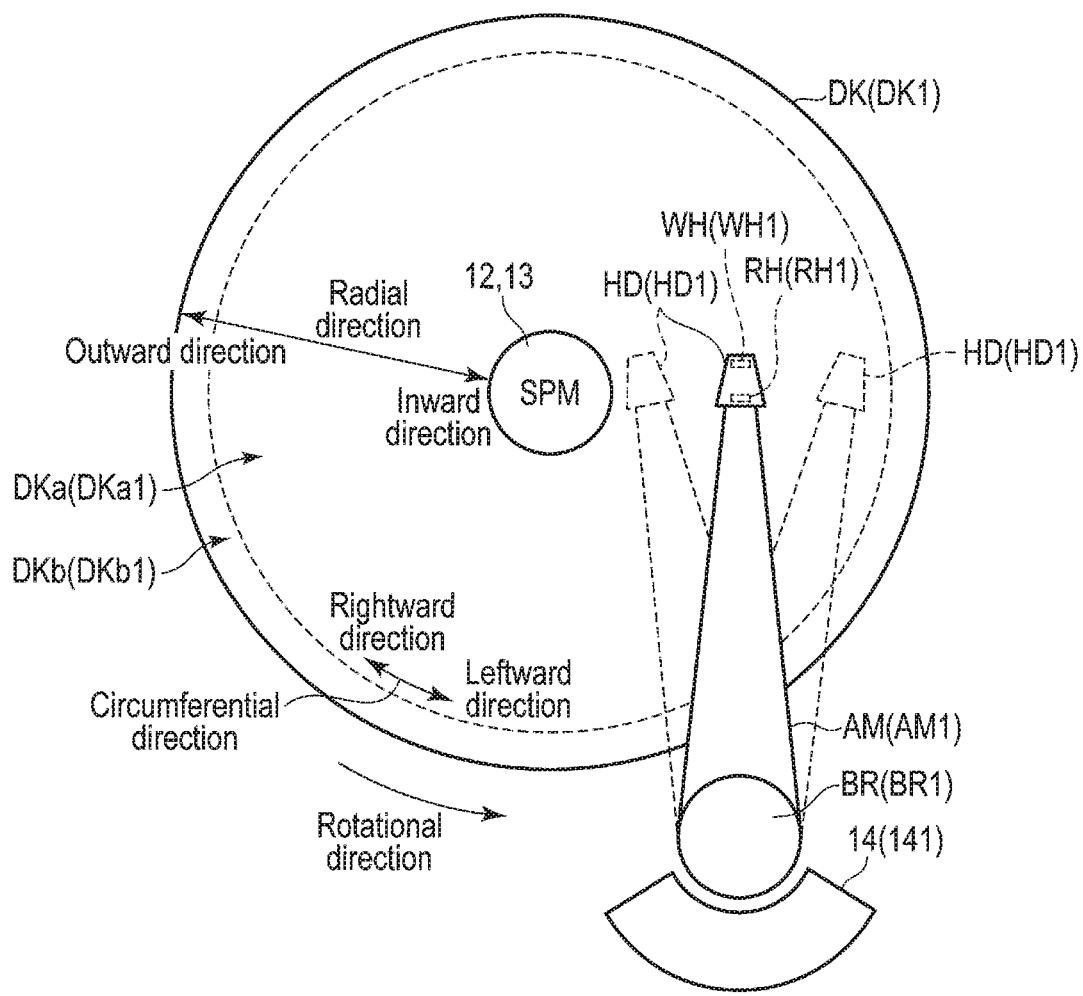
F I G. 2
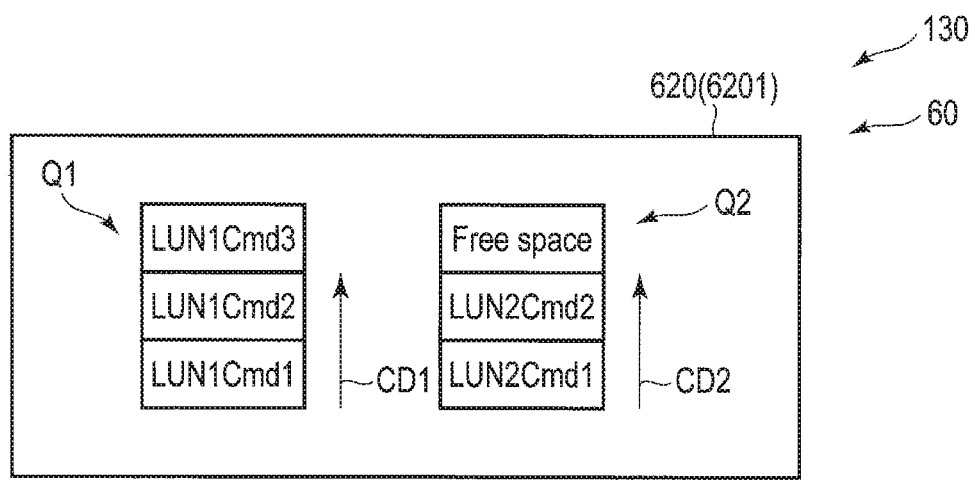
F I G. 3

TB1

| Number | Level of queue command number of LUN1 | Level of queue command number of LUN2 | State of bypass arithmetic process | Transferring direction of reordering information |
|---|---|---|---|---|
| 1 | 0:Low | 0:Low | 0:Disable | 0(Invalid) |
| 2 | 0:Low | 1:Middle | 0:Disable | 0(Invalid) |
| 3 | 0:Low | 2:High | 1:Enable | −1(R2→B1) |
| 4 | 1:Middle | 0:Low | 0:Disable | 0(Invalid) |
| 5 | 1:Middle | 1:Middle | 0:Disable | 0(Invalid) |
| 6 | 1:Middle | 2:High | 0:Disable | 0(Invalid) |
| 7 | 2:High | 0:Low | 1:Enable | 1(R1→B2) |
| 8 | 2:High | 1:Middle | 0:Disable | 0(Invalid) |
| 9 | 2:High | 2:High | 0:Disable | 0(Invalid) |

FIG. 6

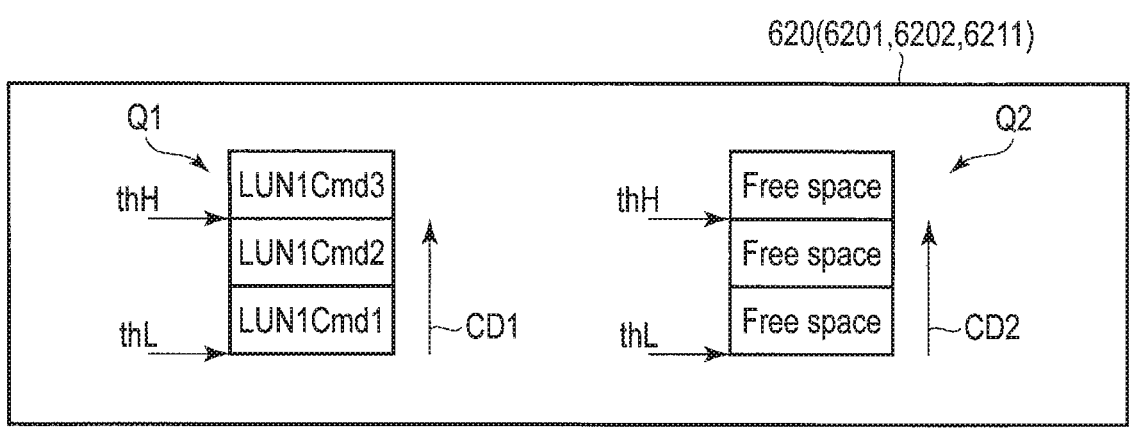

FIG. 7

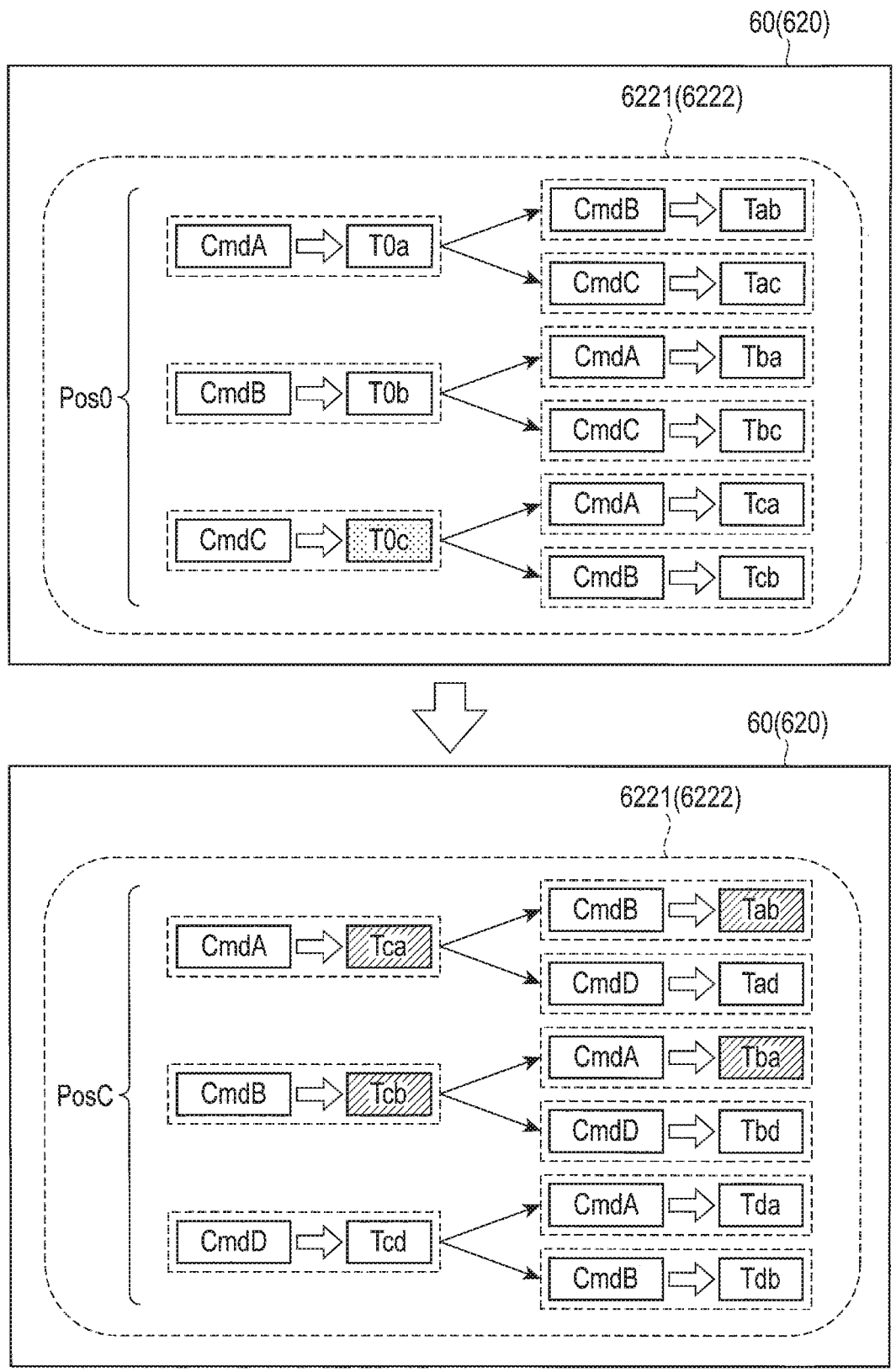
F I G. 14

MAGNETIC DISK DEVICE AND METHOD OF REORDERING PROCESS

CROSS-REFERENCE TO RELATED APPLICATIONS

This application is based upon and claims the benefit of priority from Japanese Patent Application No. 2019-204808, filed Nov. 12, 2019, the entire contents of which are incorporated herein by reference.

FIELD

Embodiments described herein relate generally to a magnetic disk device and a method of reordering process.

BACKGROUND

A magnetic disk device stores a plurality of commands transferred from a host and the like in a queue and executes a reordering process of changing the order to process the plurality of commands stored in the queue. In recent years, a split actuator magnetic disk device comprising a plurality of actuators has been proposed. The split actuator magnetic disk device controls the plurality of actuators independently. The split actuator magnetic disk device stores a plurality of commands that correspond to each actuator, in each queue corresponding to each actuator, and reorders the plurality of commands stored in each queue corresponding to each actuator.

BRIEF DESCRIPTION OF THE DRAWINGS

FIG. 2 is plan showing an example of the arrangement of a head to the disk.
FIG. 3 is a schematic diagram showing an example of a queue.
FIG. 6 is a schematic diagram showing an example of a determination table.
FIG. 7 is a schematic diagram showing an example of a method of determining a state of a bypass arithmetic process according to the first embodiment.
FIG. 14 is a schematic diagram showing an example of the reordering arithmetic process.

DETAILED DESCRIPTION

In general, according to one embodiment, a magnetic disk device, comprises: a first disk; a second disk; a first head writing data to the first disk and reading data from the first disk; a second head writing data to the second disk and reading data from the second disk; a first actuator comprising the first head; a second actuator comprising the second head; a first arithmetic unit executing a first reordering process of a command stored in a first queue corresponding to the first actuator; and a second arithmetic unit executing a second reordering process of a command stored in a second queue corresponding to the second actuator, the first arithmetic unit executing the second reordering process, the second arithmetic unit executing the first reordering process.

Embodiments will be described hereinafter with reference to the accompanying drawings. The drawings are merely examples and do not limit the scope of the invention.

First Embodiment

Figure 1:
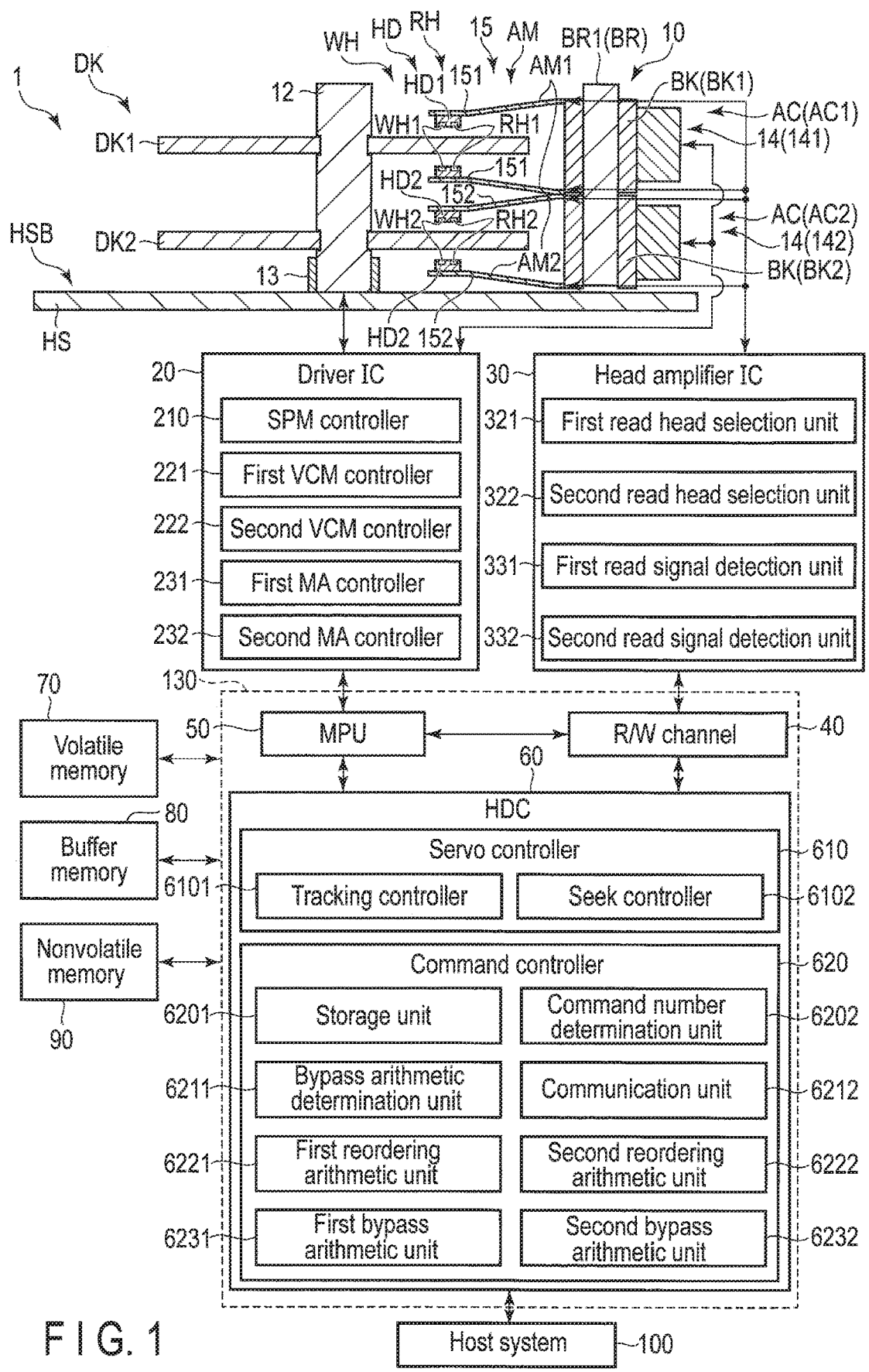
FIG. 1 is a schematic diagram showing an example of a configuration of a magnetic disk device according to a first embodiment.

FIG. 1 is a schematic diagram showing an example of a configuration of a magnetic disk device 1 according to a first embodiment.

The magnetic disk device 1 comprises a housing HS, a head disk assembly (HDA) 10, a driver IC 20, a head amplifier integrated circuit (hereinafter referred to as a head amplifier IC or a preamplifier) 30, a volatile memory 70, a buffer memory (buffer) 80, a nonvolatile memory 90, and a system controller 130 that is a single-chip integrated circuit. In addition, the magnetic disk device 1 is connected to a host system (hereinafter simply referred to as a host) 100. The magnetic disk device 1 is a split actuator magnetic disk device that can independently drive a plurality of actuators AC to be explained later. The magnetic disk device 1 comprises a plurality of, for example, two actuators AC (actuators AC1 and AC2 to be explained later). The magnetic disk device 1 may comprise three or more actuators AC.

The housing HS comprises a bottom wall HSB. The housing HS comprises the only bottom wall HSB in FIG. 1 but, actually, the housing HS comprises, for example, the bottom wall HSB, a side wall provided upright along a periphery of the bottom wall HSB, and a cover which closes an opening of a base composed of the bottom wall HSB and the side wall.

The HDA 10 comprises a magnetic disk (hereinafter referred to as a disk) DK, a head HD, a spindle motor (hereinafter referred to as an SPM) 13 which rotates a spindle 12, an arm AM, an actuator block BK, a voice coil motor (hereinafter referred to as a VCM) 14, and a microactuator (hereinafter referred to as an MA) 15 equipped with the head HD. The HDA 10 may not comprise the MA 15. When the HDA 10 does not comprise the MA 15, the head HD may be mounted on the arm AM. FIG. 1 shows a cross-section of the HDA 10.

The SPM 13 is attached to the bottom wall HSB. The spindle 12 is attached to a central part of the SPM 13. The disk DK includes a plurality of disks DK. The disks DK are attached to the SPM 12 and rotated by driving the SPM 3. In the example shown in FIG. 1, the disk DK includes disks DK1 and DK2. The disks DK1 and DK2 are attached to the spindle 12. The disk DK2 is arranged between, for example, the disk DK1 and the bottom wall HSB. The disk DK1 may include a plurality of disks DK1. In addition, the disk DK2 may include a plurality of disks DK2. A direction along a circumference of the disk DK is referred to as a circumferential direction, and a direction orthogonal to the circumferential direction is referred to as a radial direction. The radial direction is equivalent to a direction toward an inner circumferential side and an outer circumferential side on the disk DK.

The head HD includes a plurality of heads HD. The heads HD are opposed to the disks DK. The heads HD include a write head WH which writes data to the disk DK and a read head RH which reads data written to the disk DK. In the following descriptions, a "process of writing data to the disk DK" may be referred to as "write process", and a "process of reading data from the disk DK" may also be referred to as "read process". In addition, "writing data to a particular region of the disk DK", "reading data from a particular region of the disk DK", or the like may also be referred to as "accessing". In the example shown in FIG. 1, the heads HD include heads HD1 and HD2. The head HD1 comprises, for example, a head HD1 opposed to a main surface of the disk DK1 and a head HD1 opposed to an opposed surface which is on the opposite side to the main surface of the disk DK1. The head HD1 may include only one head HD1 or three or more heads HD1. The head HD1 comprises a write head WH1 which writes data to the disk DK1 and a read head RH1 which reads data written to the disk DK1. The head HD2 comprises, for example, a head HD2 opposed to a main surface of the disk DK2 and a head HD2 opposed to an opposed surface which is on the opposite side to the main surface of the disk DK2. The head HD2 may include only one head HD2 or three or more heads HD2. The head HD2 comprises a write head WH2 which writes data to the disk DK2 and a read head RH2 which reads data written to the disk DK2.

The actuator block BK includes a plurality of actuator blocks BK. The actuator blocks BK are attached to be rotatable on a bearing BR provided upright on the bottom wall HSB. In the example shown in FIG. 1, the actuator blocks BK include actuator blocks BK1 and BK2. The actuator blocks BK1 and BK2 are attached to be rotatable on a bearing BR1 provided upright on the bottom wall HSB. The actuator block BK2 is located between the bottom wall HSB and the actuator block BK1.

The arm AM includes a plurality of arms AM. The arms AM are connected to the actuator blocks BK. In the example shown in FIG. 1, the arms AM include arms AM1 and AM2. The arm AM1 includes, for example, an arm AM1 located on the main surface side of the disk DK1, and an arm AM1 located on the opposite surface side of the disk DK1. The arm AM1 may include only one arm AM1 or three or more arms AM1 in accordance with the number of heads HD1. The arm AM1 is connected to the actuator block BK1. The arm AM2 includes, for example, an arm AM2 located on the main surface side of the disk DK2, and an arm AM2 located on the opposite surface side of the disk DK2. The arm AM2 may include only one arm AM2 or three or more arms AM2 in accordance with the number of heads HD2. The arm AM2 is connected to the actuator block BK2. The arm AM2 is arranged between the arm AM1 and the bottom wall HSB of the housing HS.

The VCM 14 includes a plurality of VCMs 14. The VCMs 14 are connected to the actuator blocks BK on the side opposite to the arms AM. In the example shown in FIG. 1, the VCMs 14 include VCMs 141 and 142. The VCM 141 is connected to the actuator block BK1 on the side opposite to the arm AM1. The VCM 142 is connected to the actuator block BK2 on the side opposite to the arm AM2.

The MA 15 includes a plurality of MAs 15. The MAs 15 are attached to an end part of the arm AM connected to the actuator block BK and a distal part of the arm AM on the opposite side. The MAs 15 are equipped with the heads HD at the end part connected to the arm AM and the distal part on the opposite side. The MAs 15 finely control the operations of the heads HD in the radial direction. For example, the MAs 15 control the operations of the heads HD in the radial direction more finely than the operations of the heads HD in the radial direction made by the VCMs 14. In the example shown in FIG. 1, the MAs 15 include MAs 151 and 152. The MAs 151 include, for example, the MA 151 attached to the arm AM1 located on the main surface side of the disk DK1 and equipped with the head HD1 opposed to the main surface of the disk DK1, and the MA 151 attached to the arm AM1 located on the opposite surface side of the disk DK1 and equipped with the head HD1 opposed to the opposed surface of the disk DK1. Incidentally, the MA 151 may include only one MA 151 or three or more MAs 151 in accordance with the number of heads HD1. The MAs 151 are attached to an end part of the arm AM1 connected to the actuator block BK1 and a distal part of the arm AM1 on the opposite side. The MAs 151 are equipped with the heads HD1 on the end part connected to the arm AM1 and the distal part of the arm AM1 on the opposite side. The MAs 151 finely control the operations of the heads HD1 in the radial direction. For example, the MAs 151 control the operations of the heads HD1 in the radial direction more finely than the operations of the heads HD1 in the radial direction made by the VCM 141. The MAs 152 include, for example, the MA 152 attached to the arm AM2 located on the main surface side of the disk DK2 and equipped with the head HD2 opposed to the main surface of the disk DK2, and the MA 152 attached to the arm AM2 located on the opposite surface side of the disk DK2 and equipped with the head HD2 opposed to the main surface of the disk DK2. Incidentally, the MAs 152 may include only one MA 152 or three or more MAs 152 in accordance with the number of heads HD2. The MAs 152 are attached to an end part of the arm AM2 connected to the actuator block BK2 and a distal part of the arm AM2 on the opposite side. The MAs 152 are equipped with the heads HD2 on the end part connected to the arm AM2 and the distal part of the arm AM2 on the opposite side. The MAs 152 finely control the operations of the heads HD2 in the radial direction. For example, the MAs 152 control the operations of the heads HD2 in the radial direction more finely than the operations of the heads HD2 in the radial direction made by the VCM 142.

The actuator AC includes a plurality of actuators AC. The plurality of actuators AC are attached to be freely pivotable (or rotatable) on the bearing BR. In other words, the plurality of actuators AC independently pivot around the bearing BR. Each of the plurality of actuators AC is composed of the MA 15, the arm AM, the actuator block BK, and the VCM 14. The plurality of actuators AC drive the VCMs 14 around the bearing BR and finely drive the MAs 15, such that the heads HD mounted on the MAs 15 are thereby positioned at particular positions of the disks DK. When the plurality of actuators AC are not equipped with the MAs 15, the plurality of actuators AC drive the VCMs 14 around the bearing BR, such that the heads HD mounted on the MA 15 are thereby positioned at particular positions of the disks DK. In the example shown in FIG. 1, the actuators AC include actuators AC1 and AC2. Three or more actuators AC may be provided. The actuator AC1 is attached to be rotatable on the bearing BR1. The actuator AC1 is composed of the MA 151, the arm AM1, the actuator block BK1, and the VCM 141. The actuator AC1 drives the VCM 141 around a rotary shaft of the bearing BR1 and finely drives the MA 151, such that the head HD1 mounted on the MA 151 is thereby positioned at a particular position of the disk DK1. When the actuator AC1 is not equipped with the MA 151, the actuator AC1 drives the VCM 141 around the bearing BR1, such that the head HD1 mounted on the arm AM1 is thereby positioned at a particular position of the disk DK1. The actuator AC2 is attached to be rotatable on the bearing BR1. The actuator AC2 is located between the bottom wall HSB and the actuator AC1. The actuator AC2 is composed of the MA 152, the arm AM2, the actuator block BK2, and the VCM 142. The actuator AC2 drives the VCM 142 around the rotary shaft of the bearing BR1 and finely drives the MA 152, such that the head HD2 mounted on the MA 152 is thereby positioned at a particular position of the disk DK2. Incidentally, when the actuator AC2 is not equipped with the MA 152, the actuator AC2 drives the VCM 142 around the bearing BR1, such that the head HD2 mounted on the arm AM2 is thereby positioned at a particular position of the disk DK2.

FIG. 2 is a plan view showing an example of the arrangement of the head HD to the disk DK. As shown in FIG. 2, the direction toward the outer circumference of the disk DK in the radial direction is referred to as an outward direction (outward), and the direction opposite to the outward direction is referred to as an inward direction (inward). In addition, as shown in FIG. 2, the direction of rotating rightward (clockwise) to the disk DK in the circumferential direction is referred to as a rightward direction, and the direction of rotating leftward (counterclockwise) opposite to the rightward direction is referred to as a leftward direction. In the circumferential direction, the direction of rotation of the disk DK is referred to as the rotational direction. In the example shown in FIG. 2, the rotational direction is represented as the leftward (counterclockwise) direction, but may be the opposite direction (rightward direction or clockwise direction).

On the disk DK, a user data region DKa available from a user and a system area DKb where information necessary for system management (hereinafter also referred to as system information) is written are allocated to a region to which data can be written. In the following descriptions, a particular position of the disk DK in the radial direction may also be referred to as a radial position, and a particular position of the disk DK in the circumferential direction may also be referred to as a circumferential position. The radial position and the circumferential position may also be simply referred to as a position as a whole. For example, the radial position is equivalent to a position in the radial direction of a track or sector (data sector) and the circumferential position is equivalent to a position in the circumferential direction of a sector in a particular track. For example, the position is equivalent to a position of a sector (data sector) on the disk DK. A location of the sector (data sector) can be indicated by at least one of a cylinder (track) number including a particular sector, a head number of the head HD accessing the particular sector, a sector number of the particular sector, a radial location of the particular sector on the disk DK, and a disk angle of the particular sector. For example, a location of the sector is indicated by a combination of two of a cylinder (track) number including a particular sector, a head number of the head HD accessing the particular sector, a sector number of the particular sector, a radial location of the particular sector on the disk DK, and a disk angle of the particular sector. At least one track can be arranged on the disk DK. In the following descriptions, the "track" is used as a term which means "one of a plurality of radially divided regions of the disk DK", "data for one circumference written in the circumferential direction of the disk DK", "path of one track along the circumferential direction of the disk DK" or which has various other meanings. The track includes a plurality of sectors. The "sector" is used as a term having various meanings such as "one of a plurality of circumferentially divided regions of the track", and "data written to a particular one of a plurality of circumferentially divided regions of the track". In the example shown in FIG. 2, a user data region DKa1 and a system area DKb1 are assigned to a disk DK1.

The disk DK has a plurality of servo regions (hereinafter also referred to as servo patterns) (not shown). The plurality of servo patterns are, for example, discretely arranged to be radially extended in the radial direction of the disk DK and spaced apart at particular intervals in the circumferential direction. Servo data including Preamble, Servo Mark, Gray Code, PAD, burst data, Post Code and the like are written to the servo pattern. User data is written to the user area region DKa other than the servo patterns.

For example, the actuator AC rotates around the bearing BR at seek time and the head HD thereby slides on a horizontal plane of the disk DK. In the example shown in FIG. 2, for example, the actuator AC1 rotates around the bearing BR1 at the seek time and the head HD1 thereby slides on a horizontal plane of the disk DK1.

The driver IC 20 controls driving the SPM 12 and the VCM 14 (VCMs 141 and 142) under control of a system controller 130 (more specifically, MPU 50 or HDC 60 to be explained later). The driver IC 20 is electrically connected to the SPM 13 and the VCM 14 (VCM 141 and VCM 142). The driver IC 20 comprises an SPM controller 210, a first VCM controller 221, a second VCM controller 222, a first micro-actuator (MA) controller 231, and a second micro-actuator (MA) controller 232. The SPM controller 210 controls rotation of the SPM 13. The first VCM controller 221 controls the drive of the VCM 141 by controlling the current (or voltage) supplied to the VCM 141. The second VCM controller 222 controls the drive of the VCM 142 by controlling the current (or voltage) supplied to the VCM 142. The first MA controller 231 controls the drive of the MA 151 by controlling the current (or voltage) supplied to the MA 151. The second MA controller 232 controls the drive of the MA 152 by controlling the current (or voltage) supplied to the MA 152. Incidentally, parts of the structure of the driver IC 20 (for example, the SPM controller 210, the first VCM controller 221, the second VCM controller 222, the first MA controller 231, and the second MA controller 232) may be provided in the system controller 130. When the MA 151 is not provided in the actuator AC1 and the MA 152 is not provided in the actuator AC2, the first MA controller 231 and the second MA controller 232 may not be provided. In addition, two or more drivers IC 20 may be provided in accordance with the number of the actuators AC.

The head amplifier IC (preamplifier) 30 amplifies a read signal read from the disk DK and outputs the amplified read signal to the system controller 130 (more specifically, the read/write (R/W) channel 40 to be described later). The head amplifier IC 30 is electrically connected to the heads HD, for example, the head HD1 and the head HD2. In addition, the head amplifier IC 30 outputs a write current to the heads HD in accordance with signals output from the R/W channel 40. The head amplifier IC 30 comprises a first read head selection unit 321, a second read head selection unit 322, a first read signal detection unit 331, and a second read signal detection unit 332. The first read head selection unit 321 selects the read head RH1 which reads data from the disk DK1 at the actuator AC1. The second read head selection unit 322 selects the read head RH2 which reads data from the disk DK2 at the actuator AC2. The first read signal detection unit 331 detects the signal (read signal) which is read from the disk DK1 by the read head RH1. The second read signal detection unit 332 detects the signal (read signal) which is read from the disk DK2 by the read head RH2. Incidentally, parts of the structure of the head amplifier IC 30 (for example, the first read head selection unit 321, the second read head selection unit 322, the first read signal detection unit 331, and the second read signal detection unit 332; may be provided in the system controller 130. In addition, two or more head amplifiers IC 30 may be provided in accordance with the number of the actuators AC.

The volatile memory 70 is a semiconductor memory where the stored data is lost when power supply is cut off. The volatile memory 70 stores data necessary for processes in the units of the magnetic disk device 1, and the like. The volatile memory 70 is, for example, a dynamic random access memory (DRAM) or a synchronous dynamic random access memory (SDRAM).

The buffer memory 80 is a semiconductor memory which temporarily records data and the like transmitted and received between the magnetic disk device 1 and the host 100. The buffer memory 80 may be formed integrally with the volatile memory 70. The buffer memory 80 is, for example, a DRAM, a static random access memory (SRAM), an SDRAM, a ferroelectric random access memory (FeRAM), or a magnetoresistive random access memory (MRAM).

The nonvolatile memory 90 is a semiconductor memory which records data stored even when power supply is cut off. The nonvolatile memory 90 is, for example, a NOR type or NAND type flash ROM (flash read only memory: FROM).

The system controller (controller) 130 is implemented by, for example, using a large scale integrated circuit (LSI) called a system-on-a-chip (SoC) in which a plurality of elements are integrated on a single chip. The system controller 130 includes a read/write (R/W) channel 40, a microprocessor (MPU) 50, and a hard disk controller (HDC) 60. The system controller 130 is electrically connected to the driver IC 20, the head amplifier IC 30, the volatile memory 70, the buffer memory 80, the nonvolatile memory 90, and the host 100. Incidentally, the system controller 130 may comprise the SPM controller 210, the first VCM controller 221, the second VCM controller 222, the first read head selection unit 321, the second read head selection unit 322, the first read signal detection unit 331, and the second read signal detection unit 332. The system controller 130 may include the driver IC 20 and the head amplifier IC 30. In addition, two or more system controllers 130 may be provided in accordance with the number of the actuators AC.

The R/W channel 40 executes signal processing of read data transferred from the disk DK to the host 100 and write data transferred from the host 100 in accordance with instructions from the MPU 50 to be explained later. The R/W channel 40 comprises a circuit or a function of measuring the signal quality of the read data. The R/W channel 40 is electrically connected to, for example, the head amplifier IC 30, the MPU 50, the HDC 60, and the like. Two or more R/W channels 40 may be provided in accordance with the number of the actuators AC.

The MPU 50 is a main controller which controls each of the units of the magnetic disk device 1 in accordance with instructions from the host 100 and the like. The MPU 50 controls the actuators AC via the driver IC 20 and executes servo control for positioning the head HD. The MPU 50 controls the operation of writing data to the disk DK and selects the storage destination of the write data. In addition, the MPU 50 controls the operation of reading data from the disk DK and controls the processing of read data. The MPU 50 is connected to each of the units of the magnetic disk device 1. The MPU 50 is electrically connected to, for example, the driver IC 20, the R/W channel 40, the HDC 60 and the like. Two or more MPUs 50 may be provided in accordance with the number of the actuators AC.

The HDC 60 controls read/write processing and controls data transfer between the host 100 and the R/W channel 40 in accordance with instructions from the MPU 50. The HDC 60 is electrically connected to, for example, the R/W channel 40, the MPU 50, the volatile memory 70, the buffer memory 80, the nonvolatile memory 90, and the like. Two or more HDCs 60 may be provided in accordance with the number of the actuators AC.

The HDC 60 comprises a servo controller 610 and a command controller 620. The HDC 60 executes processes of the units, for example, the servo controller 610, the command controller 620, and the like, on the firmware. The HDC 60 may comprise these units as circuits. In addition, several units of the HDC 60 may be provided in the MPU 50. For example, the servo controller 610 and the command controller 620 may be provided in the MPU 50.

The servo controller 610 controls the position of the head HD. In other words, the servo controller 610 controls access of the head HD to a particular area of the disk DK. The servo controller 610 comprises a tracking controller 6101 and a seek controller 6102. Two or more servo controllers 610 may be provided in accordance with the number of the actuators AC.

The tracking controller 6101 controls tracking of the head HD to a particular track of the disk DK. Tracking the head HD to a particular track of the disk DK may also be simply referred to as "tracking". The "tracking" includes tracking a particular path, for example, a particular track when writing the data to the disk DK, and tracking a particular path, for example, a particular track when reading data from the disk DK.

The seek controller 6102 controls seek of the head HD from a particular track to a target track on the disk DK.

The command controller 620 controls the commands received from the host 100 and the like. For example, the command controller 620 stores the commands received from the host 100 and the like in a queue in the order of receiving the commands from the host 100 and the like and, based on a particular command of at least one command stored in the queue, the command controller 620 accesses a position or area, for example, a sector specified by the command via the servo controller 610. In the following descriptions, accessing a position or an area specified by the command based on the particular command may also be referred to as processing a command. The command stored in the queue may also be referred to as a queue command. In addition, processing a queue command may also be referred to as queuing.

When processing a particular queue command (hereinafter also referred to as a current command), the command controller 620 executes an arithmetic process, based on the position of the disk DK were the head HD is currently arranged, for example, the position (hereinafter simply referred to as a current position) of the data sector of the disk DK where the head HD is currently arranged, and a plurality of queue commands stored in the queue in the order of receiving the queue commands from the host 100 and the like, and selects particular commands from the plurality of queue commands, based on the result of the arithmetic process, changes the order of the selected commands to an order (hereinafter also referred to as next order) of the commands to be processed next to the current commands, and processes the commands selected after processing the current commands. In the following descriptions, replacing the order of processing a plurality of commands", "changing a logical-physical map", or the like may also be referred to as reordering. The processing of executing a particular arithmetic (calculation) process, selecting particular commands from a plurality of commands, based on the result of the particular arithmetic (calculation) process, and reordering the order of the commands selected from the plurality of commands may also be referred to as a reordering arithmetic process, a reordering arithmetic operation or a reordering process. In addition, a command processed next to the current command may also be referred to as next processed command.

For example, based on the current position, a plurality of queue commands stored in the queue in the order of receiving from the host 100 and the like, and a table indicative of a relationship between the seek distance and the seek time of the head HD (hereinafter also referred to as a reordering table or a seek profile table), when processing a current command, the command controller 620 calculates a plurality of times to access positions of a plurality of sectors (data sectors) on the disk DK (hereinafter often simply referred to as positions) specified by the queue commands from the current position. In the following descriptions, a particular position of the disk DK, for example, a position different from this position of the disk DK from the sector (data sector), for example, the time to access the sector (data sector) by the head HD (time elapsed until the head HD is arranged) may also be referred to as an access cost. The access cost includes the time to seek the head HD from a particular track of the disk DK to a track different from this track of the disk DK (hereinafter also referred to as seek time) and a rotation wait time elapsed until the head HD is arranged at a particular position of the track different from this track of the disk DK. For example, the reordering table may be different for each head HD or each actuator AC, may be the same for several heads HD of a plurality of heads HD or several actuators of a plurality of actuators AC, and may be the same for all the heads HD and all the actuators AC. To reduce the vibration of the magnetic disk device 1 and the influence from the power consumption, the command controller 620 may adjust the access costs by weighting the calculated access costs (for example, multiplying or dividing by a particular value), and offsetting (for example, adding or subtracting a particular value) in the radial direction the position of the disk DK where movement of the head HD starts or the position of the disk DK where the head HD moves and calculating the access costs, and the like.

Based on the calculation result of the calculation processing of the access costs, the command controller 620 selects commands (hereinafter also referred to as low cost commands) to specify the position which can be accessed at the access cost shorter (or smaller) than the access cost to the position specified by the other queue command from the current position, from the queue commands, as next processed commands, and reorders the order of low cost commands selected in the queue commands to the next order. In the following descriptions, information for the reordering arithmetic process such as information of the current position of the head HD, information of a plurality of queue commands, information of a plurality of positions specified by the plurality of queue commands, the reordering table, and information in seeking the plurality of positions of the disk DK specified by the plurality of queue commands from the current positions of the head HD, may also be referred to as reordering information. The reordering information may not include the reordering table. The reordering information may include information other than these information elements. The position information is equivalent to, for example, information of at least one of the heads, tracks, sectors, radial positions, and disk angles or information composed of their combination. In the following descriptions, the access cost from a particular position to the other position may also be referred to as an access cost of a particular command or an access cost corresponding to a particular command, for inconvenience of simple explanation. As described above, the command controller 620 executes the calculation process of the access costs, based on the reordering information, selects low cost commands from the queue commands, based on the calculation result, of the calculation process of the access costs, executes the reordering arithmetic process of reordering the order of the selected low cost commands to the next order, processes the current commands and then processes the low cost commands. The command controller 620 may record the reordering information in a particular recording area, for example, the system area DKb of the disk DK, the volatile memory 70, the buffer memory 80, the nonvolatile memory 90, or the like. Incidentally, the command controller 620 may record the reordering information other than the reordering table in a particular recording area, for example, the system area DKb of the disk DK, the volatile memory 70, the buffer memory 80, the nonvolatile memory 90, or the like. In this case, the command controller 620 may record the reordering table in a particular recording area, for example, the system area DKb of the disk DK, the volatile memory 70, the buffer memory 80, the nonvolatile memory 90, or the like, separately from the reordering information. In addition, the command controller 620 may calculate the reordering table.

For example, when processing the current command, the command controller 620 calculates the access costs of the respective queue commands, based on the reordering information, selects a command (hereinafter also referred to as a lowest cost command) to specify the position which can be accessed at the shortest (or smallest) access cost from the current position, from the queue commands, as next processed commands, based on the results of calculation of the access costs, and reorders the order of the lowest cost commands selected in the queue commands to the next order. As described above, the command controller 620 executes the calculation process of the queue commands, based on the reordering information, selects the lowest cost commands from the queue commands, based on the calculation results of the calculation process of the access costs, executes the reordering arithmetic process of reordering the order of the selected lowest cost commands to the next order, processes the current commands and then processes the lowest cost commands. The command controller 620 may calculate the plurality of access costs of the respective queue commands, based on the reordering information other than the reordering table, select the low cost commands (or the lowest cost commands) from the queue commands, based on the results of calculation of the access costs, and reorder the order of the low cost commands (or the lowest cost commands) selected in the queue commands to the next order.

The command controller 620 counts the number of queues (hereinafter also referred to as a queue command number). The command controller 620 counts each queue command number corresponding to each actuator AC of at least one queue command. When the number of queue commands corresponding to the particular actuator AC in the plurality of actuators AC is large and the number of queue commands corresponding to the other actuators AC different from the particular actuator AC is smaller than the number of queue commands corresponding to the particular actuator AC, the command controller 620 executes the arithmetic process related to the reordering arithmetic process for the plurality of queue commands corresponding to the particular actuator AC, using a surplus arithmetic resource in the arithmetic resource available for the reordering arithmetic process corresponding to the other actuators AC. The arithmetic resource may be a physical object, a physical area, a logical area, or a time area. The arithmetic resource includes, for example, the capacity for processing of the reordering of circuits and firmware, the recording capacity of the memory used in the arithmetic process of the reordering, the calculation performance of the system controller 130 such as the MPU 50 and the HDC 60, and the like. In the following descriptions, the surplus arithmetic resource in the arithmetic resource available for the reordering arithmetic process corresponding to a particular actuator AC may also be referred to as a surplus arithmetic resource corresponding to a particular actuator AC. In addition, the arithmetic process related to the reordering arithmetic process of a plurality of queue commands corresponding to the other actuator AC different from the particular actuator AC, which is executed with the surplus arithmetic resource corresponding to the particular actuator AC, may also be referred to as a bypass arithmetic process, a bypass arithmetic operation, or a bypass process.

The command controller 620 comprises a storage unit 6201, a command number determination unit 6202, a bypass arithmetic determination unit 6211, a communication unit 6212, a first reordering arithmetic unit 6221 which executes a reordering arithmetic process of a plurality of queue commands corresponding to the actuator AC1, a second reordering arithmetic unit 6222 which executes a reordering arithmetic process of a plurality of queue commands corresponding to the actuator AC2, a first bypass arithmetic unit 6231 which executes a bypass arithmetic process with a surplus arithmetic resource corresponding to the actuator AC1, and a second bypass arithmetic unit 6232 which executes a bypass arithmetic process with a surplus arithmetic resource corresponding to the actuator AC2. Two or more command controllers 620 may be provided in accordance with the number of the actuators AC.

The storage unit 6201 includes a queue. The storage unit 6201 may comprise a plurality of queues that correspond to a plurality of actuators AC, respectively, or may comprise a queue (hereinafter also referred to as a synthetic queue) formed by combining the queues corresponding to the plurality of actuators AC. For example, the storage unit 6201 may comprise a queue corresponding to the actuator AC1 and a queue corresponding to the actuator AC2 or may comprise one synthetic queue formed by combining the queue corresponding to the actuator AC1 and the queue corresponding to the actuator AC2.

The storage unit 6201 stores the commands received from the host 100 and the like in the queue. For example, the storage unit 6201 may store a plurality of commands corresponding to the actuator AC1, which are received from the host 100 and the like, and a plurality of commands corresponding to the actuator AC2, which are received from the host 100 and the like, in the order of receiving the commands from the host and the like, from the same direction, in the synthetic queue. The storage unit 6201 may store a plurality of commands corresponding to the actuator AC1, which are received from the host 100 and the like, in the order of receiving the commands from the host 100 and the like, in the synthetic queue, and may store a plurality of commands corresponding to the actuator AC2, which are received from the host 100 and the like, in the order of receiving the commands from the host 100 and the like, from the direction opposite to the plurality of commands corresponding to the actuator AC1, in the synthetic queue.

The storage unit 6201 can store the commands for the command number (hereinafter also referred to as a queue depth: QD) which can be stored in the queue specified by the host 100 and the like, in the queue. When the queue command number corresponding to the particular actuator AC is the command number of QD corresponding to the actuator AC, the storage unit 6201 does not receive the commands corresponding to the actuator AC1 from the host 100 and the like. When the queue command number corresponding to the particular actuator AC is smaller than QD corresponding to the actuator AC, the storage unit 6201 stores the commands corresponding to the actuator AC, which are received from the host 100 and the like, in the queue. For example, when QD corresponding to the actuator AC1 is 3 and the queue command number corresponding to the actuator AC1 is 3, the storage unit 6201 does not receive the commands corresponding to the actuator AC1 from the host 100 and the like. In addition, when QD corresponding to the actuator AC1 is 3 and the queue command number corresponding to the actuator AC1 is 2, the storage unit 6201 stores the commands corresponding to the actuator AC1, which are received from the host 100 and the like, in the queue. For example, a differential value between the QD corresponding to the particular actuator AC and the queue command number corresponding to the actuator AC, i.e., the number of free spaces in the queue corresponding to the actuator AC corresponds to a free space (surplus arithmetic resource) of the arithmetic resource corresponding to the actuator AC. For example, when the number of free spaces corresponding to the particular actuator AC is large, the surplus arithmetic resource corresponding to the actuator AC increases. In addition, when the number of free spaces corresponding to the particular actuator AC is small, the surplus arithmetic resource corresponding to the actuator AC decreases.

FIG. 3 is a schematic diagram showing examples of queues Q1 and Q2. In FIG. 3, the storage unit 6201 incudes queue Q storing the commands corresponding to the actuator AC1, and queue Q2 storing the commands corresponding to the actuator AC2. In the example shown in FIG. 3, QD of the queues Q1 and Q2 is 3. Incidentally, QD of the queues Q1 and Q2 may be 2 or less or may be 4 or more. In FIG. 3, LUN1 is indicative of the logical unit number (LUN) of the actuator AC1 and LUN2 is indicative of LUN of the actuator AC2. Cmd1, Cmd2, and Cmd3 are indicative of commands. The numbers 1, 2, and 3 of the commands Cmd1, Cmd2, and Cmd3 are indicative of the order in which the commands are transferred from the host 100 and the like, indicating that the command of the smaller number is transferred earlier than the command of the larger number. The commands LUN1Cmd1, LUN1Cmd2, and LUN1Cmd3 are equivalent to the commands corresponding to the actuator AC1. The commands LUN1Cmd1, LUN1Cmd2, and LUN1Cmd3 are transferred in this order from the host 100 and the like to the storage unit 6201 and stored in the queue Q1. The commands LUN2Cmd1 and LUN2Cmd are transferred in this order from the host 100 and the like to the storage unit 6201 and stored in the queue Q2. FIG. 3 shows a direction (hereinafter also referred to as a storing direction) CD1 in which the commands are stored in the Q1 and a storing direction CD2 in which the commands are stored in the queue Q2.

In the example shown in FIG. 3, the storage unit 6201 stores the commands LUN1Cmd1, LUN1Cmd2, and LUN2Cmd3 in this order in the queue Q1, along the storing direction CD1, and stores the commands LUN2Cmd1 and LUN2Cmd2 in this order in the queue Q2, along the storing direction CD2.

Since the queue command number (=3) corresponding to the actuator AC1 stored in the queue Q1 is the command number (=3) of QD, the storage unit 6201 does not receive the command corresponding to the actuator AC1 from the host 100 and the like. Since the queue command number (=2) corresponding to the actuator AC2 stored in the queue Q2 is smaller than QD (=3), the storage unit 6201 can receive the command corresponding to the actuator AC2 from the host 130 and the like and store the command in the queue Q2.

Figure 4:
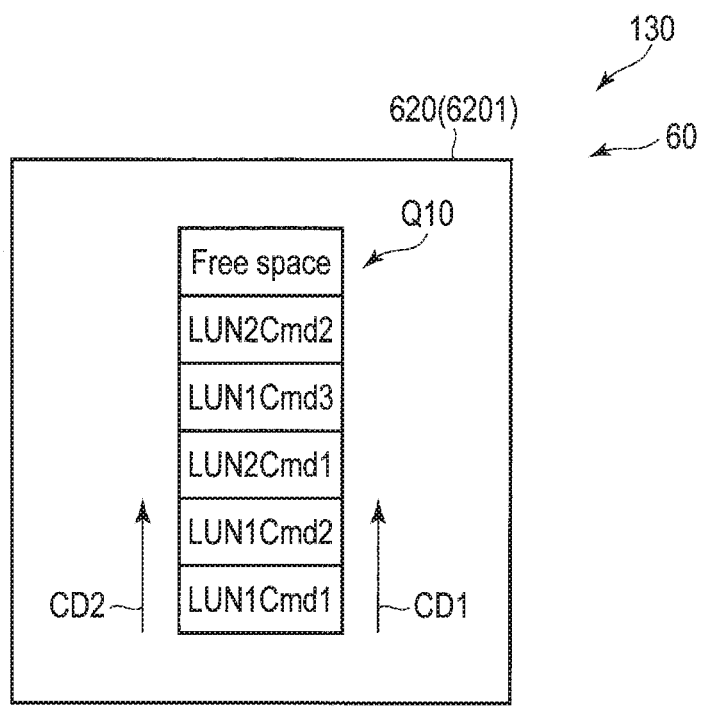
FIG. 4 is a schematic diagram showing an example of a synthetic queue.

FIG. 4 is a schematic diagram showing an example of a synthetic queue Q10. In FIG. 4, the storage unit 6201 includes the synthetic queue Q10 which stores commands corresponding to the actuators AC1 and AC2. The synthetic queue Q10 is equivalent to, for example, a queue formed by combining the queues Q1 and Q2 shown in FIG. 3. In FIG. 4, QD of the synthetic queue Q70 is QD, for example, 6 obtained by adding QD, for example, 3 of the queue corresponding to the actuator AC1 and QD, for example, 3 of the queue corresponding to the actuator AC2. Incidentally, the synthetic queue Q10 may be 5 or less or may be 7 or more. In FIG. 4, QD of the queue corresponding to the actuator AC1 is, for example, 3, and QD of the queue corresponding to the actuator AC2 is, for example, 3. In FIG. 4, the storing directions CD1 and CD2 are the same directions.

The storage unit 6201 stores the commands LUN1Cmd1 and LUN1Cmd2 in this order, in the synthetic queue Q10, along the storing direction CD1. The storage unit 6201 receives the command LUN2Cmd1 after the command LUN1Cmd2, and stores the command LUN2Cmd1 in the synthetic queue Q10, after the command LUN1Cmd2, along the storing direction CD2. The storage unit 6201 receives the command LUN1Cmd3 after the command LUN2Cmd1, and stores the command LUN1Cmd3 in the synthetic queue Q10, after the command LUN2Cmd1, along the storing direction CD1. The storage unit 6201 receives the command LUN2Cmd2 after the command LUN1Cmd3, and stores the command LUN2Cmd2 in the synthetic queue Q10, after the command LUN1Cmd3, along the storing direction CD2.

Since the queue command number corresponding to the actuator AC1 stored in the synthetic queue Q10 is QD (=3), the storage unit 6201 does not receive the command corresponding to the actuator AC1. Since the queue command number corresponding to the actuator AC2 stored in the synthetic queue Q10 is smaller than QD (=3), the storage unit 6201 can receive the command corresponding to the actuator AC2 and store the command in the synthetic queue Q10.

Figure 5:
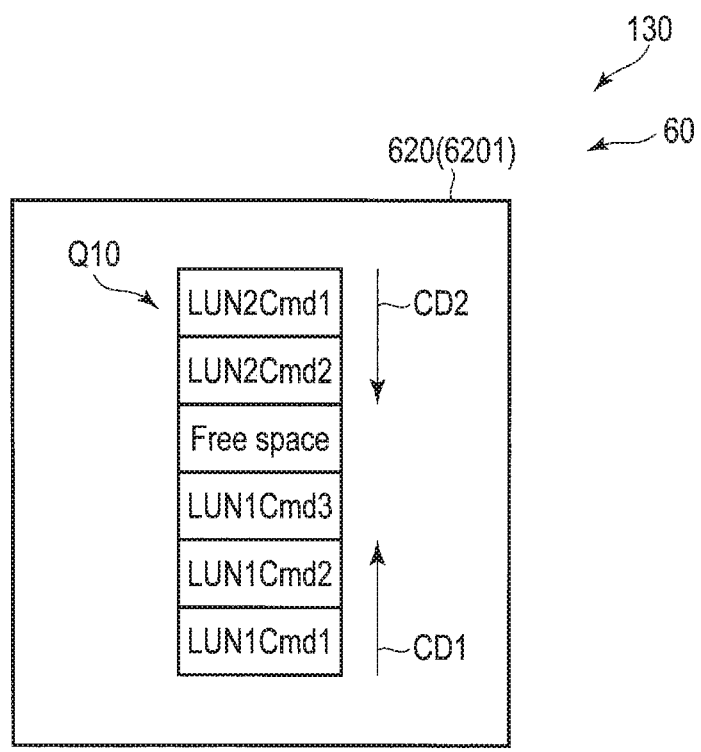
FIG. 5 is a schematic diagram showing an example of the synthetic queue.

FIG. 5 is a schematic diagram showing an example of the synthetic queue Q10. In FIG. 5, the storage unit 6201 includes the synthetic queue Q10 which stores the commands corresponding to the actuators AC1 and AC2. The synthetic queue Q10 is equivalent to, for example, a queue formed by combining the queues Q1 and Q2 shown in FIG. 5. In FIG. 5, QD of the synthetic queue Q10 is QD, for example, 6 obtained by adding QD, for example, 3 of the queue corresponding to the actuator AC1 and QD, for example, 3 of the queue corresponding to the actuator AC2. Incidentally, the synthetic queue Q10 may be 5 or less or may be 7 or more. In FIG. 5, QD of the queue corresponding to the actuator AC1 is, for example, 3, and QD of the queue corresponding to the actuator AC2 is, for example, 3. In FIG. 5, the storing directions CD1 and CD2 are directions opposite to each other.

The storage unit 6201 stores the commands LUN1Cmd1, LUN1Cmd2, and LUN1Cmd3 in this order in the synthetic queue Q10, along the storing direction CD1, and stores the commands LUN2Cmd1 and LUN2Cmd2 in this order in the synthetic queue Q10, along the storing direction CD2.

Since the queue command number corresponding to the actuator AC1 stored in the synthetic queue Q10 is QD (=3), the storage unit 6201 does not receive the command corresponding to the actuator AC1. Since the queue command number corresponding to the actuator AC2 stored in the synthetic queue Q10 is smaller than QD (=3), the storage unit 6201 can receive the command corresponding to the actuator AC2 and store the command in the synthetic queue Q10.

The command number determination unit 6202 counts queue command numbers corresponding to the respective actuators AC. The command number determination unit 6202 may record, for example, queue command numbers corresponding to the respective actuators AC in association with LUN, in the table and the like. The table including the queue command numbers corresponding to the respective actuators AC may be provided in, for example, the command number determination unit 620 or may be recorded in a particular recording area, for example, the system area DKb of the disk DK, the volatile memory 70, the buffer memory 80, the nonvolatile memory 90, or the like.

The command number determination unit 6202 determines the degree of the queue command number corresponding to each actuator AC (hereinafter also referred to as the level of the queue command number) in accordance with each queue command number corresponding to each actuator AC. The command number determination unit 6202 determines whether the queue command numbers corresponding to the respective actuators AC are larger than or equal to a particular threshold value thereinafter also referred to as an upper limit) or smaller than the upper limit. In the following descriptions, each upper limit of each queue command number corresponding to each actuator is the same but may be different. When determining that the queue command number corresponding to the particular actuator AC is larger than or equal to the upper limit, the command number determination unit 6202 determines that the degree of the queue command number corresponding to the particular actuator AC is large. In other words, when determining that the queue command number corresponding to the particular actuator AC is larger than or equal to the upper limit, the command number determination unit 6202 determines that the level of the queue command number corresponding to the particular actuator AC is a high level. The upper limit is equivalent to, for example, QD. The command number determination unit 6202 determines whether the queue commands corresponding to the respective actuators AC are smaller than or equal to a particular threshold value (hereinafter also referred to as a lower limit) or larger than the lower limit. In the following descriptions, each lower limit of each queue command number corresponding to each actuator is the same but may be different. When determining that the queue command number corresponding to the particular actuator AC is smaller than or equal to the lower limit, the command number determination unit 6202 determines that the degree of the queue command number corresponding to the particular actuator AC is small. In other words, when determining that the queue command number corresponding to the particular actuator AC is smaller than or equal to the lower limit, the command number determination unit 6202 determines that the level of the queue command number corresponding to the particular actuator AC is a low level. The lower limit is equivalent to, for example, 0 (zero). For example, when the queue command number corresponding to the particular actuator AC is the lower limit, the actuator AC is an idle state. When determining that the queue command number corresponding to the particular actuator is smaller than the upper limit and is larger than the lower limit, the command number determination unit 6202 determines that the degree of the queue command number corresponding to the particular actuator AC is not large or small. In other words, the command number determination unit 6202 determines that the level of the queue command number corresponding to the particular actuator AC is a middle level.

For example, the command number determination unit 6202 determines that when the upper level of the queue command number corresponding to the actuator AC1 (or the actuator AC2) is 3 and when the queue command number corresponding to the actuator AC1 (or the actuator AC2) is 3, the level of the queue command number corresponding to the actuator AC1 is a high level. For example, the command number determination unit 6202 determines that when the lower level of the queue command number corresponding to the actuator AC1 (or the actuator AC2) is 1 and when the queue command number corresponding to the actuator AC1 (or the actuator AC2) is 1, the level of the queue command number corresponding to the actuator AC1 is a low level. For example, the command number determination unit 6202 determines that when the queue command number corresponding to the actuator AC (or the actuator AC2) is 3, when the lower level of the queue command number corresponding to the actuator AC1 (or the actuator AC2) is 1, and when the queue command number corresponding to the actuator AC1 (or the actuator AC2) is 2, the level of the queue command number corresponding to the actuator AC1 is a middle level.

The bypass arithmetic determination unit 6211 determines whether the bypass arithmetic process is valid or invalid, based on the levels of the queue command numbers that correspond to the plurality of actuators AC, respectively. When determining that the bypass arithmetic process is valid, based on the level of the queue command number corresponding to each of the plurality of actuators AC, the bypass arithmetic determination unit 6211 generates a flag (hereinafter also referred to as a valid flag) which validates the bypass arithmetic process and a flag (hereinafter also referred to as a transferring direction flag) which is indicative of the direction of transferring the reordering information, and outputs the valid flag and the transferring direction flag. When determining that the bypass arithmetic process is invalid, based on the level of the queue command number corresponding to each of the plurality of actuators AC, the bypass arithmetic determination unit 6211 generates a flag (hereinafter also referred to as an invalid flag) which invalidates the bypass arithmetic process and outputs the invalid flag.

For example, the bypass arithmetic determination unit 6211 determines whether the bypass arithmetic process is valid or invalid, based or a table (hereinafter also referred to as a determination table) which includes the level of the queue command number corresponding to the plurality of actuators AC, respectively, the state of the bypass arithmetic process, the transferring direction of the reordering information, and the like, and the level of the queue command number corresponding to each of the plurality of actuators AC. The determination table may be provided in the bypass arithmetic determination unit 6211 or may be recorded in a particular recording area, for example, the system area DKb of the disk DK, the volatile memory 70, the buffer memory 80, the nonvolatile memory 90, or the like.

FIG. 6 is a schematic diagram showing an example of a determination table TB1. In FIG. 6, the determination table TB1 includes the level of the queue command number corresponding to the actuator AC1 of LUN1, the level of the queue command number corresponding to the actuator AC2 of LUN2, the state of the bypass arithmetic process, and the transferring direction of the reordering information. In the determination table TB1 shown in FIG. 6, the number is indicative of a serial number of a combination of the level of the queue command number (corresponding to the actuator AC1) of LUN1, the level of the queue command number (corresponding to the actuator AC2) of LUN2, the state of the bypass arithmetic process, and the transferring direction of the reordering information. In the level of the queue command number of LUN1 and LUN2 of the determination table TB1 shown in FIG. 6, 0:Low indicates that the level of the queue command number is a low level, 1:Middle indicates that the level of the queue command number is a middle level, and 2:High indicates that the level of the queue command number is a high level. In the state of the bypass arithmetic process of the determination table TB1 shown in FIG. 6, 0:Disable indicates that the bypass arithmetic process is invalid, and 1:Enable indicates that the bypass arithmetic process is valid. In the transferring direction of reordering information of the determination table TB1 shown in FIG. 6, 0(Invalid) indicates that the reordering information is not transferred such that the bypass arithmetic process is invalid, −1(R2−B1) indicates that the reordering information corresponding to the actuator AC2 is transferred from the second reordering arithmetic unit 6222 to the first bypass arithmetic unit 6231, and 1(R1−B2) indicates that the reordering information corresponding to the actuator AC1 is transferred from the first reordering arithmetic unit 6221 to the second bypass arithmetic unit 6232. The determination table TB1 may be provided in the bypass arithmetic determination unit 6211 or may be recorded in a particular recording area, for example, the system area DKb of the disk DK, the volatile memory 70, the buffer memory 80, the nonvolatile memory 90, or the like.

In the example shown in FIG. 6, when it is determined by the command number determination unit 6202 that the level of the queue command number corresponding to the actuator AC1 of LUN1 is the low level (0:Low) and the level of the queue command number corresponding to the actuator AC2 of LUN2 is the low level (0:Low), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the low level (0:Low) and the level of the queue command number corresponding to the actuator AC2 of LUN2 is the middle level (1:Middle), the bypass arithmetic determination unit 6211 determines that the bypass arithmetic process is invalid (0:Disable), by referring to the determination table TB1. In this case, the bypass arithmetic determination unit 6211 generates the invalid (0: Disable) flag. The bypass arithmetic determination unit 6211 outputs the generated invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the low level (0:Low) and the level of the queue command number corresponding to the actuator AC2 of LUN2 is the high level (2:High), the bypass arithmetic determination unit 6211 determines that the bypass arithmetic process is valid (1:Enable), by referring to the determination table TB1. In this case, the bypass arithmetic determination unit 6211 generates the valid (1:Enable) flag which validates the bypass arithmetic process by the surplus arithmetic resource corresponding to the actuator AC1, and the transferring direction flag indicative of transferring the reordering information corresponding to the actuator AC2 from the second reordering arithmetic unit 6222 to the first bypass arithmetic unit 6231. The bypass arithmetic determination unit 6211 outputs the generated valid flag and transferring direction flag to the second reordering arithmetic unit 6222 and the first bypass arithmetic unit 6231. Incidentally, the bypass arithmetic determination unit 6211 may output the generated valid flag and transferring direction flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the middle level (1:Middle) and the level of the queue command number corresponding to the actuator AC2 of LUN2 is the low level (0:Low), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the middle level (1:Middle) and the level of the queue command number corresponding to the actuator AC2 of LUN2 is the middle level (1:Middle), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the middle level (1:Middle) and the level of the queue command number corresponding to the actuator AC2 of LUN2 is the high level (2:High), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the middle level (1:Middle) and the level of the queue command number corresponding to the actuator AC2 of LUN2 is the low level (0:Low), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the high level (2:High) and the level of the queue command number corresponding to the actuator AC2 of LUN2 is the low level (0:Low), the bypass arithmetic determination unit 6211 determines that the bypass arithmetic process is valid (1:Enable), by referring to the determination table TB1. In this case, the bypass arithmetic determination unit 6211 generates the valid (1:Enable) flag which validates the bypass arithmetic process by the surplus arithmetic resource corresponding to the actuator AC2, and the transferring direction flag indicative of transferring the reordering information corresponding to the actuator AC1 from the first reordering arithmetic unit 6221 to the second bypass arithmetic unit 6232. The bypass arithmetic determination unit 6211 outputs the generated valid flag and transferring direction flag to the first reordering arithmetic unit 6221 and the second bypass arithmetic unit 6232. Incidentally, the bypass arithmetic determination unit 6211 may output the generated valid flag and transferring direction flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the high level (2:High) and the level of the queue command number corresponding to the actuator AC2 of LUN2 is the middle level (1:Middle), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

In the example shown in FIG. 6, when it is determined by the command number determination unit 6202 that the level of the queue command number corresponding to the actuator AC1 of LUN1 is the high level (2:High) and the level of the queue command number corresponding to the actuator AC2 of LUN2 is the high level (2:High), the bypass arithmetic determination unit 6211 determines that the bypass arithmetic process is invalid (0:Disable), by referring to the determination table TB1. In this case, the bypass arithmetic determination unit 6211 generates the invalid (0:Disable) flag, and outputs the invalid (0:Disable) flag to the first reordering arithmetic unit 6221, the second reordering arithmetic unit 6222, the first bypass arithmetic unit 6231, and the second bypass arithmetic unit 6232.

FIG. 7 is a schematic diagram showing an example of a method of determining a state of the bypass arithmetic process according Lo the present embodiment. In FIG. 7, the storage unit 6201 includes the queues Q1 and Q2 shown in FIG. 3. In FIG. 7, QD of each of the queues Q1 and Q2 is 3. In FIG. 7, the storing directions CD1 and CD2 are the same directions but may be opposite directions. FIG. 7 shows the upper limit thH of the queue command numbers corresponding to the actuators AC1 and AC2, and the lower limit thL corresponding to the actuators AC1 and AC2. In FIG. 7, the upper limit thH is 3 and the lower limit thL is C. Incidentally, the upper limit thH may be a value other than 3 and the lower limit thL may be a value other than 0. In FIG. 7, the queue command number corresponding to the actuator AC1 stored in the queue Q1 is 3, and the queue command number corresponding to the actuator AC2 stored in the queue Q2 is 0.

In the example shown in FIG. 7, the command number determination unit 6202 counts each of the queue command number (=3) corresponding to the actuator AC1 stored in the queue Q1 of the storage unit 6201, and the queue command number (=0) corresponding to the actuator AC2 stored in the queue Q2 of the storage unit 6201. Incidentally, the command number determination unit 6202 may record the counted queue command number corresponding to the actuator AC1 and the counted queue command number corresponding to the actuator AC2 in association with LUN, in the table.

In the example shown in FIG. 7, the command number determination unit 6202 determines that when the queue command number (=3) corresponding to the actuator AC1 stored in the queue Q1 of the storage unit 6201 is higher than or equal to the upper limit thH (=3) and when the queue command number (=0) corresponding to the actuator AC2 stored in the queue Q2 of the storage unit 6201 is lower than or equal to the lower limit thL (=0), the level of the queue command number corresponding to the actuator AC1 is a high level and the level or the queue command number corresponding to the actuator AC2 is a low level.

In the example shown in FIG. 7, when it is determined by the command number determination unit 6202 that the level of the queue command number corresponding to the actuator AC1 is the high level and the level of the queue command number corresponding to the actuator AC2 is the low level, the bypass arithmetic determination unit 6211 determines that the bypass arithmetic operation is valid, by referring to the determination table TB1 shown in FIG. 6. The bypass arithmetic determination unit 6211 generates the valid flag which validates the bypass arithmetic process using the surplus arithmetic resource corresponding to the actuator AC2, and the transferring direction flag indicative of transferring the reordering information corresponding to the actuator AC1 from the first reordering arithmetic unit 6221 to the second bypass arithmetic unit 6232. The bypass arithmetic determination unit 6211 outputs the generated valid flag and transferring direction flag to the first reordering arithmetic unit 6221 and the second bypass arithmetic unit 6232. Incidentally, the bypass arithmetic determination unit 6211 may output the generated valid flag and transferring direction flag to the first reordering arithmetic unit 6221, the second reordering arithmetic unit 6222, the first bypass arithmetic unit 6231, and the second bypass arithmetic unit 6232.

Figure 8:
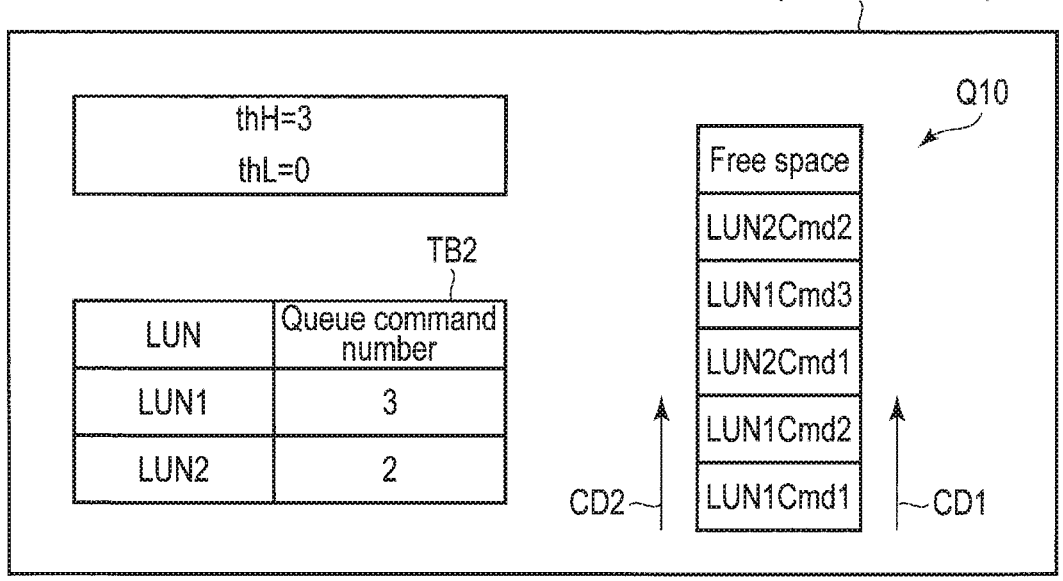
FIG. 8 is a schematic diagram showing an example of a method of determining the state of the bypass arithmetic process according to the first embodiment.

FIG. 8 is a schematic diagram showing an example of a method of determining a state of the bypass arithmetic process according to the present embodiment. In FIG. 8, the storage unit 6201 includes the synthetic queue Q10 shown in FIG. 4. In FIG. 8, QD of the synthetic queue Q10 is 6. In FIG. 8, QD of the queue corresponding to the actuator AC1 is 3, and QD of the queue corresponding to the actuator AC2 is 3. In FIG. 8, the storing directions CD1 and CD2 are the same direction but may be opposite directions. FIG. 8 shows the upper limit thH of the queue command numbers corresponding to the actuators AC1 and AC2, and the lower limit thL corresponding to the actuators AC1 and AC2. In FIG. 8, the upper limit thH is 3 and the lower limit thL is 0. Incidentally, the upper limit thH may be a value other than 3 and the lower limit thL may be a value other than 0. In FIG. 8, the queue command number corresponding to the actuator AC1 stored in the synthetic queue Q10 is 3, and the queue command number corresponding to the actuator AC2 stored in the synthetic queue Q1 is 2. FIG. 8 shows a table TB2 includes the queue command number corresponding to the actuator AC1 stored in the synthetic queue Q10 associated with LUN (LUN1), and the queue command number corresponding to the actuator AC2 stored in the synthetic queue Q10 associated with LUN (LUN2).

In the example shown in FIG. 8, the command number determination unit 6202 counts the queue command number (=3) corresponding to the actuator AC1 and the queue command number (=2) corresponding to the actuator AC2, which are stored in the synthetic queue Q10 if the storage unit 6202, and records each of the counted queue command number corresponding to the actuator AC1 and the counted queue command number corresponding to the actuator AC2, in association with LUN, in the table TB2.

In the example shown in FIG. 8, the command number determination unit 6202 determines that when the queue command number (=3) corresponding to the actuator AC stored in the synthetic queue Q10 of the storage unit 6201 is higher than or equal to the upper limit thH (=3) and when the queue command number (=0) corresponding to the actuator AC2 stored in the synthetic queue Q10 of the storage unit 6201 is higher than the lower limit thL (=0), the level of the queue command number corresponding to the actuator AC1 is a high level and the level of the queue command number corresponding to the actuator AC2 is a middle level.

In the example shown in FIG. 8, when it is determined by the command number determination unit 6202 that the level of the queue command number corresponding to the actuator AC1 is the high level and the level of the queue command number corresponding to the actuator AC2 is the middle level, the bypass arithmetic determination unit 6211 determines that the bypass arithmetic operation is invalid, by referring to the determination table TB1 shown in FIG. 6. The bypass arithmetic determination unit 6211 generates the invalid flag. The bypass arithmetic determination unit 6211 outputs the generated invalid flag to the first reordering arithmetic unit 6221, the second reordering arithmetic unit 6222, the first bypass arithmetic unit 6231, and the second bypass arithmetic unit 6232.

Figure 9:
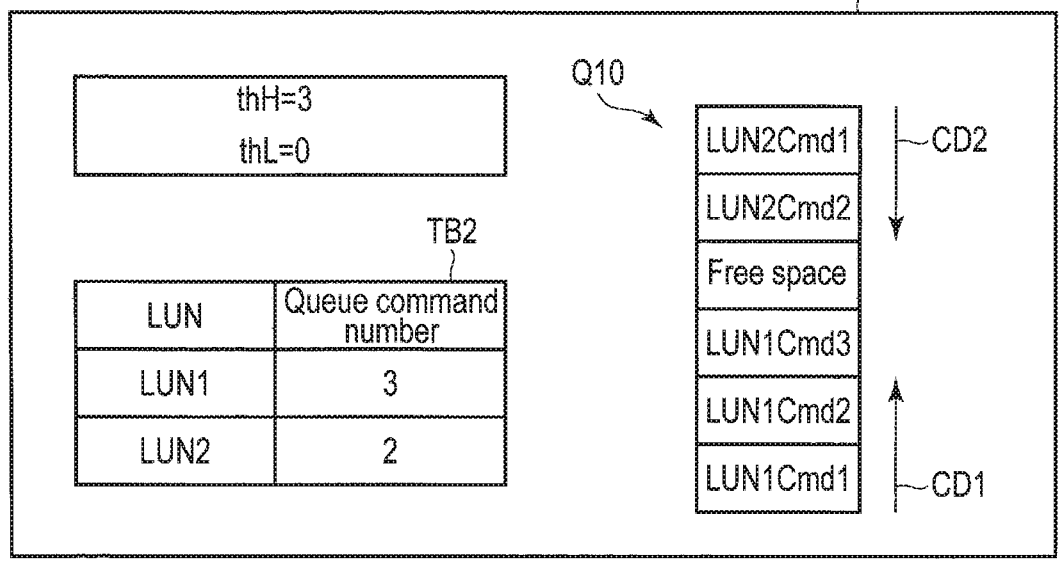
FIG. 9 is a schematic diagram showing an example of a method of determining the state of the bypass arithmetic process according to the first embodiment.

FIG. 9 is a schematic diagram showing an example of a method of determining a state of the bypass arithmetic process according to the present embodiment. In FIG. 9, the storage unit 6201 includes the synthetic queue Q10 shown in FIG. 5. In FIG. 9, QD of the synthetic queue Q10 is 6. In FIG. 9, QD of the queue corresponding to the actuator AC1 is 3, and QD of the queue corresponding to the actuator AC2 is 3. In FIG. 9, the storing directions CD1 and CD2 are the same direction but may be opposite directions. FIG. 9 shows the upper limit thH of the queue command numbers corresponding to the actuators AC1 and AC2, and the lower limit thL corresponding to the actuators AC1 and AC2. In FIG. 9, the upper limit thH is 3 and the lower limit thL is 0. Incidentally, the upper limit thH may be a value other than 3 and the lower limit thL may be a value other than 0. In FIG. 9, the queue command number corresponding to the actuator AC1 stored in the synthetic queue Q10 is 3, and the queue command number corresponding to the actuator AC2 stored in the synthetic queue Q10 is 2. FIG. 9 shows a table TB2 includes the queue command number corresponding to the actuator AC1 stored in the synthetic queue Q10 associated with LUN (LUN1), and the queue command number corresponding to the actuator AC2 stored in the synthetic queue Q10 associated with LUN (LUN2).

In the example shown in FIG. 9, the command number determination unit 6202 counts the queue command number (=3) corresponding to the actuator AC1 and the queue command number (=2) corresponding to the actuator AC2, which are stored in the synthetic queue Q10 of the storage unit 6201, and records each of the counted queue command number corresponding to the actuator AC1 and the counted queue command number corresponding to the actuator AC2, in association with LUN, in the table TB2.

In the example shown in FIG. 9, the command number determination unit 6202 determines that when the queue command number (=3) corresponding to the actuator AC1 stored in the synthetic queue Q10 of the storage unit 6201 is higher than or equal to the upper limit thH (=3) and when the queue command number (=0) corresponding to the actuator AC2 stored in the synthetic queue Q10 of the storage unit 6201 is higher than the lower limit thL (=0), the level of the queue command number corresponding to the actuator AC1 is a high level and the level of the queue command number corresponding to the actuator AC2 is a middle level.

In the example shown in FIG. 9, when it is determined by the command number determination unit 6202 that the level of the queue command number corresponding to the actuator AC1 is the high level and the level of the queue command number corresponding to the actuator AC2 is the middle level, the bypass arithmetic determination unit 6211 determines that the bypass arithmetic operation is invalid, by referring to the determination table TB1 shown in FIG. 6. The bypass arithmetic determination unit 6211 generates the invalid flag. The bypass arithmetic determination unit 6211 outputs the generated invalid flag to the first reordering arithmetic unit 6221, the second reordering arithmetic unit 6222, the first bypass arithmetic unit 6231, and the second bypass arithmetic unit 6232.

The communication unit 6212 transfers information. For example, the communication unit 6212 transfers the reordering information between the first reordering arithmetic unit 6221 and the second bypass arithmetic unit 6232. For example, the communication unit 6212 transfers the reordering information between the second reordering arithmetic unit 6222 and the first bypass arithmetic unit 6231. Incidentally, the communication unit 6212 may transfer the information between the first reordering arithmetic unit 6221 and the second reordering arithmetic unit 6222 or may transfer the information between the first bypass arithmetic unit 6231 and the second bypass arithmetic unit 6232. The communication unit 6212 may transfer the information between each part of the magnetic disk device 1 and each part of the command controller 620. In addition, the communication unit 6212 may transfer the information between the host 100 and each part of the command controller 620.

The first reordering arithmetic unit 6221 executes the reordering arithmetic process for a plurality of queue commands corresponding to the actuator AC1. For example, the first reordering arithmetic unit 6221 executes the reordering arithmetic process for a plurality of queue commands corresponding to the actuator AC1 received from the host 100 and the like, when processing the current command.

For example, based on the information on the current position of the head HD1, the information on a plurality of queue commands corresponding to the actuator AC1, and the reordering information corresponding to the actuator AC1 such as the reordering table corresponding to the actuator AC1, the first reordering arithmetic unit 6221 calculates each of access costs (hereinafter also referred to as next presumed costs) from the current position of the head HD1 to a plurality of positions specified by a plurality of queue commands (hereinafter also referred to as next to-be-processed commands) that can be processed next to the current commend, of the plurality of queue commands corresponding to the actuator AC1. To reduce the vibration of the magnetic disk device 1 and the influence from the power consumption, the first reordering arithmetic unit 6221 may adjust the access costs (next presumed costs) by weighting the calculated access costs (next presumed costs) (for example, multiplying or dividing by a particular value), offsetting (for example, adding or subtracting a particular value) in the radial direction the position of the disk DK where movement of the head HD1 starts or the position of the disk DK where the head HD1 moves to calculate the access costs (next presumed costs), and the like. Based on the results of the calculation process of the next presumed costs, the first reordering arithmetic unit 6221 selects low costs commands (or lowest cost commands) from the next to-be-processed commands, and reorders the order of the low cost commands (or lowest cost commands) selected from the next to-be-processed commands to a next order.

For example, the first reordering arithmetic unit 6221 calculates each of the next presumed costs based on the reordering information corresponding to the actuator AC1, and calculates each of the plurality of access costs (hereinafter also referred to as further next presumed costs) from a plurality of positions specified by a plurality of next to-beprocessed commands, of the plurality of queue commands corresponding to the actuator AC1, to a plurality of positions specified by a plurality of queue commands (hereinafter also referred to as further next to-be-processed commands) that can be processed further next to the current command, of the plurality of queue commands, based on the reordering information corresponding to the actuator AC1. In other words, the first reordering arithmetic unit 6221 calculates each of the next presumed costs based on the reordering information corresponding to the actuator AC1, and calculates each of the plurality of further next presumed costs from a plurality of positions specified by a plurality of next to-be-processed commands, of the plurality of queue commands corresponding to the actuator AC1, to different positions of different disks DK specified by the plurality of further next to-be-processed commands different from the next to-be-Processed commands, of the plurality of queue commands, based on the reordering information corresponding to the actuator AC1. Incidentally, to reduce the vibration of the magnetic disk device 1 and the influence from the power consumption, the first reordering arithmetic unit 6221 may adjust the access costs (further next presumed costs) by weighting the calculated access costs (further next presumed costs) (for example, multiplying or dividing by a particular value), offsetting (for example, adding or subtracting a particular value) in the radial direction the position of the disk DK where movement of the head HD1 starts or the position of the disk DK where the head HD1 moves to calculate the access costs (further next presumed costs), and the like. Based on the results of the calculation process of the next presumed costs and the further next presumed costs, the first reordering arithmetic unit 6221 selects low costs commands (or lowest cost commands) from the next to-be-processed commands, and reorders the order of the low cost commands (or lowest cost commands) selected from the next to-be-processed commands to a next order.

For example, the first reordering arithmetic unit 6221 may record the reordering information corresponding to the actuator AC1 in a particular recording area, for example, the system area DKb of the disk DK, the volatile memory 70, the buffer memory 80, the nonvolatile memory 90, or the like. Incidentally, the first reordering arithmetic unit 6221 may record the reordering information corresponding to the actuator AC1 other than the reordering table corresponding to the actuator AC1 in a particular recording area, for example, the system area DKb of the disk DK, the volatile memory 70, the buffer memory 80, the nonvolatile memory 90, or the like. In this case, the first reordering arithmetic unit 6221 may record the reordering table corresponding to the actuator AC1 in a particular recording area, for example, the system area DKb of the disk DK, the volatile memory 70, the buffer memory 80, the nonvolatile memory 90, or the like, separately from the reordering information corresponding to the actuator AC1. The first reordering arithmetic unit 6221 may record the reordering table corresponding to each actuator AC, for example, the reordering table corresponding to the actuator AC1 and the reordering table corresponding to the actuator AC2 in a particular recording area, for example, the system area DKb of the disk DK, the volatile memory 70, the buffer memory 80, the nonvolatile memory 90, or the like. The first reordering arithmetic unit 6221 may record the reordering table corresponding to a plurality of actuators AC, for example, the reordering table corresponding to the actuators AC1 and AC2 in a particular recording area, for example, the system area DKb of the disk DK, the volatile memory 70, the buffer memory 80, the nonvolatile memory 93, or the like. The first reordering arithmetic unit 6221 may calculate the reordering table corresponding to the actuator AC1. The first reordering arithmetic unit 6221 may calculate the reordering table corresponding to the actuator AC1 and the reordering table corresponding to the actuator AC2. In addition, the first reordering arithmetic unit 6221 may calculate the reordering table corresponding to the actuators AC1 and AC2.

For example, when the valid flag which validates the bypass arithmetic operation using the surplus arithmetic resource corresponding to the actuator AC2, and the transferring direction flag which transfers the reordering information corresponding to the actuator AC1 to the second bypass arithmetic unit 6232 are input, the first reordering arithmetic unit 6221 transfers the reordering information corresponding to the actuator AC1 to the second bypass arithmetic unit 6232 via the communication unit 6212. Incidentally, when the valid flag which validates the bypass arithmetic operation using the surplus arithmetic resource corresponding to the actuator AC2, and the transferring direction flag which transfers the reordering information corresponding to the actuator AC1 to the second bypass arithmetic unit 6232 are input, the first reordering arithmetic unit 6221 may transfer the reordering information other than the reordering table corresponding to the actuator AC1 to the second bypass arithmetic unit 6232 via the communication unit 6212. In addition, when the valid flag which validates the bypass arithmetic operation using the surplus arithmetic resource corresponding to the actuator AC1, and the transferring direction flag which transfers the reordering information corresponding to the actuator AC2 to the first bypass arithmetic unit 6231 are input, the first reordering arithmetic unit 6221 may transfer the reordering information corresponding to each actuator to the first bypass arithmetic unit 6231 via the communication unit 6212.

Based on both the calculation results of the calculation process of the plurality of access costs of the plurality of queue commands corresponding to the actuator AC1, and the calculation results of the bypass arithmetic process calculating the plurality of access costs of the plurality of queue commands corresponding to the actuator AC1, which are transferred from the second bypass arithmetic unit 6232, the first reordering arithmetic unit 6221 selects the low cost commands (or the lowest cost commands) from the plurality of queue commands corresponding to the actuator AC1, and reorders the order of the low cost commands (or the lowest cost commands) selected from the plurality of queue commands, to a next order.

For example, based on both the calculation results of the calculation process of several next presumed costs of several next to-be-processed commands, of the plurality of queue commands corresponding to the actuator AC1, and the calculation results of the calculation process of several next presumed costs of several next to-be-processed commands, of the plurality of queue commands corresponding to the actuator AC1, which are transferred from the second bypass arithmetic unit 6232, the first reordering arithmetic unit 6221 selects the low cost commands (or the lowest cost commands) from the plurality of next to-be-processed commands corresponding to the actuator AC1, and reorders the order of the low cost commands (or the lowest cost commands) selected from the plurality of next to-be-processed commands corresponding to the actuator AC1, to a next order.

For example, based on both the calculation results of the calculation process of the plurality of next presumed costs of the plurality of next to-be-processed commands corresponding to the actuator AC1, and the calculation results of calculation of the plurality of further next presumed costs of the plurality of further next to-be-processed commands corresponding to the actuator AC1, which are transferred from the second bypass arithmetic unit 6232, the first reordering arithmetic unit 6221 selects the low cost commands (or the lowest cost commands) from the next to-be-processed commands corresponding to the actuator AC1, and reorders the order of the low cost commands (or the lowest cost commands) selected from the plurality of next to-be-processed commands corresponding to the actuator AC1, to a next order.

The second reordering arithmetic unit 6222 executes the reordering arithmetic process for a plurality of queue commands corresponding to the actuator AC2. For example, the second reordering arithmetic unit 6222 executes the reordering arithmetic process for a plurality of queue commands corresponding to the actuator AC2 received from the host 100 and the like, when processing the current command.

For example, based on the information on the current position of the head HD2, the information on a plurality of queue commands corresponding to the actuator AC2, and the reordering information corresponding to the actuator AC2 such as the reordering table corresponding to the actuator AC2, the second reordering arithmetic unit 6222 calculates each of the next presumed costs from the current position of the head HD2 to a plurality of positions specified by a plurality of next to-be-processed commands, of the plurality of queue commands corresponding to the actuator AC2. Incidentally, to reduce the vibration of the magnetic disk device 1 and the influence from the power consumption, the second reordering arithmetic unit 6222 may adjust the access costs (next presumed costs) by weighting the calculated access costs (next presumed costs) (for example, multiplying or dividing by a particular value), offsetting (for example, adding or subtracting a particular value) in the radial direction the position of the disk DK where movement of the head HD2 starts or the position of the disk DK where the head HD1 moves to calculate the access costs (next presumed costs), and the like. Based on the results of the calculation process of the next presumed costs, the second reordering arithmetic unit 6222 selects low costs commands (or lowest cost commands) from the next to-be-processed commands, and reorders the order of the low cost commands (or lowest cost commands) selected from the next to-be-processed commands to a next order. The reordering table corresponding to the actuator AC2 may be the same as or different from the reordering table corresponding to the actuator AC1.

For example, the second reordering arithmetic unit 6222 calculates each of the next presumed costs, based on the reordering information corresponding to the actuator AC2, and calculates each of the plurality of further next presumed costs, of the plurality of further next to-be-processed commands, of the plurality of queue commands corresponding to the actuator AC2, based on the reordering information corresponding to the actuator AC2. In other words, the second reordering arithmetic unit 6222 calculates each of the next presumed costs based on the reordering information corresponding to the actuator AC2, and calculates each of the plurality of further next presumed costs from a plurality of positions specified by a plurality of next to-be-processed commands, of the plurality of queue commands corresponding to the actuator AC2, to different positions of different disks DK specified by the plurality of further next t-be-processed commands different from the next to-be-processed commands, of the plurality of queue commands, based on the reordering information corresponding to the actuator AC2. Incidentally, to reduce the vibration of the magnetic disk device 1 and the influence from the power consumption, the second reordering arithmetic unit 6222 may adjust the access costs (further next presumed costs) by weighting the calculated access costs (further next presumed costs) (for example, multiplying or dividing by a particular value), offsetting (for example, adding or subtracting a particular value) in the radial direction the position of the disk DK where movement of the head HD1 starts or the position of the disk DK where the head HD1 moves to calculate the access costs (further next presumed costs), and the like. Based on the results of the calculation process of the next presumed costs and the further next presumed costs, the second reordering arithmetic unit 6222 selects low costs commands (or lowest cost commands) from the next to-be-processed commands, and reorders the order of the low cost commands (or lowest cost commands) selected from the next to-be-processed commands to a next order.

For example, the second reordering arithmetic unit 6222 may record the reordering information corresponding to the actuator AC2 in a particular recording area, for example, the system area DKb of the disk DK, the volatile memory 70, the buffer memory 80, the nonvolatile memory 90, or the like. Incidentally, the second reordering arithmetic unit 6222 may record the reordering information corresponding to the actuator AC2 other than the reordering table corresponding to the actuator AC2, in a particular recording area, for example, the system area DKb of the disk DK, the volatile memory 70, the buffer memory 80, the nonvolatile memory 90, or the like. In this case, the second reordering arithmetic unit 6222 may record the reordering table corresponding to the actuator AC2 in a particular recording area, for example, the system area DKb of the disk DK, the volatile memory 70, the buffer memory 80, the nonvolatile memory 90, or the like, separately from the reordering information corresponding to the actuator AC2. The second reordering arithmetic unit 6222 may record the reordering table corresponding to each actuator AC, for example, the reordering table corresponding to the actuator AC1 and the reordering table corresponding to the actuator AC2 is particular recording area, for example, the system area DKb of the disk DK, the volatile memory 70, the buffer memory 80, the nonvolatile memory 90, or the like. The second reordering arithmetic unit 6222 may record the reordering table corresponding to a plurality of actuators AC, for example, the reordering table corresponding to the actuators AC1 and AC2 in a particular recording area, for example, the system area DKb of the disk DK, the volatile memory 70, the buffer memory 80, the nonvolatile memory 90, or the like. The second reordering arithmetic unit 6222 may calculate the reordering table corresponding to the actuator AC2. The second reordering arithmetic unit 6222 may calculate the reordering table corresponding to the actuator AC1 and the reordering table corresponding to the actuator AC2. In addition, the second reordering arithmetic unit 6222 may calculate the reordering table corresponding to the actuators AC1 and AC2.

For example, when the valid flag which validates the bypass arithmetic operation using the surplus arithmetic resource corresponding to the actuator AC1, and the transferring direction flag which transfers the reordering information corresponding to the actuator AC2 to the first bypass arithmetic unit 6231 are input, the second reordering arithmetic unit 6222 transfers the reordering information corresponding to the actuator AC2 to the first bypass arithmetic unit 6231 via the communication unit 6212. Incidentally, when the valid flag which validates the bypass arithmetic operation using the surplus arithmetic resource corresponding to the actuator AC1, and the transferring direction flag which transfers the reordering information corresponding to the actuator AC2 to the first bypass arithmetic unit 6231 are input, the second reordering arithmetic unit 6222 may transfer the reordering information other than the reordering table corresponding to the actuator AC2 to the first bypass arithmetic unit 6231 via the communication unit 6212. In addition, when the valid flag which validates the bypass arithmetic operation using the surplus arithmetic resource corresponding to the actuator AC2, and the transferring direction flag which transfers the reordering information corresponding to the actuator AC1 to the second bypass arithmetic unit 6232 are input, the second reordering arithmetic unit 6222 may transfer the reordering information corresponding to each actuator to the second bypass arithmetic unit 6232 via the communication unit 6212.

Based on both the calculation results of the calculation process of the plurality of access costs of the plurality of queue commands corresponding to the actuator AC2, and the calculation results of the bypass arithmetic process calculating the plurality of access costs of the plurality of queue command corresponding to the actuator AC2, which are transferred from the first bypass arithmetic unit 6231, the second reordering arithmetic unit 6222 selects the low cost commands (or the lowest cost commands) from the plurality of queue commands corresponding to the actuator AC2, and reorders the order of the low cost commands (or the lowest cost commands) selected from the plurality of queue commands, to a next order.

For example, based on both the calculation results of the calculation process of several next presumed costs of several next to-be-processed commands, of the plurality of queue commands corresponding to the actuator AC2, and the calculation results of the calculation process of several next presumed costs of several next to-be-processed commands, of the plurality of queue commands corresponding to the actuator AC2, which are transferred from the first bypass arithmetic unit 6231, the second reordering arithmetic unit 6222 selects the low cost commands (or the lowest cost commands) from the plurality of queue commands corresponding to the actuator AC2, and reorders the order of the low cost commands (or the lowest cost commands) selected from the plurality of next to-be-processed commands corresponding to the actuator AC2, to a next order.

For example, based on both the calculation results of the calculation process of the plurality of next presumed costs of the plurality of next to-be-processed commands corresponding to the actuator AC2, and the calculation results of calculation of the plurality of further next presumed costs of the plurality of further next to-be-processed commands corresponding to the actuator AC2, which are transferred from the first bypass arithmetic unit 6231, the second reordering arithmetic unit 6222 selects the low cost commands (or the lowest cost commands) from the next to-be-processed commands corresponding to the actuator AC2, and reorders the order of the low cost commands (or the lowest cost commands) selected from the plurality of next to-be-processed commands corresponding to the actuator AC2, to a next order.

The first bypass arithmetic unit 6231 executes the bypass arithmetic process by the surplus arithmetic resource corresponding to the actuator AC1 and transfers the arithmetic result of the bypass arithmetic process. In other words, when a free space (surplus arithmetic resource) is contained in the arithmetic resource corresponding to the actuator AC1, the first bypass arithmetic unit 6231 executes the reordering arithmetic process (or the bypass arithmetic process equivalent to partial arithmetic process of the reordering arithmetic process) corresponding to the actuator AC2. For example, based on the reordering information corresponding to the actuator AC2, which is transferred from the second reordering arithmetic unit 6222, by the surplus arithmetic resource corresponding to the actuator AC1, the first bypass arithmetic unit 6231 executes the bypass arithmetic process of calculating each of the plurality of access costs of the plurality of queue commands corresponding to the actuator AC2, and transfers the arithmetic results of the bypass arithmetic process to the second reordering arithmetic unit 6222 via the communication unit 6212.

For example, based on the reordering information corresponding to the actuator AC2, by the surplus arithmetic resource corresponding to the actuator AC1, the first bypass arithmetic unit 6231 executes the bypass arithmetic process of calculating each of at least one next presumed cost of each of at least one next to-be-processed command, of the plurality of queue commands corresponding to the actuator AC2, and transfers the arithmetic (calculation) results of the bypass arithmetic process to the second reordering arithmetic unit 6222 via the communication unit 6212. In other words, based on the reordering information corresponding to the actuator AC2, by the surplus arithmetic resource corresponding to the actuator AC1, the first bypass arithmetic unit 6231 executes the bypass arithmetic process of calculating each of at least one next presumed cost of each of at least one next to-be-processed command, which is not processed by the second reordering arithmetic unit 6222, of the plurality of queue commands corresponding to the actuator AC2, and transfers the arithmetic (calculation) results of the bypass arithmetic process to the second reordering arithmetic unit 6222 via the communication unit 6212. Incidentally, to reduce the vibration of the magnetic disk device 1 and the influence from the power consumption, the first bypass arithmetic unit 6231 may adjust the access costs (next presumed costs) by weighting the calculated access costs (next presumed costs) (for example, multiplying or dividing by a particular value), offsetting (for example, adding or subtracting a particular value) in the radial direction the position of the disk DK where movement of the head HD2 starts or the position of the disk DK where the head HD2 moves to calculate the access costs (next presumed costs), and the like.

For example, based on the reordering information corresponding to the actuator AC2, by the surplus arithmetic resource corresponding to the actuator AC1, the first bypass arithmetic unit 6231 executes the bypass arithmetic process of calculating each of the plurality of further next presumed costs of each of the plurality of further next to-be-processed commands corresponding to the actuator AC2, and transfers the arithmetic results of the bypass arithmetic process to the second reordering arithmetic unit 6222 via the communication unit 6212. Incidentally, based on both the reordering information corresponding to the actuator AC2, which is transferred from the second reordering arithmetic unit 6222, by the surplus arithmetic resource corresponding to the actuator AC1, and the reordering table corresponding to the actuator AC2, which is input from the first reordering arithmetic unit 6221, the first bypass arithmetic unit 6231 may execute the bypass arithmetic process of calculating each of the plurality of access costs of the plurality of queue commands corresponding to the actuator AC2, and transfer the arithmetic results of the bypass arithmetic process to the second reordering arithmetic unit 6222 via the communication unit 6212. Based on both the reordering information corresponding to the actuator AC2, which is transferred from the second reordering arithmetic unit 6222, by the surplus arithmetic resource corresponding to the actuator AC1, and the reordering table corresponding to each of the actuator AC, which is input from the first reordering arithmetic unit 6221, the first bypass arithmetic unit 6231 may execute the bypass arithmetic process of calculating each of the plurality of access costs of the plurality of queue commands corresponding to the actuator AC2, and transfer the arithmetic results of the bypass arithmetic process to the second reordering arithmetic unit 6222 via the communication unit 6212. For example, the first reordering arithmetic unit 6221 and the first bypass arithmetic unit 6231 may correspond to the arithmetic source corresponding to the actuator AC1. For example, the first bypass arithmetic unit 6231 may correspond to the surplus arithmetic source corresponding to the actuator AC. The first bypass arithmetic unit 6231 may be included in the first reordering arithmetic unit 6221. In addition, to reduce the vibration of the magnetic disk device 1 and the influence from the power consumption, the first bypass arithmetic unit 6231 may adjust the access costs (next presumed costs) by weighting the calculated access costs (further next presumed costs) (for example, multiplying or dividing by a particular value), offsetting (for example, adding or subtracting a particular value) in the radial direction the position of the disk DK where movement of the head HD2 starts or the position of the disk DK where the head HD2 moves to calculate the access costs (next presumed costs), and the like.

The second bypass arithmetic unit 6232 executes the bypass arithmetic process by the surplus arithmetic resource corresponding to the actuator AC2 and transfers the arithmetic result of the bypass arithmetic process. In other words, when a free space (surplus arithmetic resource) is contained in the arithmetic rescore corresponding to the actuator AC2, the second bypass arithmetic unit 6232 executes the reordering arithmetic process (or the bypass arithmetic process equivalent to partial arithmetic process of the reordering arithmetic process) corresponding to the actuator AC1. For example, based on the reordering information corresponding to the actuator AC1, which is transferred from the first reordering arithmetic unit 6221, by the surplus arithmetic resource corresponding to the actuator AC1, the second bypass arithmetic unit 6232 executes the bypass arithmetic process of calculating each of the plurality of access costs of the plurality of queue commands corresponding to the actuator AC1, and transfers the arithmetic results of the bypass arithmetic process to the first reordering arithmetic unit 6221 via the communication unit 6212.

For example, based on the reordering information corresponding to the actuator AC1, by the surplus arithmetic resource corresponding to the actuator AC2, the second bypass arithmetic unit 6232 executes the bypass arithmetic process of calculating each of at least one next presumed cost of each of at least one next to-be-processed command, of the plurality of queue commands corresponding to the actuator AC1, and transfers the arithmetic (calculation) results of the bypass arithmetic process to the second reordering arithmetic unit 6222 via the communication unit 6212. In other words, based on the reordering information corresponding to the actuator AC1, by the surplus arithmetic resource corresponding to the actuator AC2, the second bypass arithmetic unit 6232 executes the bypass arithmetic process of calculating each of at least one next presumed cost of each of at least one next to-be-processed command, which is not processed by the first reordering arithmetic unit 6221, of the plurality of queue commands corresponding to the actuator AC1, and transfers the arithmetic (calculation) results of the bypass arithmetic process to the first reordering arithmetic unit 6221 via the communication unit 6212. Incidentally, to reduce the vibration of the magnetic disk device 1 and the influence from the power consumption, the second bypass arithmetic unit 6232 may adjust the access costs (further next presumed costs) by weighting the calculated access costs (further next presumed costs) (for example, multiplying or dividing by a particular value), offsetting (for example, adding or subtracting a particular value) in the radial direction the position of the disk DK where movement of the head HD1 starts or the position of the disk DK where the head HD1 moves to calculate the access costs (further next presumed costs), and the like.

For example, based on the reordering information corresponding to the actuator AC1, by the surplus arithmetic resource corresponding to the actuator AC2, the second bypass arithmetic unit 6232 executes the bypass arithmetic process of calculating each of the plurality of further next presumed costs of each of the plurality of further next to-be-processed commands corresponding to the actuator AC1, and transfers the arithmetic results of the bypass arithmetic process to the first reordering arithmetic unit 6221 via the communication unit 6212. Incidentally, based on both the reordering information corresponding to the actuator AC1, which is transferred from the first reordering arithmetic unit 6221, by the surplus arithmetic resource corresponding to the actuator AC2, and the reordering table corresponding to the actuator AC1, which is input from the second reordering arithmetic unit 6222, the second bypass arithmetic unit 6232 may execute the bypass arithmetic process of calculating each of the plurality of access costs of the plurality of queue commands corresponding to the actuator AC1, and transfer the arithmetic results of the bypass arithmetic process to the first reordering arithmetic unit 6221 via the communication unit 6212. Based on both the reordering information corresponding to the actuator AC1, which is transferred from the first reordering arithmetic unit 6221, by the surplus arithmetic resource corresponding to the actuator AC1, and the reordering table corresponding to each of the actuator AC, which is input from the second reordering arithmetic unit 6222, the second bypass arithmetic unit 6232 may execute the bypass arithmetic process of calculating each of the plurality of access costs of the plurality of queue commands corresponding to the actuator AC1, and transfer the arithmetic results of the bypass arithmetic process to the first reordering arithmetic unit 6221 via the communication unit 6212. For example, the second reordering arithmetic unit 6222 and the second bypass arithmetic unit 6232 may correspond to the arithmetic source corresponding to the actuator AC2. For example, the second bypass arithmetic unit 6232 may correspond to the surplus arithmetic source corresponding to the actuator AC2. The second bypass arithmetic unit 6232 may be included in the second reordering arithmetic unit 6222. In addition, to reduce the vibration of the magnetic disk device 1 and the influence from the power consumption, the second bypass arithmetic unit 6232 may adjust the access costs (further next presumed costs) by weighting the calculated access costs (further next presumed costs) (for example, multiplying or dividing by a particular value), offsetting (for example, adding or subtracting a particular value) in the radial direction the position of the disk DK where movement of the head HD1 starts or the position of the disk DK where the head HD1 moves to calculate the access costs (further next presumed costs), and the like.

Figure 10:
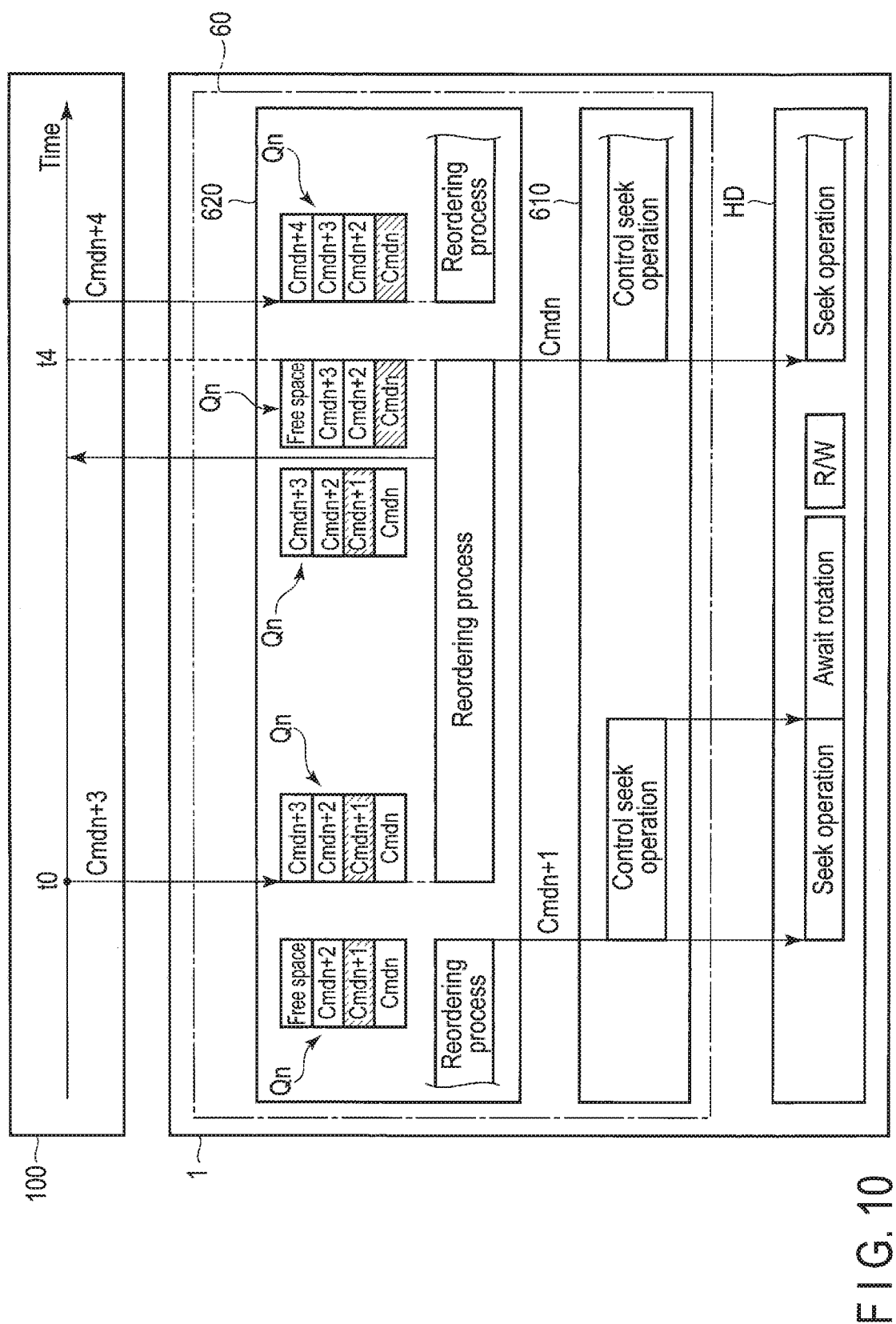
FIG. 10 is a schematic diagram showing an example of a method of processing a queue command stored in a queue.

FIG. 10 is a schematic diagram showing an example of a method of processing the queue command stored in a queue Qn. FIG. 10 shows the host 100 and the magnetic disk device 1. In FIG. 10, the magnetic disk device 1 comprises the HDC 60 and the head HD. In FIG. 10, the HDC 60 comprises the servo controller 610 and the command controller 620. In FIG. 1, the command controller 620 includes the queue Qn corresponding to a particular actuator AC, for example, the actuator AC1 or AC2. In FIG. 10, a horizontal axis is indicative of a time. In FIG. 10, the time passes toward a distal end of an arrow of the horizontal axis of the time. FIG. 10 shows time t0 and time t4. The time t4 is equivalent to the time delayed from (later than) the time t0. In FIG. 10, the commands Cmdn, Cmdn+1, Cmdn+2, Cmdn+3, and Cmdn+4 are commands corresponding to a particular actuator AC. The command Cmdn is equivalent to the queue command which is transferred earlier than (before) the command Cmdn+1, from the host 100 to the command controller 620 and stored in the queue Qn of a particular actuator AC. The command Cmdn+1 is equivalent to the queue command which is transferred earlier than (before) the command Cmdn+2, from the host 100 to the command controller 620 and stored in the queue Qn of a particular actuator AC. The command Cmdn+2 is equivalent to the queue command which is transferred earlier than (before) the command Cmdn+3, from the host 100 to the command controller 620 and stored in the queue Qn of a particular actuator AC. The command Cmdn+3 is equivalent to the queue command which is transferred earlier than (before) the command Cmdn+4, from the host 100 to the command controller 620 and stored in the queue Qn of a particular actuator AC. In FIG. 10, QD of the queue Qn corresponding to the particular actuator AC is 4.

In the example shown in FIG. 10, the magnetic disk device 1 executes the reordering arithmetic process for the queue commands Cmdn, Cmdn+1, and Cmdn+2 and processes the queue command Cmdn+1 selected as the lowest cost command. Based on the queue command Cmdn+1, the magnetic disk device 1 starts control of the seek operation of the head HD corresponding to a particular actuator AC, for example, the actuator AC1 (or the actuator AC2), and starts the seek operation of the head HD from the sector (hereinafter also referred to as a current sector) of the track (hereinafter also referred to as a current track) where the head HD, for example, the head HD1 (or the head HD2) is currently arranged to a particular sector of a particular track specified by the queue command Cmdn+1. The magnetic disk device 1 awaits rotation to position the head HD to a particular sector when seeking the head HD from the current track to a particular track specified by the queue command Cmdn+1, and writes data specified by the queue command Cmdn+1 or reads the data written to the sector specified by the queue command Cmdn+1 when positioning the head HD to the particular sector.

The magnetic disk device 1 receives the command Cmdn+2 corresponding to a particular actuator AC transferred from the host 100, at the time t0 at which the queue command Cmdn+1 is processed. Since QD of the queue Qn corresponding to a particular actuator AC is 4 and the queue command number corresponding to the particular actuator AC is 3, the magnetic disk device 1 stores the command Cmdn+3 corresponding to the actuator AC received from the host 100, in the queue Qn corresponding to the particular actuator AC. The magnetic disk device 1 executes the reordering arithmetic process for the queue commands Cmdn, Cmdn+2, and Cmdn+3 and selects Cmdn as the lowest cost command, when processing the queue command Cmdn+1.

The magnetic disk device 1 starts the processing of Cmdn at time t4 after the processing of the queue command Cmdn+1 is completed. Based on the queue command Cmdn, the magnetic disk device 1 starts control of the seek operation of the head HD corresponding to a particular actuator AC, and the head HD starts the seek operation of the head HD from the current sector to a particular sector of a particular track specified by the queue command Cmdn.

The magnetic disk device 1 receives the command Cmdn+4 corresponding to a particular actuator AC transferred from the host 100, when processing the Queue command Cmdn. Since QD of the queue Qn corresponding to a particular actuator AC is 4 and the queue command number corresponding to the particular actuator AC is 3, the magnetic disk device 1 stores the command Cmdn+4 corresponding to the particular actuator AC received from the host 100, in the queue Qn corresponding to the particular actuator AC.

Figure 11:
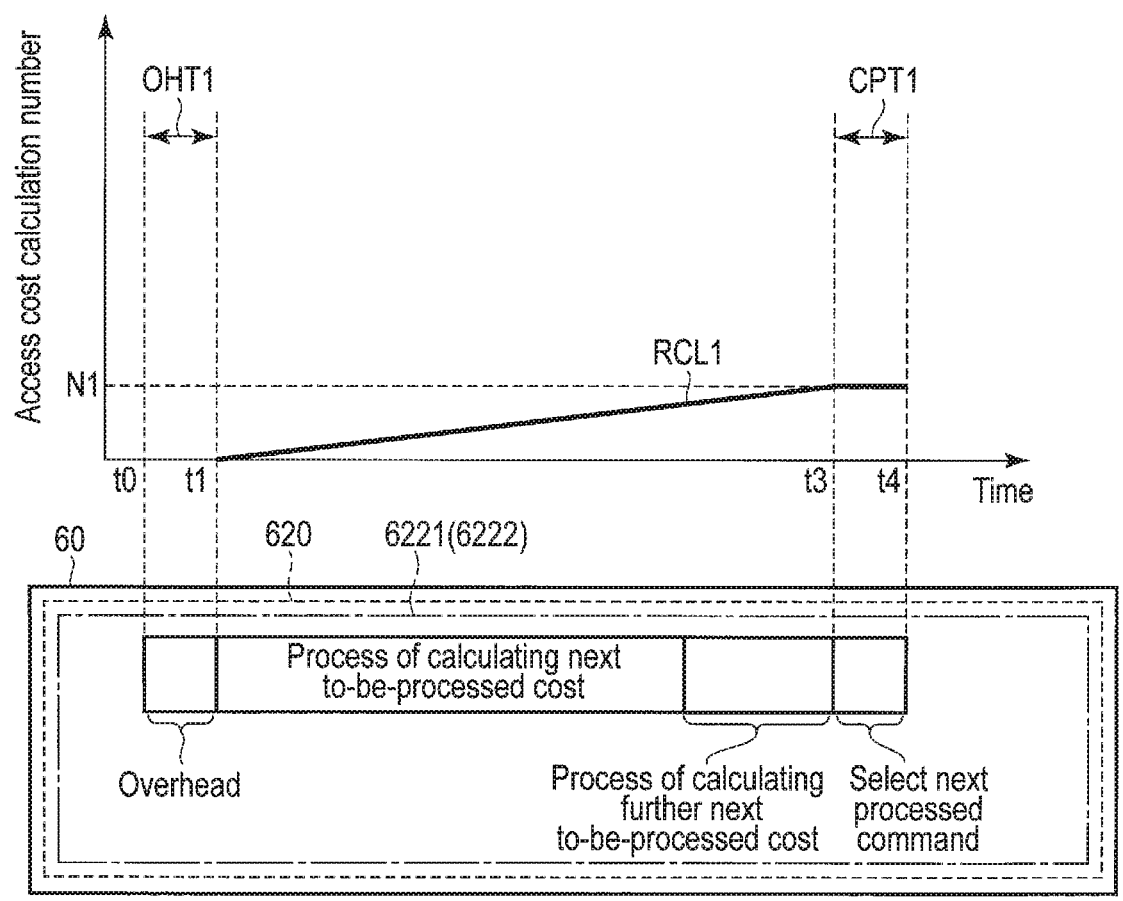
FIG. 11 is a schematic diagram showing an example of the reordering arithmetic process to the queue command shown in FIG. 10.

FIG. 11 is a schematic diagram showing an example of the reordering arithmetic process to the queue command shown in FIG. 10. In FIG. 11, the HDC 60 comprises the command controller 620. In FIG. 11, the command controller 620 comprises the first reordering arithmetic unit 6221 (or the second reordering arithmetic unit 6222). In FIG. 11, the horizontal axis is indicative of the time, and the vertical axis is indicative of the number of the calculation process of the access costs (hereinafter also referred to as an access cost calculation number). On the horizontal axis of FIG. 11, the time passes toward a distal end of an arrow of the horizontal axis. On the horizontal axis of FIG. 11, time t0, time t1, time t3, and time t4 are shown. In FIG. 11, the time t0 corresponds to the time t0 shown in FIG. 10, and the time t4 corresponds to the time t4 shown in FIG. 10. In FIG. 11, the time t1 is equivalent to the time delayed from (later than) the time t0, the time t3 is equivalent to the time delayed from (later than) the time t1, and the time t4 is equivalent to the time delayed from (later than) the time t3. In FIG. 11, time interval OHT1 is equivalent to the time interval between the time t0 and the time t1, and time interval CPT1 is equivalent to the time interval between the time t3 and the time t4. The time interval OHT1 is equivalent to the time at which overhead occurs. The time interval CPT1 is equivalent to the time at which a next process command is selected from a plurality of next process estimation commands corresponding to a particular actuator AC, for example, the actuator AC1 (or the actuator AC2). On the vertical axis of FIG. 11, the access cost calculation number becomes larger toward a distal end of an arrow of the vertical axis. On the vertical axis of FIG. 11, access cost calculation number N1 is shown. In FIG. 11, the access cost calculation number N1 is equivalent to the access cost calculation number which can be calculated by the first reordering arithmetic unit 6221 (or the second reordering arithmetic unit 6222) during a period between the time t1 and the time t3. In FIG. 11, a variation RCL 1 of the access cost calculation number to the time (hereinafter also simply referred to a variation of the access cost calculation number) is shown. FIG. 11 shows the HDC 60.

In the example shown in FIG. 11, the first reordering arithmetic unit 6221 (or the second reordering arithmetic unit 6222) receives the command Cmdn+3 corresponding to the actuator AC1 (or the actuator AC2) from the host 100 at the time t0 as shown in FIG. 10, and overhead occurs from the time t0 until the time t1 after the time interval OHT1. The first reordering arithmetic unit 6221 (or the second reordering arithmetic unit 6222) calculates a plurality of next presumed costs and a plurality of further next presumed costs of each of the queue commands Cmdn, Cmdn+2, and Cmdn+3, for the access cost calculation number N1, based on the reordering information corresponding to the actuator AC1 (or the actuator AC2), from the time t1 until the time t3. For example, the first reordering arithmetic unit 6221 (or the second reordering arithmetic unit 6222) may not be able to complete the calculation process of all of the plurality of next presumed costs and the plurality of further next presumed costs of each of the queue commands Cmdn, Cmdn+2, and Cmdn+3, for the access cost calculation number N1, which can be calculated in a period between the time t1 and the time t3.

The first reordering arithmetic unit 6221 (or the second reordering arithmetic unit 6222) selects the queue command Cmdn as the next processed command (low cost command or lowest cost command), from the plurality of next to-be-processed commands, for example, the queue commands Cmdn, Cmdn+1, and Cmdn+2, based on the next presumed costs and the further next presumed costs for the access cost calculation number N1, from the time 3 at which the calculation process of the next presumed costs and further next presumed costs for the access cost calculation number N1 is completed until the time t4 after the time interval CPT1.

Figure 12:
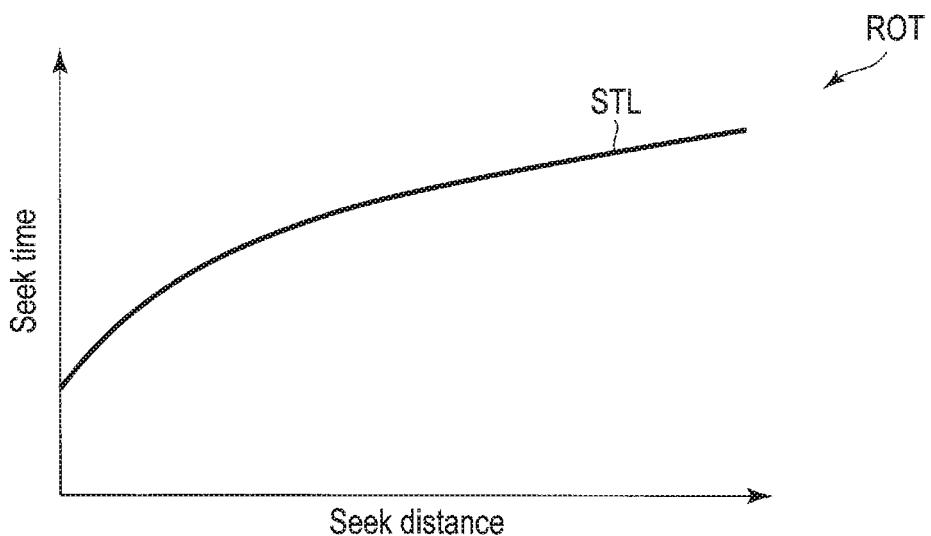
FIG. 12 is a schematic diagram showing an example of a reordering table corresponding to a particular actuator.

FIG. 12 is a schematic diagram showing an example of a reordering table ROT corresponding to a particular actuator AC. In the example shown in FIG. 12, the vertical axis is indicative of a seek time, and the horizontal axis is indicative of a seek distance. On the vertical axis of FIG. 12, the seek time passes toward a distal end of an arrow of the vertical axis. On the horizontal axis of FIG. 12, the seek distance passes toward a distal end of an arrow of the horizontal axis. In FIG. 12, a variation STL of the seek time to the seek distance (hereinafter also simply referred to a variation of the seek time) is shown. In FIG. 12, the variation STL of the seek time is a sequential curve but may be a set of a plurality of discretely arranged points.

Based on the reordering table ROT corresponding to a particular actuator AC, for example, the actuator AC1 or AC2, which is shown in FIG. 12, the HDC 60 (first reordering arithmetic unit 6221, second reordering arithmetic unit 6222, first bypass arithmetic unit 6231, second bypass arithmetic unit 6232, and the like; executes the reordering arithmetic process of the plurality of queue commands corresponding to the particular actuator AC. For example, based on the reordering table ROT corresponding to a particular actuator AC, which is shown in FIG. 12, and the reordering information such as information, and the like on each of a plurality of distances (seek distances) from a particular position of the head HD corresponding to the particular actuator AC to a plurality of positions of the disk DK that are specified by the plurality of queue commands corresponding to the particular actuator AC, the HDC 60 calculates each of the plurality of access costs (seek times) from the particular position of the head HD corresponding to the particular actuator AC to the plurality of positions specified by the plurality of queue commands corresponding to the particular actuator AC. Incidentally, when the variation STL of the seek time of the reordering table ROT shown in FIG. 12 is a set of a plurality of points discretely arranged, the HDC 60 may calculate the seek time corresponding to each of the distances (seek distances) from the particular position of the head HD corresponding to the particular actuator AC, to a plurality of positions of the disk DK specified by the plurality of queue commands corresponding to the particular actuator AC, in the variation STL of the seek time shown in FIG. 12, by interpolation (for example, linear interpolation, polynomial approximation, or the like).

Figure 13:
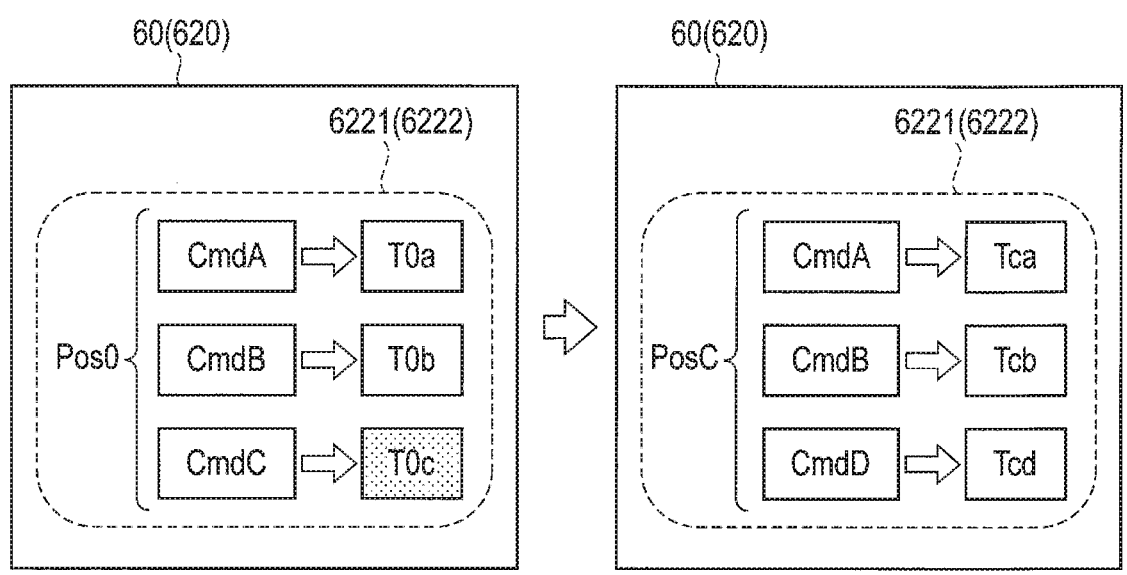
FIG. 13 is a schematic diagram showing an example of the reordering arithmetic process.

FIG. 13 is a schematic diagram showing an example of the reordering arithmetic process. FIG. 13 shows the HDC 60 (command controller 620). The HDC 60 (command controller 620) comprises the first reordering arithmetic unit 6221 (or the second reordering arithmetic unit 6222). In FIG. 13, Pos0 is equivalent to a position (sector) of the head HD, for example, head HD1 or HD2, corresponding to a particular actuator, for example, the actuator AC1 or AC2. In FIG. 13, next to-be-processed commands CmdA, CmdB, CmdC, and CmdD stored in the queue corresponding to a particular actuator AC are shown. In FIG. 13, a next presumed cost T0a is equivalent to the access cost from the position (sector) Pos0 to a position (sector) specified by the next to-be-processed command CmdA. A next presumed cost T0b is equivalent to the access cost from the position (sector) Pos0 to a position (sector) specified by the next to-be-processed command CmdA. A next presumed cost T0c is equivalent to the access cost from the position (sector) Pos0 to a position (sector) specified by the next to-be-processed command CmdC. In FIG. 13, PosC is equivalent to a position (sector) of the head HD, for example, head HD1 or HD2, corresponding to a particular actuator AC, for example, the actuator AC1 or AC2 in the case where the next to-be-processed command CmdC is processed as the next processed command. In FIG. 13, a next presumed cost Tca is equivalent to the access cost from the position (sector) PosC to a position (sector) PosA specified by the next to-be-processed command CmdA. A next presumed cost Tcb is equivalent to the access cost from the position (sector) PosC to a position (sector) PosB specified by the next to-be-processed command CmdB. A next presumed cost Tcd is equivalent to the access cost from the position (sector) PosC to a position (sector) PosD specified by the next to-be-processed command CmdD.

In the example shown in FIG. 13, the first reordering arithmetic unit 6221 (or the second reordering arithmetic unit 6222) calculates each of next presumed costs T0a, T0b, and T0c of the next to-be-processed commands CmdA, CmdB, and CmdC corresponding to the actuator AC1 (or the actuator AC2) from the position Pos0 of the head HD1 (or head HD2), based on the reordering information corresponding to the actuator AC1 (or the actuator AC2). Based on the calculation result of each of the plurality of next presumed costs T0a, T0b, and T0c of the next to-be-processed commands CmdA, CmdB, and CmdC, the first reordering arithmetic unit 6221 (or the second reordering arithmetic unit 6222) selects the queue command CmdC as the next processed command (low cost command or lowest cost command) from the next to-be-processed commands and reorders the order of the selected queue command CmdC to a next order.

In the example shown in FIG. 13, after processing the queue command CmdC, the first reordering arithmetic unit 6221 (or the second reordering arithmetic unit 6222) calculates each of next presumed costs Tca, Tcb, and Tcd of the next to-be-processed commands CmdA, CmdB, and CmdD corresponding to the actuator AC1 (or the actuator AC2) from the position PosC of the head HD1 (or head HD2), based on the reordering information corresponding to the actuator AC1 (or the actuator AC2).

FIG. 14 is a schematic diagram showing an example of the reordering arithmetic process. FIG. 14 shows the HDC 60 (command controller 620). The HDC 60 (command controller 620) comprises the first reordering arithmetic unit 6221 (or the second reordering arithmetic unit 6222). In FIG. 14, each of the queue commands CmdA, CmdB, CmdC, and CmdD is equivalent to the next to-be-processed command or a further next to-be-processed command. In FIG. 14, a further next presumed cost Tab is equivalent to an access cost from the position (sector) PosA to the position (sector) PosB. A further next presumed cost Tac is equivalent to an access cost from the position (sector) PosA to the position (sector) PosC. A further next presumed cost Tba is equivalent to an access cost from the position (sector) PosB to the position (sector) PosA. A further next presumed cost Tbc is equivalent to an access cost from the position (sector) PosB to the position (sector) PosC. A further next presumed cost Tca is equivalent to an access cost from the position (sector) PosC to the position (sector) PosA. A further next presumed cost Tcb is equivalent to an access cost from the position (sector) PosC to the position (sector) PosB. A further next presumed cost Tad is equivalent to an access cost from the position (sector) PosA to the position (sector) PosD. A further next presumed cost Tbd is equivalent to an access cost from the position (sector) PosB to the position (sector) PosD. A further next presumed cost Tda is equivalent to an access cost from the position (sector) PosJ to the position (sector) PosA. A further next presumed cost Tdb is equivalent to an access cost from the position (sector) PosD to the position (sector) PosB.

In the example shown in FIG. 14, the first reordering arithmetic unit 6221 (or the second reordering arithmetic unit 6222) calculates each of next presumed costs T0a, T0b, and T0c of the next to-be-processed commands CmdA, CmdB, and CmdC corresponding to the actuator AC1 (or the actuator AC2) from the position Pos0 of the head HD1 (or head HD2), based on the reordering information corresponding to the actuator AC1 (or the actuator AC2). Based on the reordering information corresponding to the actuator AC1 (or the actuator AC2), the first reordering arithmetic unit 6221 (or the second reordering arithmetic unit 6222) calculates each of the plurality of further next presumed costs Tab, Tac, Tba, Tbc, and Tcb from a plurality of positions of the disk DK which are specified by the next t0-*be*-processed commands CmdA, CmdB, and CmdC to a plurality of positions of the disk DK which are specified by the further next to-be-processed commands CmdA, CmdB, and CmdC.

Based on the results of calculation process of the next presumed costs and the further next presumed costs, the first reordering arithmetic unit 6221 (or the second reordering arithmetic unit 6222) calculates a sum (hereinafter also referred to as a total cost) of the plurality of next presumed costa and the plurality of further next presumed costs corresponding to the plurality of next presumed costs.

For example, the first reordering arithmetic unit 6221 (or the second reordering arithmetic unit 6222) calculates total cost T0*ab* by the following expression.

$$T0ab = k1 \times T0a + k2 \times Tab \qquad (1)$$

where each of k1 and k2 is a weight factor. K1 and k2 may be the same or different. k1 and k2 may not be set.

For example, the first reordering arithmetic unit 6221 (or the second reordering arithmetic unit 6222) calculates total cost T0*ac* by the following expression.

$$T0ac = k1 \times T0a + k2 \times Tac \qquad (2)$$

For example, the first reordering arithmetic unit 6221 (or the second reordering arithmetic unit 6222) calculates total cost T0*ba* by the following expression.

$$T0ba = k1 \times T0b + k2 \times Tba \qquad (3)$$

For example, the first reordering arithmetic unit 6221 (or the second reordering arithmetic unit 6222) calculates total cost T0*bc* by the following expression.

$$T0bc = k1 \times T0b + k2 \times Tbc \qquad (4)$$

For example, the first reordering arithmetic unit 6221 (or the second reordering arithmetic unit 6222) calculates total cost T0*ca* by the following expression.

$$T0ca = k1 \times T0c + k2 \times Tca \qquad (5)$$

For example, the first reordering arithmetic unit 6221 (or the second reordering arithmetic unit 6222) calculates total cost T0*cb* by the following expression.

$$T0cb = k1 \times T0c + k2 \times Tcb \qquad (6)$$

The first reordering arithmetic unit 6221 (or the second reordering arithmetic unit 6222) selects the next to-be-processed command CmdC corresponding to the smallest total cost (hereinafter also referred to as lowest total cost) T0*ca*, of the plurality of total costs represented by expressions (1) to (6), as the next processed command (low cost command or lowest cost command), and reorders the order of the selected Queue command CmdC to a next order.

In the example shown in FIG. 14, after processing the queue command CmdC, the first reordering arithmetic unit 6221 (or the second reordering arithmetic unit 6222) calculates the access costs other than the access costs Tca, Tcb, Tab, and Tba calculated by the reordering arithmetic process that selects the queue command CmdC.

The first reordering arithmetic unit 6221 (or the second reordering arithmetic unit 6222) calculates the next presumed cost Tcd of the next to-be-processed command CmdD corresponding to the actuator AC1 (or the actuator AC2) from the position PosC of the head HD1 (or head HD2), based on the reordering information corresponding to the actuator AC1 (or the actuator AC2).

The first reordering arithmetic unit 6221 (or the second reordering arithmetic unit 6222) calculates the further next presumed cost Tad from the position specified by the next to-be-processed command CmdA to the position specified by the further next to-be-processed command CmdD, based on the reordering information corresponding to the actuator AC1 (or the actuator AC2). The first reordering arithmetic unit 6221 (or the second reordering arithmetic unit 6222) calculates the further next presumed cost Tbd from the position specified by the next to-be-processed command CmdB to the position specified by the further next to-be-processed command CmdD, based on the reordering information corresponding to the actuator AC1 (or the actuator AC2). The first reordering arithmetic unit 6221 (or the second reordering arithmetic unit 6222) calculates the plurality of further next presumed costs Tda and Tdb from the position specified by the next to-be-processed command CmdD to a plurality of positions of the disk DK which are specified by the further next to-be-processed commands CmdA and CmdB, based on the reordering information corresponding to the actuator AC1 (or the actuator AC2).

The first reordering arithmetic unit 6221 (or the second reordering arithmetic unit 6222) calculates the sum (total cost) of the plurality of next presumed costs and the plurality of further next presumed costs, based on the results of calculation process of the next presumed costs and the further next presumed costs.

For example, the first reordering arithmetic unit 6221 (or the second reordering arithmetic unit 6222) calculates total cost Tcab by the following expression.

$$Tcab = k1 \times Tca + k2 \times Tab \qquad (7)$$

For example, the first reordering arithmetic unit 6221 (or the second reordering arithmetic unit 6222) calculates total cost Tcad by the following expression.

$$Tcad = k1 \times Tca + k2 \times Tad \quad (8)$$

For example, the first reordering arithmetic unit 6221 (or the second reordering arithmetic unit 6222) calculates total cost Tcba by the following expression.

$$Tcba = k1 \times Tcb + k2 \times Tba \quad (9)$$

For example, the first reordering arithmetic unit. 6221 (or the second reordering arithmetic unit 6222) calculates total cost Tcbd by the following expression.

$$Tcbd = k1 \times Tcb + k2 \times Tbd \quad (10)$$

For example, the first reordering arithmetic: unit 6221 (or the second reordering arithmetic unit 6222) calculates total cost Tcda by the following expression.

$$Tcda = k1 \times Tcd + k2 \times Tda \quad (11)$$

For example, the first reordering arithmetic unit 6221 (or the second reordering arithmetic unit 6222) calculates total cost T0cb by the following expression.

$$Tcdb = k1 \times Tcd + k2 \times Tdb \quad (12)$$

The first reordering arithmetic unit 6221 (or the second reordering arithmetic unit 6222) selects the next to-be-processed command CmdB corresponding to the smallest total cost (hereinafter also referred to as lowest total cost) Tcbd, of the plurality of total costs represented by expressions (7) to (12), as the next processed command (lowest cost command), and reorders the order of the selected queue command CmdB to a next order.

Figure 15:
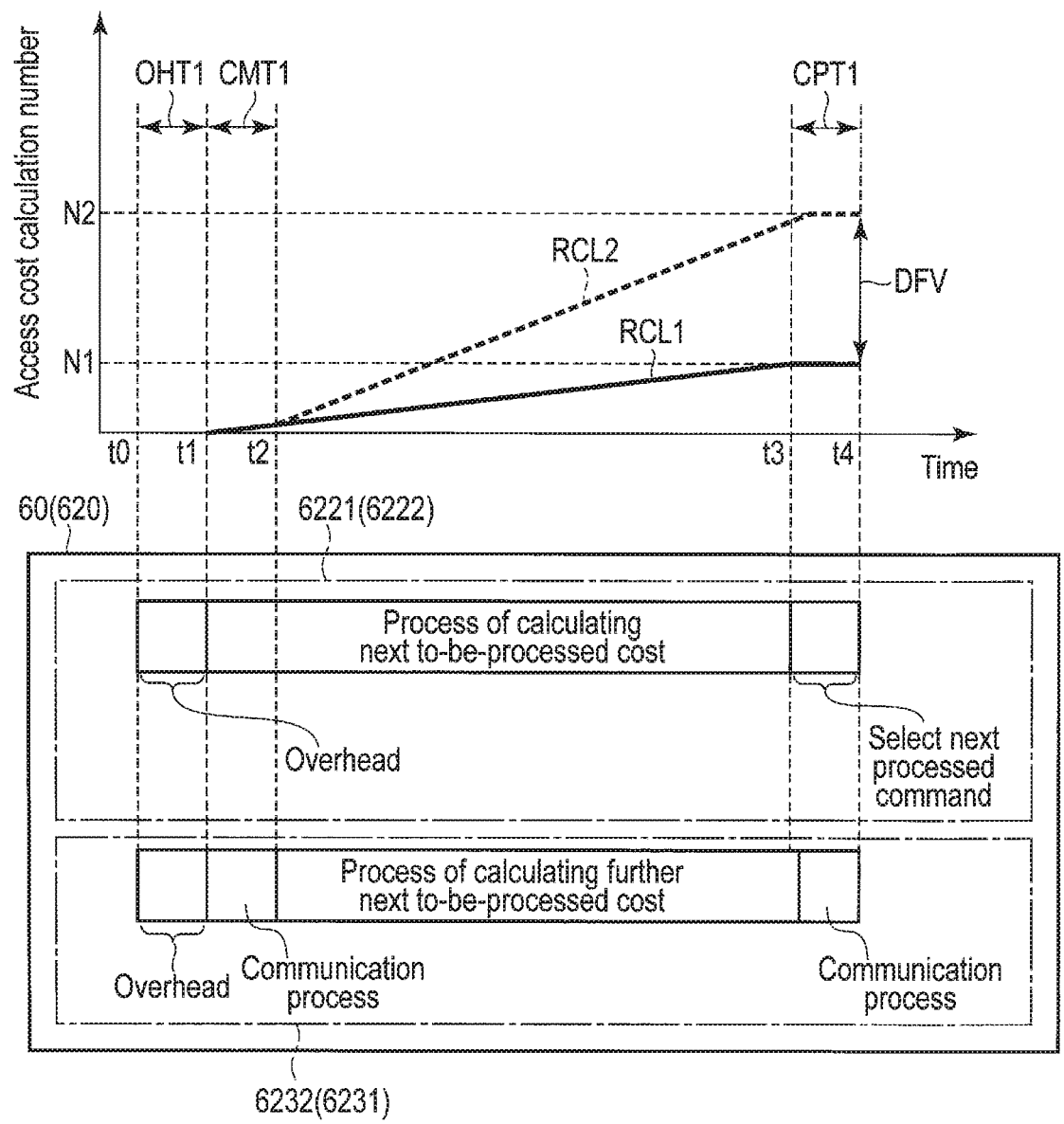
FIG. 15 is a schematic block diagram showing an example of the bypass arithmetic process to the queue command shown in FIG. 10.

FIG. 15 is a schematic block diagram showing an example of the bypass arithmetic process to the queue command shown in FIG. 10. FIG. 15 shows the HDC 60. In FIG. 15, the HDC 60 comprises the command controller 620. In FIG. 15, the command controller 620 comprises the first reordering arithmetic unit 6221 (or the second reordering arithmetic unit 6222) and the second bypass arithmetic unit 623 (or the first bypass arithmetic unit 6231). In FIG. 15, the horizontal axis is Indicative of the time, and the vertical axis is indicative of the access cost calculation number. On the horizontal axis of FIG. 15, the time passes toward a distal end of an arrow of time. On the horizontal axis of FIG. 15, time t0, time t1, time t3, and time t4 are shown. In FIG. 15, the time t0 corresponds to the time t0 shown in FIG. 10, the time t1 corresponds to the time t1 shown in FIG. 11, the time t3 corresponds to the time t3 shown in FIG. 11, and the time t4 corresponds to the time t4 shown in FIG. 10. In FIG. 15, the time t2 is equivalent to the time delayed from (later than) the time t1, and the time t3 is equivalent to the time delayed from (later than) the time t2. In FIG. 15, time interval CMT1 is equivalent to the time interval between the time t1 and the time t2. The time interval CMT1 is equivalent to the time of the communication process. On the vertical axis of FIG. 15, the access cost calculation number becomes larger toward a distal end of an arrow of the vertical axis. On the vertical axis of FIG. 11, access cost calculation numbers N1 and N2 are shown. The access cost calculation number N2 is equivalent to a sum of the access cost calculation numbers of the first reordering arithmetic unit 6221 (or the second reordering arithmetic unit 6222) and the second bypass arithmetic unit (or the first bypass arithmetic unit). The access cost calculation number N2 is larger than the access cost calculation number N1. In FIG. 15, the variations RCL1 and RCL2 of the access cost calculation number are shown.

In the example shown in FIG. 15, the first reordering arithmetic unit 6221 (or the second reordering arithmetic unit 6222) receives the command Cmdn+3 corresponding to the actuator AC1 (or the actuator AC2) from the host 100 at the time t0 as shown in FIG. 10, and overhead occurs from the time t0 until the time t1 after the time interval OHT1. The first reordering arithmetic unit 6221 (or the second reordering arithmetic unit 6222) calculates the plurality of next presumed costs of each of the queue commands Cmdn, Cmdn+2, and Cmdn+3, for the access cost calculation number N1, based on the reordering information corresponding to the actuator AC1 (or the actuator AC2), from the time t1 until the time t3. For example, the first reordering arithmetic unit 6221 (or the second reordering arithmetic unit 6222) can complete the calculation process of the plurality of next presumed costs of each of the queue commands Cmdn, Cmdn+2, and Cmdn+3, for the access cost calculation number N1, which can be calculated in the period between the time t1 and the time t3.

The first reordering arithmetic unit 6221 (or the second reordering arithmetic unit 6222) selects the queue command Cmdn as the next processed command (low cost command or lowest cost command), from the plurality of next to-be-processed commands, for example, the queue commands Cmdn, Cmdn+1, and Cmdn+2, based on the next presumed costs for the access cost calculation number N1, from the time t3 at which the next presumed costs for the access cost calculation number N1 are completed until the time t4 after the time interval CPT1.

In the example shown in FIG. 15, the second bypass arithmetic unit 6232 (or the first bypass arithmetic unit 6231) allows the overhead to occur from the time t0 until the time t1 after the time interval OHT1. The second bypass arithmetic unit 6232 executes the communication process of the reordering information corresponding to the actuator AC1 (or the actuator AC2), which is transferred from the first: reordering arithmetic unit 6221 (or the second reordering arithmetic unit 6222) from the time t1 until the time t2 after the time interval CMT1. After the time t2, the second bypass arithmetic unit 6232 calculates the plurality of next presumed costs of each of the queue commands Cmdn, Cmdn+2, and Cmdn+3, for difference DFV obtained by subtracting the access cost calculation number N1 from the access cost calculation number N2, based on the reordering information corresponding to the actuator AC1 (or the actuator AC2). For example, the second bypass arithmetic unit 6232 (or the first bypass arithmetic unit 6231) can completes the calculation process of the plurality of next presumed costs of each of the queue commands Cmdn, Cmdn+2, and Cmdn+3, with the access cost calculation number DFV which can be calculated after the time t2.

After completing the calculation process of the plurality of further next presumed costs for the difference DFV, the second bypass arithmetic unit 6232 (or the first bypass arithmetic unit 6231) executes the communication process of transferring the calculation process results of the plurality of further next presumed costs for the difference DFV to the first reordering arithmetic unit 6221 (or the second reordering arithmetic unit 6222).

Figure 16:
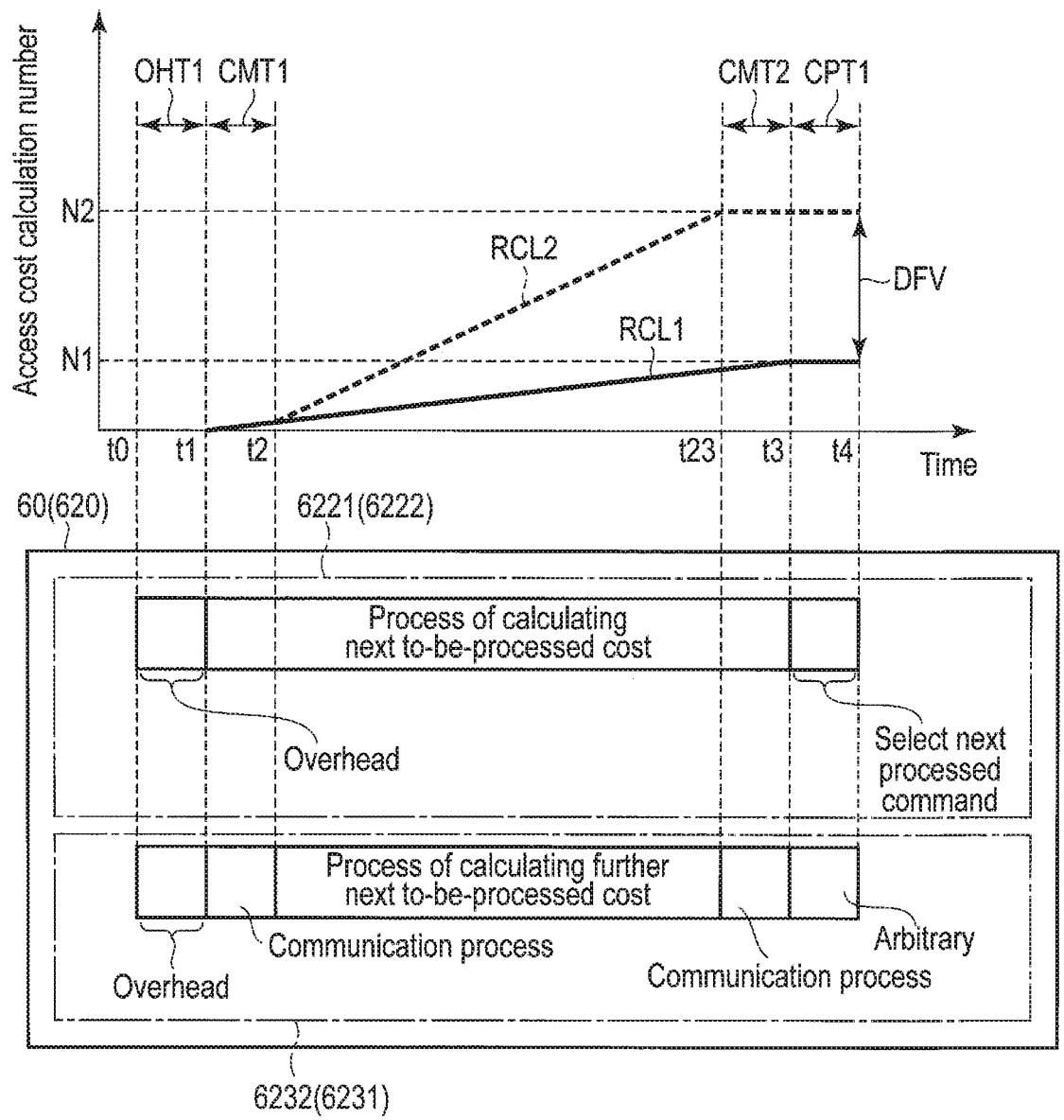
FIG. 16 is a schematic block diagram showing an example of the bypass arithmetic process to the queue command shown in FIG. 10.

FIG. 16 is a schematic block diagram showing an example of the bypass arithmetic process to the queue command shown in FIG. 10. FIG. 16 shows the HDC 60. In FIG. 16, the HDC 60 comprises the command controller 620. In FIG. 16, the command controller 620 comprises the first reordering arithmetic unit 6221 (or the second reordering arithmetic unit 6222) and the second bypass arithmetic unit 623 (or the first bypass arithmetic unit 6231). In FIG. 16, the horizontal axis is indicative of the time, and the vertical axis is indicative of the access cost calculation number. On the horizontal axis of FIG. 16, the time passes toward a distal end of an arrow of time. On the horizontal axis of FIG. 16, time t23 is shown. In FIG. 16, the time t23 is equivalent to the time delayed from (later than) the time t2, and the time t3 is equivalent to the time delayed from (later than) the time t23. In FIG. 16, time interval CMT2 is equivalent to the time interval between the time t23 and the time t3. The time interval CMT2 is equivalent to the time of the communication process. On the vertical axis of FIG. 16, the access cost calculation number becomes larger toward a distal end of an arrow of the vertical axis.

In the example shown in FIG. 16, the first reordering arithmetic unit 6221 (or the second reordering arithmetic unit 6222) receives the command Cmdn+3 corresponding to the actuator AC1 (or the actuator AC2) from the host 100 at the time t0 as shown in FIG. 10, and overhead occurs from the time t0 until the time t1 after the time interval OHT1. The first reordering arithmetic unit 6221 (or the second reordering arithmetic unit 6222) calculates the plurality of next presumed costs of each of the queue commands Cmdn, Cmdn+2, and Cmdn+3, for the access cost calculation number N1, based on the reordering information corresponding to the actuator AC1 (or the actuator AC2), from the time t1 until the time t3. For example, the first reordering arithmetic unit 6221 (or the second reordering arithmetic unit 6222) can complete the calculation process of the plurality of next presumed costs of each of the queue commands Cmdn, Cmdn+2, and Cmdn+3, for the access cost calculation number N, which can be calculated in the period between the time t1 and the time t3.

The second bypass arithmetic unit 6232 (or the first bypass arithmetic unit 6231) allows the overhead to occur from the time t0 until the time t1 after the time interval OHT1. The second bypass arithmetic unit 6232 executes the communication process of the reordering information corresponding to the actuator AC1 (or the actuator AC2), which is transferred from the first reordering arithmetic unit 6221 (or the second reordering arithmetic unit 6222) from the time t1 until the time t2 after the time interval CMT1. The second bypass arithmetic unit 6232 calculates the plurality of next presumed costs of each of the queue commands Cmdn, Cmdn+2, and Cmdn+3, for difference DFV obtained by subtracting the access cost calculation number N1 from the access cost calculation number N2, based on the reordering information corresponding to the actuator AC1 (or the actuator AC2), from the time t2 until the time t23. For example, the second bypass arithmetic unit 6232 (or the first bypass arithmetic unit 6231) can completes the calculation process of the plurality of next presumed costs of each of the queue commands Cmdn, Cmdn+2, and Cmdn+3, with the access cost calculation number DFV which can be calculated after the time t2.

The second bypass arithmetic unit 6232 (or the first bypass arithmetic unit 6231) executes the communication process of transferring the calculation process results of the plurality of further next presumed costs for the difference DFV to the first reordering arithmetic unit 6221 (or the second reordering arithmetic unit 6222), from the time t23 after completing the calculation process of the plurality of further next presumed costs for the difference DFV until the time t3 after the time interval CMT2.

The first reordering arithmetic unit 6221 (or the second reordering arithmetic unit 6222) calculates the next presumed costs and the further next presumed costs for the access cost calculation number N2, based on both the calculation process result of the further next presumed cost and the calculation process result of the next presumed cost for the access cost calculation number N1, which are received from the second bypass arithmetic unit 6232 (or the first bypass arithmetic unit 6231), from the time t3 at which the calculation process of the next presumed costs and further next presumed costs for the access cost calculation number N1 is completed until the time t4 after the time interval CPT1. The first reordering arithmetic unit 6221 (or the second reordering arithmetic unit 6222) selects the queue command Cmdn as the next processed command (low cost command or lowest cost command), from the plurality of next to-be-processed commands, for example, the queue commands Cmdn, Cmdn+1, and Cmdn+2, based on the next presumed costs and the further next presumed costs for the access cost calculation number N2, from the time t3 at which the calculation process of the next presumed costs and further next presumed costs for the access cost calculation number N1 is completed until the time t4 after the time interval CPT1.

Figure 17:
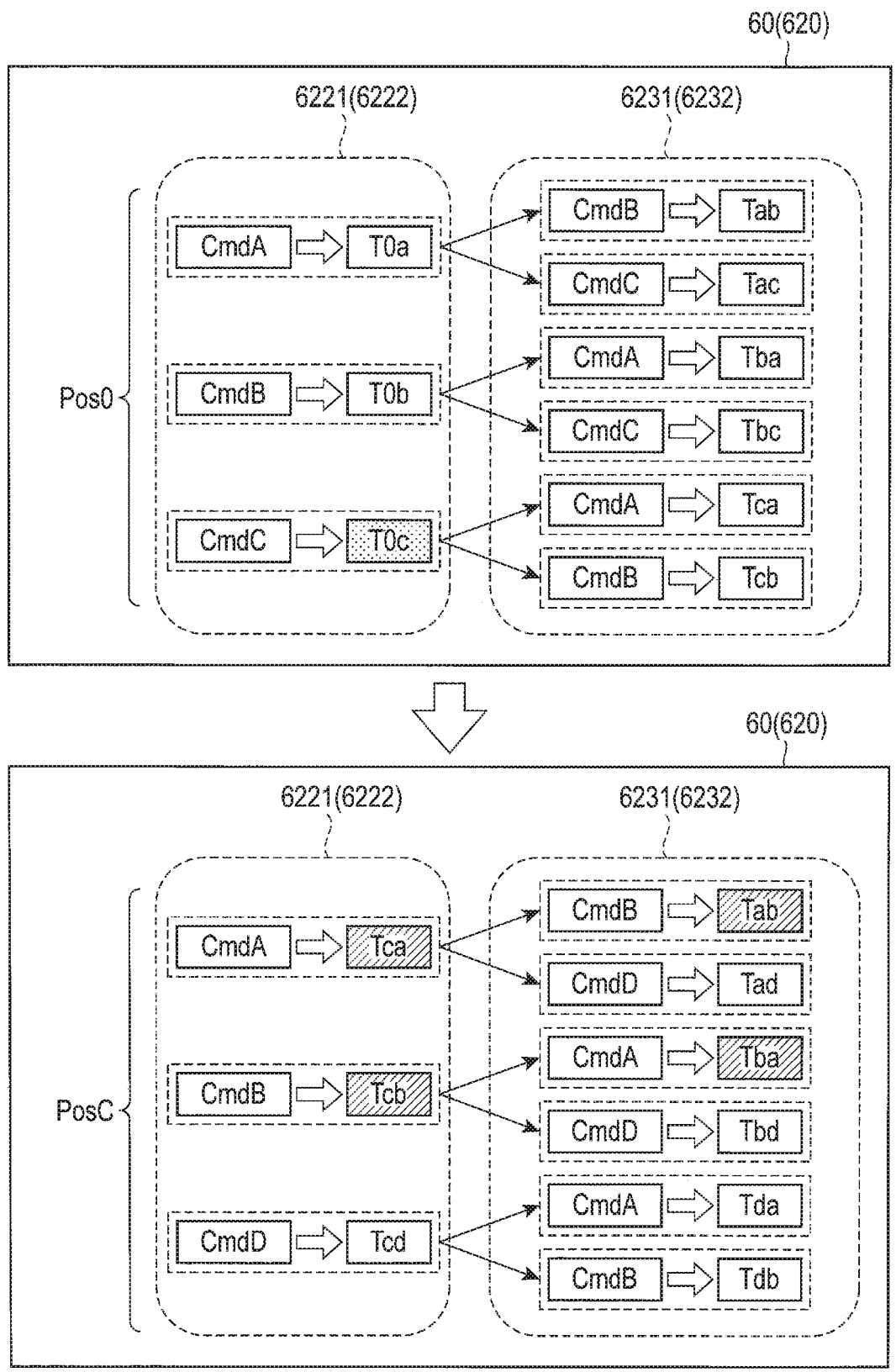
FIG. 17 is a schematic diagram showing an example of the bypass arithmetic process.

FIG. 17 is a schematic diagram showing an example of the bypass arithmetic process. FIG. 17 shows the HDC 60 (command controller 620). The HDC 60 (command controller 620) comprises the first reordering arithmetic unit 6221 (or the second reordering arithmetic unit 6222) and the second bypass arithmetic unit 6232 (or the first bypass arithmetic unit 6231). In FIG. 17, each of the queue commands CmdA, CmdB, CmdC, and CmdD is equivalent to the next to-be-processed command or a further next to-be-processed command.

For example, as shown in FIG. 15, the first reordering arithmetic unit 6221 (or the second reordering arithmetic unit 6222) calculates each of next presumed costs T0a, T0b, and T0c of the next to-be-processed commands CmdA, CmdB, and CmdC corresponding to the actuator AC1 (or the actuator AC2) from the position Pos0 of the head HD1 (or head HD2), based on the reordering information corresponding to the actuator AC1 (or the actuator AC2). Based on the calculation result of each of the plurality of next presumed costs T0a, T0b, and T0c of the next to-be-processed commands, the first reordering arithmetic unit 6221 (or the second reordering arithmetic unit 6222) selects the queue command CmdC as the next processed command (low cost command or lowest cost command from the next to-be-processed commands and reorders the order of the selected queue command CmdC to a next order.

As shown in FIG. 15, based on the reordering information corresponding to the actuator AC1 (or the actuator AC2), the second bypass arithmetic unit 6232 (or the first bypass arithmetic unit 6231) calculates each of the further next presumed costs Tab, Tac, Tba, Tbc, and Tcb from a plurality of positions of the disk DK which are specified by the plurality of next to-be-processed commands CmdA, CmdB, and CmdC to a plurality of positions of the disk DK which are specified by the further next to-be-processed commands CmdA, CmdB, and CmdC. As shown in FIG. 15, the second bypass arithmetic unit 6232 (or the first bypass arithmetic unit 6231) transfers the calculation results of the plurality of further next presumed costs, for example, the further next presumed costs Tab, Tac, Tba, Tbc, Tca, and Tcb to the first reordering arithmetic unit 6221 (or the second reordering arithmetic unit 6222).

After processing the queue command CmdC, the first reordering arithmetic unit 6221 (or the second reordering arithmetic unit 6222) calculates the access costs other than the access costs Tca and Tcb calculated by the second bypass arithmetic unit 6232 (or the first bypass arithmetic unit 6231) during the reordering arithmetic process that selects the queue command CmdC.

As shown in FIG. 15, the first reordering arithmetic unit 6221 (or the second reordering arithmetic unit 6222) calculates the next presumed cost Tcd of the next to-be-processed command CmdD corresponding to the actuator AC1 (or the actuator AC2) from the position PosC or the head HD1 (or head HD2), based on the reordering information corresponding to the actuator AC1 (or the actuator AC2). Based on the calculation result of each of the plurality of next presumed costs Tca, Tcb, and Tcd of each of the plurality of the next to-be-processed commands, for example, CmdA, CmdB, and CmdD, the first reordering arithmetic unit 6221 (or the second reordering arithmetic unit 6222) selects the queue command CmdB as the next processed command (low cost command or lowest cost command) from the next to-be-processed commands and reorders the order of the selected queue command CmdB to a next order.

After the queue command CmdC is processed by the first reordering arithmetic unit 6221 (or the second reordering arithmetic unit 6222), the second bypass arithmetic unit 6232 (or the first bypass arithmetic unit 6231) calculates the access costs other than the access costs Tab and Tba calculated during the reordering arithmetic process that selects the queue command and CmdC by the first reordering arithmetic unit 6221 (or the second reordering arithmetic unit 6222).

As shown in FIG. 15, the second bypass arithmetic unit 6232 (or the first bypass arithmetic unit 6231) calculates the further next presumed cost Tad from the position specified by the next to-be-processed command CmdA to the position specified by the further next to-be-processed command CmdD, based on the reordering information corresponding to the actuator AC1 (or the actuator AC2). As shown in FIG. 15, the second bypass arithmetic unit 6232 (or the first bypass arithmetic unit 6231) calculates the further next presumed cost Tbd from the position specified by the next to-be-processed command CmdB to the position specified by the further next to-be-processed command CmdD, based on the reordering information corresponding to the actuator AC1 (or the actuator AC2). As shown in FIG. 15, the second bypass arithmetic unit 6232 (or the first bypass arithmetic unit 6231) calculates the plurality of further next presumed costs Tda and Tdb from the position specified by the next to-be-processed command CmdD to a plurality of positions of the disk DK which are specified by the plurality of further next to-be-processed commands CmdA and CmdB, based on the reordering information corresponding to the actuator AC1 (or the actuator AC2).

For example, as shown in FIG. 16, the first reordering arithmetic unit 6221 (or the second reordering arithmetic unit 6222) calculates each of next presumed costs T0a, T0b, and T0c of the next to-be-processed commands CmdA, CmdB, and CmdC corresponding to the actuator AC1 (or the actuator AC2) from the position Pos0 of the head HD1 (or head HD2), based on the reordering information corresponding to the actuator AC1 (or the actuator AC2).

As shown in FIG. 16, based on the reordering information corresponding to the actuator AC1 (or the actuator AC2), the second bypass arithmetic unit 6232 (or the first bypass arithmetic unit 6231) calculates each of the plurality of further next presumed costs Tab, Tac, Tba, Tbc, and Tcb from a plurality of positions of the disk DK which are specified by the plurality of next to-be-processed commands CmdA, CmdB, and CmdC to a plurality of positions of the disk DK which are specified by the further next to-be-processed commands CmdA, CmdB, and CmdC. As shown in FIG. 16, the second bypass arithmetic unit 6232 (or the first bypass arithmetic unit 6231) transfers the calculation results of the plurality of further next presumed costs, for example, the further next presumed costs Tab, Tac, Tba, Tbc, Tca, and Tcb to the first reordering arithmetic unit 6221 (or the second reordering arithmetic unit 6222).

Based on the calculation results of both the plurality of next presumed costs and the plurality of further next presumed costs received from the second bypass arithmetic unit 6232 (or the first bypass arithmetic unit 6231), the first reordering arithmetic unit 6221 (or the second reordering arithmetic unit 6222) calculates a sum (total cost) of the plurality of next presumed costs and the plurality of further next presumed costs corresponding to the plurality of next presumed costs.

For example, the first reordering arithmetic unit 6221 (or the second reordering arithmetic unit 6222) selects the next to-be-processed command CmdC corresponding to the smallest total cost (hereinafter also referred to as lowest total cost) T0ca, of the plurality of total costs represented by expressions (1) to (6), as the next processed command (low cost command or lowest cost command), and reorders the order of the selected queue command CmdC to a next order.

After processing the queue command CmdC, the first reordering arithmetic unit 6221 (or the second reordering arithmetic unit 6222) calculates the access costs other than the access costs Tca and Tcb calculated by the reordering arithmetic process that selects the queue command CmdC.

As shown in FIG. 16, the first reordering arithmetic unit 6221 (or the second reordering arithmetic unit 6222) calculates the next presumed cost Tcd of the next to-be-processed command CmdD corresponding to the actuator AC1 (or the actuator AC2) from the position PosC of the head HD1 (or head HD2), based on the reordering information corresponding to the actuator AC1 (or the actuator AC2).

After the queue command CmdC is processed by the first reordering arithmetic unit 6221 (or the second reordering arithmetic unit 6222), the second bypass arithmetic unit 6232 (or the first bypass arithmetic unit 6231) calculates the access costs other than the access costs Tab and Tba calculated during the reordering arithmetic process that selects the queue command CmdC by the first reordering arithmetic unit 6221 (or the second reordering arithmetic unit 6222).

As shown in FIG. 16, the first bypass arithmetic unit 6231 (or the second bypass arithmetic unit 6232) calculates the further next presumed cost Tad from the position specified by the next to-be-processed command CmdA to the position specified by the further next to-be-processed command CmdD, based on the reordering information corresponding to the actuator AC1 (or the actuator AC2). The first bypass arithmetic unit 6231 (or the second bypass arithmetic unit 6232) calculates the further next presumed cost Tbd from the position specified by the next to-be-processed command CmdB to the position specified by the further next to-be-processed command CmdD, based on the reordering information corresponding to the actuator AC1 (or the actuator AC2). The first bypass arithmetic unit 6231 (or the second bypass arithmetic unit 6232) calculates the plurality of further next presumed costs Tda and Tdb from the position specified by the next to-be-processed command CmdD to a plurality of positions of the disk DK which are specified by the further next to-be-processed commands CmdA and CmdB, based on the reordering information corresponding to the actuator AC1 (or the actuator AC2). As shown in FIG. 16, the second bypass arithmetic unit 6232 (or the first bypass arithmetic unit 6231) transfers the calculation results of the plurality of further next presumed costs, for example, the further next presumed costs Tad, Tbd, Tda, and Tdb to the first: reordering arithmetic unit 6221 (or the second reordering arithmetic unit 6222).

The first reordering arithmetic unit 6221 (or the second reordering arithmetic unit 6222) calculates the sum (total cost) of the plurality of next presumed costs and the plurality of further next presumed costs, based on the results of calculation process of the next presumed costs and the further next presumed costs.

For example, the first reordering arithmetic unit 6221 (or the second reordering arithmetic unit 6222) selects the next to-be-processed command CmdB corresponding to the smallest total cost (hereinafter also referred to as lowest total cost) Tcbd, of the plurality of total costs represented by expressions (7) to (12), as the next processed command (lowest cost command), and reorders the order of the selected queue command CmdB to a next order.

Figure 18:
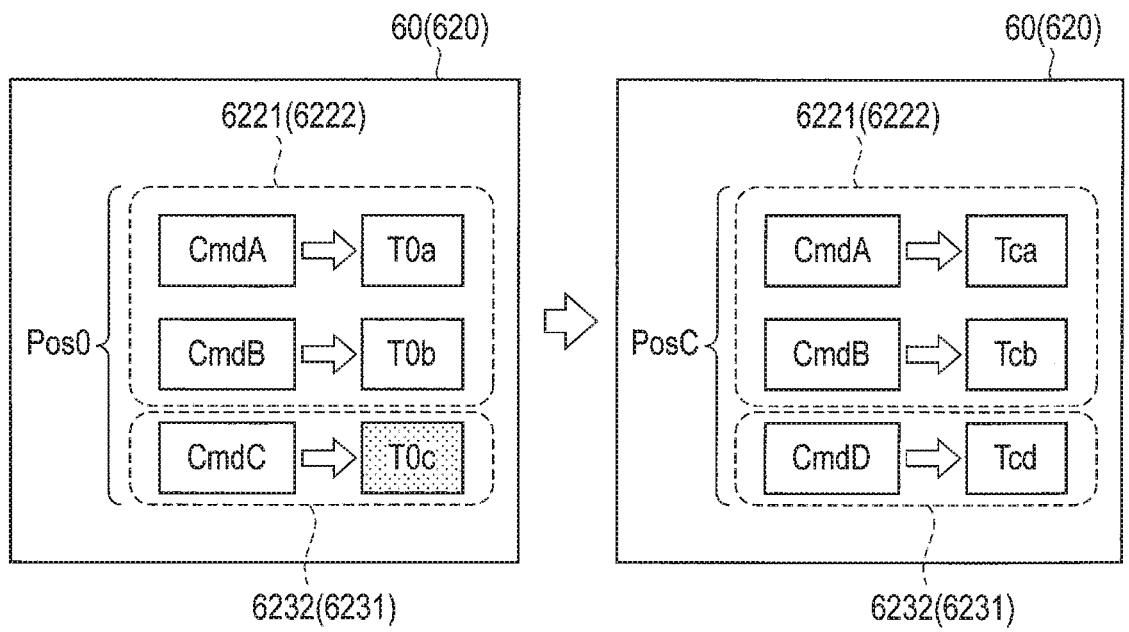
FIG. 18 is a schematic diagram showing an example of the bypass arithmetic process.

FIG. 18 is a schematic diagram showing an example of the bypass arithmetic process. FIG. 18 shows the HDC 60 (command controller 620). The HDC 60 (command controller 620) comprises the first reordering arithmetic unit 6221 (or the second reordering arithmetic unit 6222) and the second bypass arithmetic unit 6232 (or the first bypass arithmetic unit 6231). In FIG. 18, each of the queue commands CmdA, CmdB, and CmdC is equivalent to the next to-be-processed command.

In the example shown in FIG. 18, the first reordering arithmetic unit 6221 (or the second reordering arithmetic unit 6222) calculates each of next presumed costs T0a and T0b of the next to-be-processed commands CmdA and CmdB corresponding to the actuator AC1 (or the actuator AC2) from the position Pos0 of the head HD1 (or head HD2), based on the reordering information corresponding to the actuator AC1 (or the actuator AC2).

The second bypass arithmetic unit 6232 (or the first bypass arithmetic unit 6231) calculates the next presumed cost T0c of the next to-be-processed command CmdC corresponding to the actuator AC1 (or the actuator AC2) from the position Pos0 of the head HD1 (or head HD2), based on the reordering information corresponding to the actuator AC1 (or the actuator AC2). The second bypass arithmetic unit 6232 (or the first bypass arithmetic unit 6231) transfers the calculation result of the next presumed cost, for example, the next presumed costs T0c to the first reordering arithmetic unit 6221 (or the second reordering arithmetic unit 6222).

Based on the calculation result of each of the plurality of next presumed costs T0a, T0b, and T0c of the next to-be-processed commands CmdA, CmdB, and CmdC, the first reordering arithmetic unit 6221 (or the second reordering arithmetic unit 6222) selects the queue command CmdC as the next processed command (low cost command or lowest cost command) from the next to-be-processed commands and reorders the order of the selected queue command CmdC to a next order.

In the example shown in FIG. 18, the first reordering arithmetic unit 6221 (or the second reordering arithmetic unit 6222) calculates each of next presumed costs Tca and Tcb of the next to-be-processed commands CmdA and CmdB corresponding to the actuator AC1 (or the actuator AC2) from the position PosC of the head HD1 (or head HD2), based on the reordering information corresponding to the actuator AC1 (or the actuator AC2).

The second bypass arithmetic unit 6232 (or the first bypass arithmetic unit 6231) calculates the next presumed cost Tcd of the next to-be-processed command CmdD corresponding to the actuator AC1 (or the actuator AC2) from the position PosC of the head HD1 (or head HD2), based on the reordering information corresponding to the actuator AC1 (or the actuator AC2). The second bypass arithmetic unit 6232 (or the first bypass arithmetic unit 6231) transfers the calculation result of the next presumed cost, for example, the next presumed costs Tcd to the first reordering arithmetic unit 6221 (or the second reordering arithmetic unit 6222).

Figure 19:
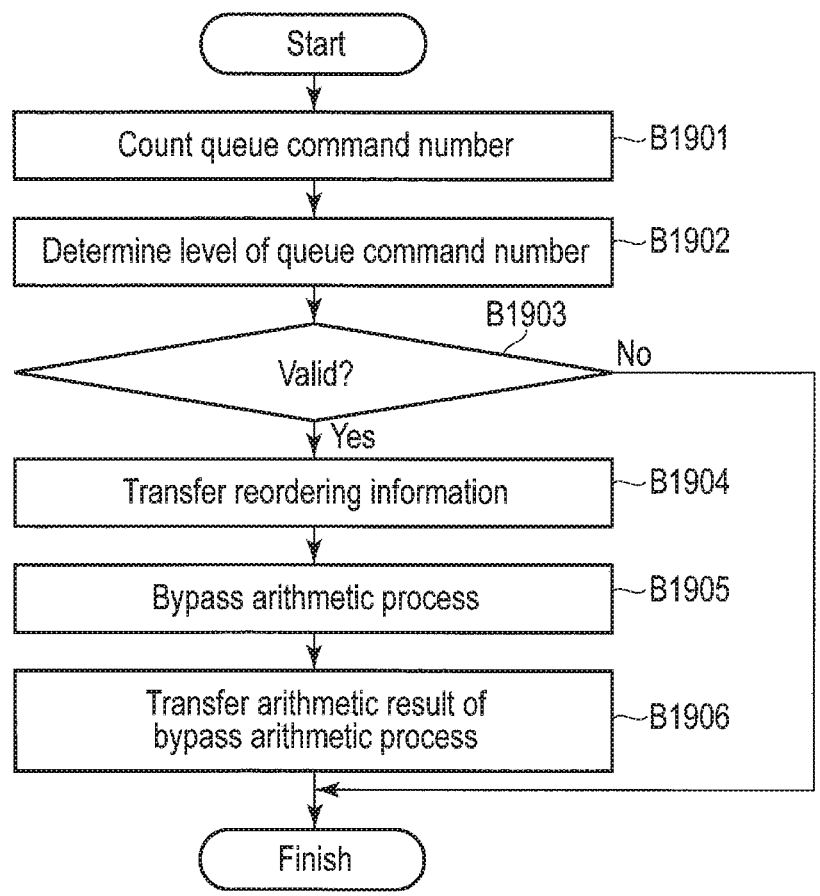
FIG. 19 is a flowchart showing an example of the method of reordering arithmetic process according to the first embodiment.

FIG. 19 is a flowchart showing an example of the method of reordering arithmetic process according to the present embodiment.

The system controller 130 counts the plurality of queue command numbers that correspond to the plurality of actuators AC, respectively (B1901). For example, the system controller 130 counts the queue command number corresponding to the actuator AC1, and the queue command number corresponding to the actuator AC2. The system controller 130 determines each of the plurality of queue command numbers that correspond to the plurality of actuators AC, respectively (B1902). The system controller 130 determines whether the bypass arithmetic process is valid or invalid, based on the levels of the plurality of queue command numbers that correspond to the plurality of actuators AC, respectively (B1903). When determining that the bypass arithmetic process is not valid, i.e., invalid (NO in B1903), the system controller 130 finishes the process. When determining that the bypass arithmetic process is valid (YES in B1903), the system controller 130 transfers the reordering information (B1904). For example, when determining that the bypass arithmetic process using the surplus arithmetic resource corresponding to the actuator AC2 (or the actuator AC1) is valid, the system controller 130 transfers the reordering information corresponding to the actuator AC1 (or the actuator AC2; from the first reordering arithmetic unit 6221 (or the second reordering arithmetic unit 6222) to the second bypass arithmetic unit 6232 (or the first bypass arithmetic unit 6231). The system controller 130 executes the bypass arithmetic process (B1905). For example, based on the reordering information corresponding to the actuator AC1 (or the actuator AC2) transferred from the first reordering arithmetic unit 6221 (or the second reordering arithmetic unit 6222) by the surplus arithmetic resource corresponding to the actuator AC2 (or the actuator AC1), the system controller 130 executes the bypass arithmetic process of calculating each of the plurality of access costs of each of the plurality of queue commands corresponding to the actuator AC1 (or the actuator AC2). The system controller 130 transfers the arithmetic result of the bypass arithmetic process (B1906) and finishes the process. For example, when the bypass arithmetic process is executed by the second bypass arithmetic unit 6232 (or the first bypass arithmetic unit 6231), the system controller 130 transfers the arithmetic result of the bypass arithmetic process executed by the second bypass arithmetic unit 6232 (or the first bypass arithmetic unit 6231) to the first reordering arithmetic unit 6221 (or the second reordering arithmetic unit 6222).

According to the present embodiment, the magnetic disk device 1 comprises a plurality of actuators AC. The magnetic disk device 1 counts the queue command numbers that correspond to the plurality of actuators AC, respectively. The magnetic disk device 1 determines the levels of the plurality of queue command numbers that correspond to the plurality of actuators AC, respectively. The magnetic disk device 1 determines whether the bypass arithmetic process is valid or invalid, based on the levels of the plurality of queue command numbers that correspond to the plurality of actuators AC, respectively. When determining that the bypass arithmetic process using the surplus arithmetic resource corresponding to the actuator AC in which the level of the queue command number is the low level, of the plurality of actuators, is valid, the magnetic disk device 1 transfers the reordering information corresponding to the actuator AC in which the level of the queue command number is the high level, of the plurality of actuators, to the surplus arithmetic resource of the actuator AC in which the level of the queue command number is the low level. The magnetic disk device 1 executes the bypass arithmetic process with the surplus arithmetic resource of the actuator AC in which the level of the queue command number is the low level, based on the reordering information corresponding to the actuator AC in which the level of the queue command number is the high level. The magnetic disk device 1 transfers the arithmetic result of the bypass arithmetic process using the surplus arithmetic resource of the actuator AC in which the level of the queue command number is the low level, to the arithmetic resource of the actuator AC in which the level of the queue command number is the high level. The magnetic disk device 1 can increase the access cost calculation number within a particular time. For this reason, the magnetic disk device 1 can improve the access performance.

Next, the magnetic disk device according to modified examples of the first embodiment will be described. In the modified examples, the same reference numerals are attached to the same parts as those of the above-described embodiment, and the detailed description thereof will be omitted.

Modified Example 1

The structure of the magnetic disk device 1 according to modified example 1 is different from the structure of the above-described first embodiment.

Figure 20:
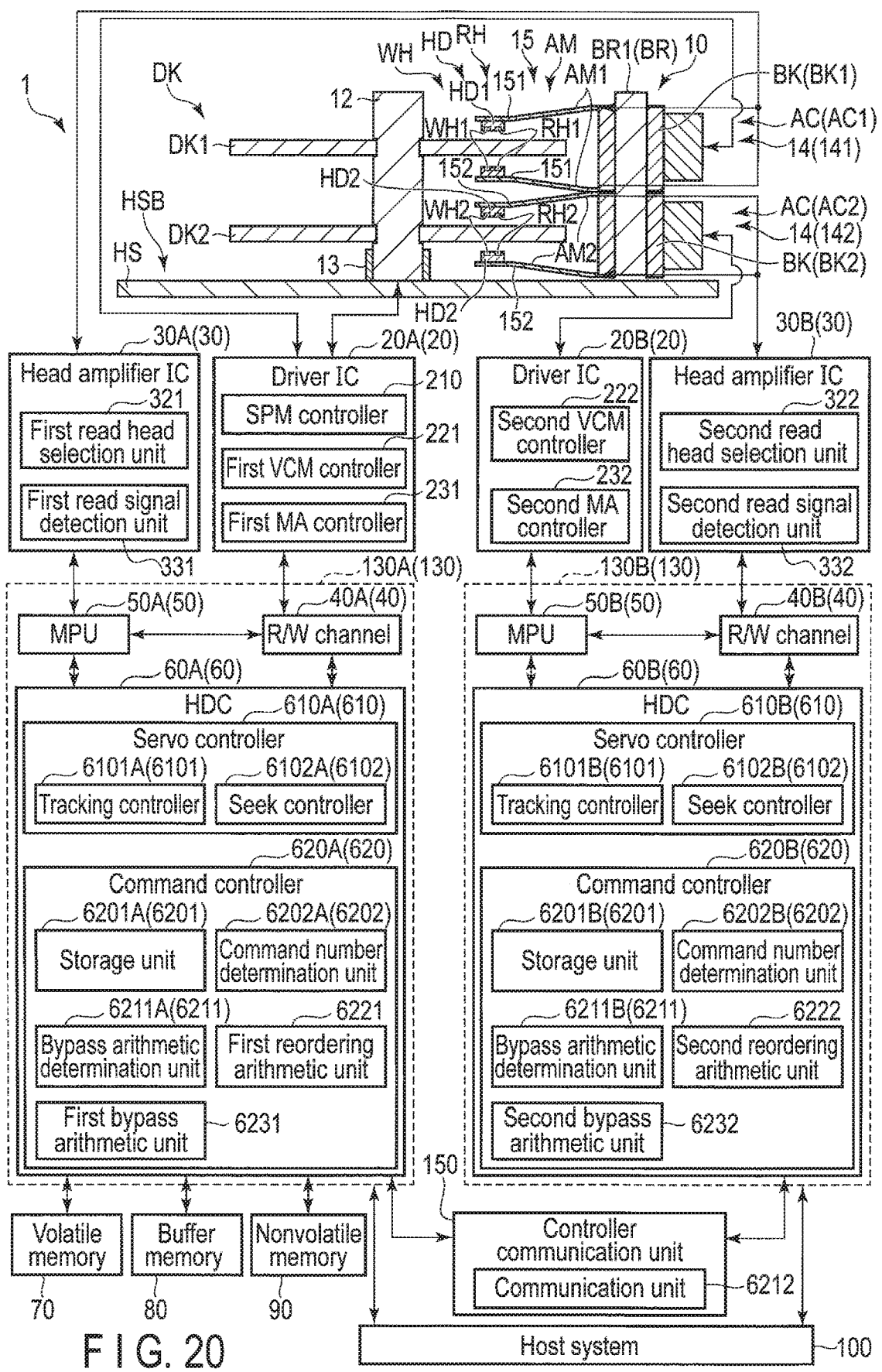
FIG. 20 is a schematic diagram showing an example of a configuration of the magnetic disk device of Modified Example 1.

FIG. 20 is a schematic diagram showing an example of a configuration of the magnetic disk device 1 according to modified example 1.

The magnetic disk device 1 further comprises a controller communication unit 150.

The driver IC 20 comprises driver ICs 20A and 20B. The driver IC 20A controls, for example, driving SPM 13 and VCM 141. The driver IC 20A is electrically connected to the SPM 13 and the VCM 141. The driver IC 20A comprises the SPM controller 210, the first VCM controller 221, and the first MA controller 231. Incidentally, the driver IC 20A may not control the drive of the SPM 13. When the driver IC 20A does not control the drive of the SPM 13, the driver IC 20A may not be electrically connected to the SPM 13 or may not comprise the SPM controller 210. The driver IC 20B controls, for example, the drive of the VCM 142. The driver IC 20B comprises the second VCM controller 222 and the second MA controller 232. The driver IC 20B is electrically connected to the VCM 142. Incidentally, the driver IC 20B may not control the drive of the SPM 13. When the driver IC 20B does not control the drive of the SPM 13, the driver IC 203 may not be electrically connected to the SPM 13 or may comprise the SPM controller 210.

The head amplifier IC 30 comprises head amplifier ICs 30A and 303. For example, the head amplifier IC 30A amplifies a read signal which is read from the disk DK1 and outputs the amplified read signal to a system controller 130A to be explained later (more specifically, an R/W channel 40A to be explained later). The head amplifier IC 30A is electrically connected to, for example, the head HD1. The head amplifier IC 30A outputs a write current corresponding to a signal output from the R/W channel 40A, to the head HD1. The head amplifier IC 30A comprises the first read head selection unit 321 and the first read signal detection unit 331. For example, the head amplifier IC 30B amplifies a read signal which is read from the disk DK2 and outputs the amplified read signal to a system controller 130B to be explained later (more specifically, an R/W channel 40B to be explained later). The head amplifier IC 30B is electrically connected to, for example, the head HD2. The head amplifier IC 30B outputs a write current corresponding to a signal output from the R/W channel 40B, to the head HD2. The head amplifier IC 30B comprises the second read head selection unit 322 and the second read signal detection unit 332.

The system controller 130 comprises system controllers 130A and 130B. The system controller 130A comprises the R/W channel 40A included in the R/W channel 40, MPU 50A included in the MPU 50, and IDC 60A included in the HDC 60.

The system controller 130A is electrically connected to the driver IC 20A, the head amplifier IC 30A, the volatile memory 70, the buffer memory 80, the nonvolatile memory 90, the host 100, and the controller communication unit 150. Incidentally, the system controller 130A may comprise the SPM controller 210, the first VCM controller 221, the first MA controller 231, the first read head selection unit 321, and the first read signal detection unit 331. The system controller 130A may comprise the driver IC 20A and the head amplifier IC 30A. In addition, the system controller 130A may not be connected to the volatile memory 70, the buffer memory 80, and the nonvolatile memory 90.

The R/W channel 40A is included in the R/W channel 40. The R/W channel 40A executes signal processing of read data transferred from the disk DK1 to the host 100 and write data transferred from the host 100 in accordance with instructions from the MPU 50A to be explained later. The R/W channel 40A is electrically connected to, for example, the head amplifier IC 30A, the MPU 50A, the HDC 60A, and the like.

The MPU 50A controls the actuator AC1 via the driver IC 20A and executes servo control for positioning the head HD1. The MPU 50A controls the operation of writing data to the disk DK1 and selects the storage destination of the write data. In addition, the MPU 50A controls the operation of reading data from the disk DK1 and controls the processing of read data. The MPU 50A is connected to each of the units of the magnetic disk device 1. The MPU 50A is electrically connected to, for example, the driver IC 20A, the P/W channel 40A, the HDC 62A, and the like.

The HDC 60A controls read/write processes and controls data transfer between the host 100 and the R/W channel 40A, in accordance with instructions from the MPU 50A. The HDC 60A is electrically connected to, for example, the R/W channel 40A, the MPU 50A, the volatile memory 70, the buffer memory 80, the nonvolatile memory 90, the controller communication unit 150, and the like. Incidentally, the HDC 60A may not be electrically connected to the volatile memory 70, the buffer memory 80, and the nonvolatile memory 90.

The HDC 60A comprises a servo controller 610A included in the servo controller 610, and a command controller 620A in the command controller 620. The HDC 60A executes processes of the units, for example, the servo controller 610A, the command controller 620A, and the like, on the firmware. Incidentally, the HDC 60A may comprise these units as circuits. In addition, several units of the HDC 60A may be provided in the MPU 50A. For example, the servo controller 610A and the command controller 620A may be provided in the MPU 50A.

The servo controller 610A controls the position of the head HD1. In other words, the servo controller 610A controls access of the head HD1 to a particular area of the disk DK1. The servo controller 610A comprises a tracking controller 6101A in the tracking controller 6101, and a seek controller 6102A in the seek controller 6102. The tracking controller 6101A controls tracking of the head HD1 to a particular track of the disk DK1. The seek controller 6102A controls seek of the head HD1 from a particular track to a target track, on the disk DK.

The command controller 620A is included in the command controller 620. The command controller 620A comprises a storage unit 6201A in the storage unit 6201, a command number determination unit 6202A in the command number determination unit 6202, a bypass arithmetic determination unit 6211A in the bypass arithmetic determination unit 6211, the first reordering arithmetic unit 6221, and the first bypass arithmetic unit 6231. The storage unit 6201A stores commands corresponding to the actuator AC1, which are received from the host 100 and the like, in the queue corresponding to the actuator AC1. The command number determination unit 6202A determines the level of the queue command number corresponding to the actuator AC1 in accordance with the queue command number corresponding to the actuator AC1. Incidentally, the command controller 620A may comprise the storage unit 6201A, the command number determination unit 6202A, the bypass arithmetic determination unit 6211A, the first reordering arithmetic unit 6221, the first bypass arithmetic unit 6231, the second reordering arithmetic unit 6222, and the second bypass arithmetic unit 6232. In addition, the command controller 620A may not comprise the bypass arithmetic determination unit 6211A.

The system controller 130B comprises the R/W channel 40B included in the R/W channel 40, MPU 50B included in the MPU 50, and HDC 60B included in the HDC 62. The system controller 130B is electrically connected to the driver IC 20B, the head amplifier IC 30B, the host 100, and the controller communication unit 150. Incidentally, the system controller 130B may comprise the second VCM controller 222, the second MA controller 232, the second read head selection unit 322, and the second read signal detection unit 332. The system controller 130B may include the driver IC 20B and the head amplifier IC 30B. In addition, the system controller 130B may be connected to the volatile memory 70, the buffer memory 80, and the nonvolatile memory 90.

The R/W channel 40B is included in the R/W channel 40. The R/W channel 40B executes signal processing of read data transferred from the disk DK2 to the host 100 and write data transferred from the host 100 in accordance with instructions from the MPU 50B to be explained later. The R/W channel 40B is electrically connected to, for example, the head amplifier IC 30B, the MPU 50B, the HDC 60B, and the like.

The MPU 50B controls the actuator AC2 via the driver IC 20B and executes servo control for positioning the head HD2. The MPU 50B controls the operation of writing data to the disk DK2 and selects the storage destination of the write data. In addition, the MPU 50B controls the operation of reading data from the disk DK2 and controls the processing of read data. The MPU 50B is connected to each of the units of the magnetic disk device 1. The MPU 503 is electrically connected to, for example, the driver IC 20B, the R/W channel 40B, the HDC 60B, and the like.

The HDC 60B controls the read/write processes and controls data transfer between the host 100 and the R/W channel 40B, in accordance with instructions from the MPU 50B. The HDC 60B is electrically connected to, for example, the R/W channel 40B, the MPU 50B, the controller communication unit 150, and the like. Incidentally, the HDC 60B may not be electrically connected to the volatile memory 70, the buffer memory 80, and the nonvolatile memory 90.

The HDC 60B comprises a servo controller 6103 included in the servo controller 610, and a command controller 6203 in the command controller 620. The HDC 60B executes processes of the units, for example, the servo controller 610B, the command controller 620B, and the like, on the firmware. Incidentally, the HDC 60B may comprise these units as circuits. In addition, several units of the HDC 60B may be provided in the MPU 50B. For example, the servo controller 610B and the command controller 620B may be provided in the MPU 50B.

The servo controller 610B controls the position of the head HD2. In other words, the servo controller 610B controls access of the head HD2 to a particular area of the disk DK2. The servo controller 610B comprises a tracking controller 6101B in the tracking controller 6101, and a seek controller 6102B in the seek controller 6102. The tracking controller 6101B controls tracking of the head HD2 to a particular track of the disk DK1. The seek controller 6102B controls seek of the head HD2 from a particular track to a target track, on the disk DK2.

The command controller 620B is included in the command controller 620. The command controller 620B comprises a storage unit 6201B in the storage unit 6201, a command number determination unit 6202B in the command number determination unit 6202, a bypass arithmetic determination unit 6211B in the bypass arithmetic determination unit 6211, the second reordering arithmetic unit 6222, and the second bypass arithmetic unit 6232. The storage unit 6201B stores commands corresponding to the actuator AC2, which are received from the host 100 and the like, in the queue corresponding to the actuator AC2. The command number determination unit 6202B determines the level of the queue command number corresponding to the actuator AC2 in accordance with the queue command number corresponding to the actuator AC2. Incidentally, the command controller 620B may comprise the storage unit 6201B, the command number determination unit 6202B, the first reordering arithmetic unit 6221, the first bypass arithmetic unit 6231, the second reordering arithmetic unit 6222, and the second bypass arithmetic unit 6232.

The controller communication unit 150 controls transfer of the information between the system controllers 130, for example, the system controller 130A and the system controller 130B. The controller communication unit 150 comprises the communication unit 6212. Incidentally, the system controller 130 may comprise the R/W channel 40A and the R/W channel 40B, the MPUs 50A and 50B, the HDCs 60A and 60B, and the controller communication unit 150.

According to modified example 1, the magnetic disk device 1 comprises a plurality of actuators AC, a plurality of driver ICs 20 corresponding to the respective actuators, a plurality of head amplifier ICs 30 corresponding to the respective actuators, a plurality of system controllers 130 corresponding to the respective actuators AC, and the controller communication unit 150 which controls transfer of information among the plurality of system controllers, for example, reordering information and the like. The magnetic disk device 1 can increase the access cost calculation number within a particular time. For this reason, the magnetic disk device 1 can improve the access performance.

Modified Example 2

The magnetic disk device 1 according to modified example 2 is different from the magnetic disk devices 1 according to the above-described first embodiment and modified example 1 with respect to a feature that a plurality of actuators AC are provided at a plurality of bearings BR, respectively.

Figure 21:
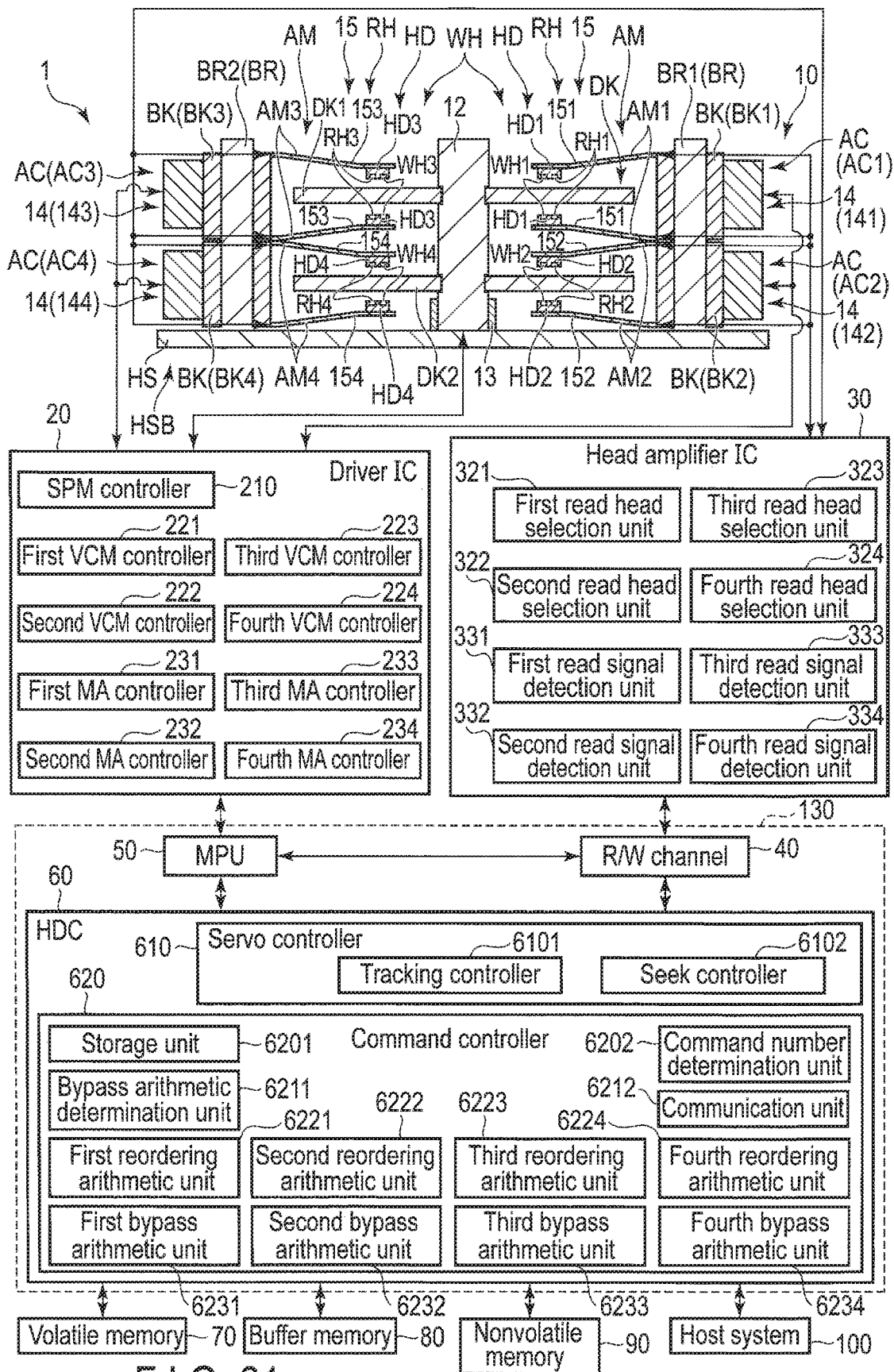
FIG. 21 is a schematic diagram showing an example of a configuration of the magnetic disk device of Modified Example 2.

FIG. 21 is a schematic diagram showing an example of a configuration of the magnetic disk device 1 according to modified example 2.

In the example shown in FIG. 21, the heads HD further include heads HD3 and HD4. For example, the heads HD1 and HD3 are provided symmetrically with the spindle 12 serving as the axis. The head HD3 comprises, for example, the head HD3 opposed to the main surface of the disk DK1 and the head HD3 opposed to an opposed surface of the disk DK1. Incidentally, the head HD3 may include only one head HD3 or three or more heads HD3. The head HD3 comprises a write head WH3 which writes data to the disk DK1 and a read head RH3 which reads data written to the disk DK1. The head HD4 comprises, for example, the head HD4 opposed to the main surface of the disk DK2 and the head HD4 opposed to an opposed surface of the disk DK2. Incidentally, the head HD4 may include only one head HD4 or three or more heads HD4. The head HD4 comprises a write head WH4 which writes data to the disk DK4 and a read head RH4 which reads data written to the disk DK4.

In the example shown in FIG. 21, the actuator blocks BK further include actuator blocks BK3 and BK4. The actuator blocks BK3 and BK4 are attached to be rotatable on a bearing BR2 provided upright on the bottom wall HSB. The actuator block BK4 is located between the bottom wall HSB and the actuator block BK3. The bearings BR1 and BR2 are provided upright at positions different from each other, on the bottom wall HSB. For example, the bearings BR1 and BR2 are provided symmetrically with the spindle 12 serving as the axis.

In the example shown in FIG. 21, the arms AM further include arms AM3 and AM4. For example, the arms AM1 and AM3 are provided symmetrically with the spindle 12 serving as the axis. The arm AM3 includes, for example, an arm AM3 located on the main surface side of the disk DK1, and an arm AM3 located on the opposite surface side of the disk DK1. Incidentally, the arm AM3 may include only one arm AM3 or three or more arms AM3 in accordance with the number of heads HD3. The arms AM3 are connected to the actuator block BK3. For example, the arms AM2 and AM4 are provided symmetrically with the spindle 12 serving as the axis. The arm AM3 includes, for example, an arm AM4 located on the main surface side of the disk DK2, and an arm AM4 located on the opposite surface side of the disk DK2. Incidentally, the arm AM4 may include only one arm AM4 or three or more arms AM4 in accordance with the number of heads HD4. The arms AM4 are connected to the actuator block BK4.

In the example shown in FIG. 21, the VCMs 14 further include VCMs 143 and 144. The VCM 143 is connected to the actuator block BK3 on the side opposite to the arm AM3. The VCM 144 is connected to the actuator block BK4 on the side opposite to the arm AM4.

In the example shown in FIG. 21, the MAs 15 further include MAs 153 and 154. The MAs 153 include, for example, the MA 153 attached to the arm AM3 located on the main surface side of the disk DK1 and equipped with the head HD3 opposed to the main surface of the disk DK1, and the MA 153 attached to the arm AM3 located on the opposite surface side of the disk DK1 and equipped with the head HD3 opposed to the opposed surface of the disk DK1. Incidentally, the MA 153 may include only one MA 153 or three or more MAs 153, in accordance with the number of heads HD3. The MAs 153 are attached to an end part of the arm AM3 connected to the actuator block BK3 and a distal part of the arm AM3 on the opposite side. The MAs 153 finely control operations of an end part connected to the arm AM3 and the arm AM2 on the opposite side. For example, the MAs 153 control the operations of the heads HD3 in the radial direction more finely than the operations of the heads HD3 in the radial direction made by the VCM 143. The MAs 154 include, for example, the MA 154 attached to the arm AM4 located on the main surface side of the disk DK2 and equipped with the head HD4 opposed to the main surface of the disk DK2, and the MA 154 attached to the arm AM4 located on the opposite surface side of the disk DK2 and equipped with the head HD4 opposed to the opposed surface of the disk DK2. Incidentally, the MA 154 may include only one MA 154 or three or more MAs 154 in accordance with the number of heads HD4. The MAs 154 are attached to an end part of the arm AM4 connected to the actuator block BK4 and a distal part of the arm AM4 on the opposite side. The MAs 154 finely control operations of an end part connected to the arm AM4 and the arm AM4 on the opposite side. For example, the MAs 154 control the operations of the heads HD4 in the radial direction more finely than the operations of the heads HD4 in the radial direction made by the VCM 144.

In the example shown in FIG. 21, the actuators AC further include actuators AC3 and AC4. The actuator AC3 is attached to be rotatable on the bearing BR2. The actuator AC3 is composed of the MA 153, the arm AM3, the actuator block BK3, and the VCM 143. The actuator AC3 drives the VCM 143 around a rotary shaft of the bearing BR2 and finely drives the MA 153, such that the head HD3 mounted on the MA 153 is thereby positioned at a particular position of the disk DK1. When the actuator AC3 is not equipped with the MA 153, the actuator AC3 drives the VCM 143 around the bearing BR2, such that the head HD3 mounted on the arm AM3 is thereby positioned at a particular position of the disk DK1. The actuator AC4 is attached to be rotatable on the bearing BR2. The actuator AC4 is composed of the MA 154, the arm AM4, the actuator block BK4, and the VCM 144. The actuator AC4 drives the VCM 144 around the rotary shaft of the bearing BR2 and finely drives the MA 154, such that the head HD4 mounted on the MA 154 is thereby positioned at a particular position of the disk DK2. Incidentally, when the actuator AC4 is not equipped with the MA 154, the actuator AC4 drives the VCM 144 around the bearing BR2, such that the head HD4 mounted on the arm AM4 is thereby positioned at a particular position of the disk DK2.

The driver IC 20 controls driving the SPM 12 and the VCM 14 (VCMs 141, 142, 143, and 144) under control of the system controller 130 (more specifically, MPU 50 or HDC 60 to be explained later). The driver IC 20 is electrically connected to the SPM 13 and the VCM 14 (VCMs 141, 142, 143, and 144). The driver IC 20 further comprises a third VCM controller 223, a fourth VCM controller 224, a third micro-actuator (MA) controller 233, and a fourth micro-actuator (MA) controller 234. The third VCM controller 223 controls the drive of the VCM 143 by controlling the current (or voltage) supplied to the VCM 143. The fourth VCM controller 224 controls the drive of the VCM 144 by controlling the current (or voltage) supplied to the VCM 144. The third MA controller 233 controls the drive of the MA 153 by controlling the current (or voltage supplied to the MA 153. The fourth MA controller 234 controls the drive of the MA 154 by controlling the current (or voltage) supplied to the MA 154. Incidentally, parts of the structure of the driver IC 20 (for example, the third VCM controller 223, the fourth VCM controller 224, the third MA controller 233, and the fourth MA controller 234) may be provided in the system controller 130. In addition, when the MA 153 is not provided in the actuator AC3 and the MA 154 is not provided in the actuator AC4, the third MA controller 233 and the fourth MA controller 234 may not be provided.

The head amplifier IC 30 further comprises a third read head selection unit 323, a fourth read head selection unit 324, a third read signal detection unit 333, and a fourth read signal detection unit 334. The third read head selection unit 323 selects the read head RH3 which reads data from the disk DK3 at the actuator AC3. The fourth read head selection unit 324 selects the read head RH4 which reads data from the disk DK2 at the actuator AC4. The third read signal detection unit 333 detects the signal which is read from the disk DK3 by the read head RH3. The fourth read signal detection unit 334 detects the signal which is read from the disk DK2 by the read head RH4. Incidentally, parts of the structure of the head amplifier IV 30 for example, the third read head selection unit 323, the fourth read head selection unit 324, the third read signal detection unit 333, and the fourth read signal detection unit 334) may be provided in the system controller 130.

The command controller 620 comprises a third reordering arithmetic unit 6223 which executes a reordering arithmetic process of a plurality of queue commands corresponding to the actuator AC3, a fourth reordering arithmetic unit 6224 which executes a reordering arithmetic process of a plurality of queue commands corresponding to the actuator AC4, a third bypass arithmetic unit 6233 which executes a bypass arithmetic process with a surplus arithmetic resource corresponding to the actuator AC3, and a fourth bypass arithmetic unit 6234 which executes a bypass arithmetic process with a surplus arithmetic resource corresponding to the actuator AC4.

For example, when both the valid flag which validates the bypass arithmetic operation using the surplus arithmetic resource corresponding to the actuator AC3 or AC4, and the transferring direction flag which transfers the reordering information corresponding to the actuator AC1 to the third bypass arithmetic unit 6233 or the fourth bypass arithmetic unit 6234 are input, the first reordering arithmetic unit 6221 transfers the reordering information corresponding to the actuator AC1 to the third bypass arithmetic unit 6233 or the fourth bypass arithmetic unit 6234 via the communication unit 6212.

For example, when both the valid flag which validates the bypass arithmetic operation using the surplus arithmetic resource corresponding to the actuator AC3 or AC4, and the transferring direction flag which transfers the reordering information corresponding to the actuator AC2 to the third bypass arithmetic unit 6233 or the fourth bypass arithmetic unit 6234 are input, the second reordering arithmetic unit 6222 transfers the reordering information corresponding to the actuator AC1 to the third bypass arithmetic unit 6233 or the fourth bypass arithmetic unit 6234 via the communication unit 6212.

For example, when both the valid flag which validates the bypass arithmetic operation using the surplus arithmetic resource corresponding to the actuator AC1, AC2, AC3 or AC4, and the transferring direction flag which transfers the reordering information corresponding to the actuator AC3 to the first bypass arithmetic unit 6231, the second bypass arithmetic unit 6232, or the fourth bypass arithmetic unit 6234 are input, the third reordering arithmetic unit 6223 transfers the reordering information corresponding to the actuator AC3 to the first bypass arithmetic unit 6231, the second bypass arithmetic unit 6232, or the fourth bypass arithmetic unit 6234 via the communication unit 6212.

For example, when both the valid flag which validates the bypass arithmetic operation using the surplus arithmetic resource corresponding to the actuator AC1, AC2, or AC3, and the transferring direction flag which transfers the reordering information corresponding to the actuator AC4 to the first bypass arithmetic unit 6231, the second bypass arithmetic unit 6232, or the third bypass arithmetic unit 6233 are input, the fourth reordering arithmetic unit 6224 transfers the reordering information corresponding to the actuator AC4 to the first bypass arithmetic unit 6231, the second bypass arithmetic unit 6232, the third bypass arithmetic unit 6233, or the fourth bypass arithmetic unit 6234 via the communication unit 6212.

For example, based on the reordering information corresponding to the actuator AC3 or AC4, which is transferred from the third reordering arithmetic unit 6223 or the fourth reordering arithmetic unit 6224, by the surplus arithmetic resource corresponding to the actuator AC1, the first bypass arithmetic unit 623 executes the bypass arithmetic process of calculating each of the plurality of access costs of the plurality of queue commands corresponding to the actuator AC3 or AC4, and transfers the arithmetic results of the bypass arithmetic process to the third reordering arithmetic unit 6223 or the fourth reordering arithmetic unit 6224 via the communication unit 6212.

For example, based on the reordering information corresponding to the actuator AC3 or AC4, which is transferred from the third reordering arithmetic unit 6223 or the fourth reordering arithmetic unit 6224, by the surplus arithmetic resource corresponding to the actuator AC2, the second bypass arithmetic unit 6232 executes the bypass arithmetic process of calculating each of the plurality of access costs of the plurality of queue commands corresponding to the actuator AC3 or AC4, and transfers the arithmetic results of the bypass arithmetic process to the third reordering arithmetic unit 6223 or the fourth reordering arithmetic unit 6224 via the communication unit 6212.

For example, based on the reordering information corresponding to the actuator AC1, AC2, or AC4, which is transferred from the first reordering arithmetic unit 6221, the second reordering arithmetic unit 6222, or the fourth reordering arithmetic unit 6224, by the surplus arithmetic resource corresponding to the actuator AC3, the third bypass arithmetic unit 6233 executes the bypass arithmetic process of calculating each of the plurality of access costs of the plurality of queue commands corresponding to the actuator AC1 AC2, or AC4, and transfers the arithmetic results of the bypass arithmetic process to the first reordering arithmetic unit 6221, the second reordering arithmetic unit 6222, or the fourth reordering arithmetic unit 6224 via the communication unit 6212. Incidentally, the third bypass arithmetic unit 6233 may be included in the third reordering arithmetic unit 6223.

For example, based on the reordering information corresponding to the actuator AC1, AC2, or AC3, which is transferred from the first reordering arithmetic unit 6221, the second reordering arithmetic unit 6222, or the third reordering arithmetic unit 6223, by the surplus arithmetic resource corresponding to the actuator AC4, the fourth bypass arithmetic unit 6234 executes the bypass arithmetic process of calculating each of the plurality of access costs of the plurality of queue commands corresponding to the actuator AC1, AC2, or AC3, and transfers the arithmetic results of the bypass arithmetic process to the first reordering arithmetic unit 6221, the second reordering arithmetic unit 6222, or the third reordering arithmetic unit 6223 via the communication unit 6212. Incidentally, the fourth bypass arithmetic unit 6234 may be included in the fourth reordering arithmetic unit 6224.

According to modified example 2, the magnetic disk device 1 further comprises the actuators AC3 and AC4 attached to be rotatable on the bearing BR2 provided symmetrically with the bearing BR1 with the spindle 12 serving as an axis, the third reordering arithmetic unit 6223 which executes a reordering arithmetic process of a plurality of queue commands corresponding to the actuator AC3, the fourth reordering arithmetic unit 6224 which executes a reordering arithmetic process of a plurality of queue commands corresponding to the actuator AC4, the third bypass arithmetic unit 6233 which executes a bypass arithmetic process with a surplus arithmetic resource corresponding to the actuator AC3, and the fourth bypass arithmetic unit 6234 which executes a bypass arithmetic process with a surplus arithmetic resource corresponding to the actuator AC4. The magnetic disk device 1 can increase the access cost calculation number within a particular time. For this reason, the magnetic disk device 1 can improve the access performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
the first arithmetic unit executes the second reordering process when a command number stored in the first queue is smaller than or equal to a first lower limit and a command number stored in the second queue is larger than or equal to a first upper limit, and
the second arithmetic unit executes the first reordering process when the command number stored in the second queue is smaller than or equal to a second lower limit and the command number stored in the first queue is larger than or equal to a second upper limit.

2. The magnetic disk device of claim 1, wherein
the first arithmetic unit transfers first information for the first reordering process to the second arithmetic unit when the command number stored in the second queue is smaller than or equal to the second lower limit and the command number stored in the first queue is larger than or equal to the second upper limit, and
the second arithmetic unit transfers second information for the second reordering process to the first arithmetic unit when the command number stored in the first queue is smaller than or equal to the first lower limit and the command number stored in the second queue is larger than or equal to the first upper limit.

3. The magnetic disk device of claim 2, wherein
the first information includes information on a position of a data sector of the first disk on which the first head is arranged, and information on positions of a plurality of data sectors of the first disk, which are specified by a plurality of commands stored in the first queue, respectively, and
the second information includes information on a position of a data sector of the second disk on which the second head is arranged, and information of positions of a plurality of data sectors of the second disk, which are specified by a plurality of commands stored in the second queue, respectively.

4. The magnetic disk device of claim 1, wherein
the first lower limit is smaller than the first upper limit, and the second lower limit is smaller than the second upper limit.

5. The magnetic disk device of claim 1, wherein
the command numbers stored in the first queue and the second queue are larger than or equal to zero.

6. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
based on a plurality of commands stored in the second queue, the first arithmetic unit calculates a plurality of first access costs equivalent to times to arrange the second head from positions of a plurality of data sectors that correspond to the plurality of commands stored in the second queue, respectively, to positions of a plurality of different data sectors that correspond to a plurality of different commands, respectively, of the plurality of commands stored in the second queue, and transfers the plurality of first access costs to the second arithmetic unit, and
the second arithmetic unit stores the plurality of commands in the second queue, calculates each of a plurality of second access costs equivalent to times to arrange the second head from a current position of a data sector of the second head to positions of a plurality of data sectors stored in the second queue, and selects a command to be next processed, based on the plurality of first access costs and the plurality of second access costs.

7. The magnetic disk device of claim 6, wherein
the positions of the data sectors are represented by a combination of at least two of a cylinder number, a head number, a sector number, a position of the first disk or the second disk in a radial direction, and an angle of the first disk or the second disk.

8. The magnetic disk device of claim 6, wherein
the first access costs include a plurality of seek times and a plurality of rotation await times to arrange the second head from positions of a plurality of data sectors that correspond to the plurality of commands stored in the second queue, respectively, to positions of a plurality of different data sectors that correspond to a plurality of different commands, respectively, of the plurality of commands stored in the second queue, and
the second access costs include a plurality of seek times and a plurality of rotation await times to arrange the second head from the current position of the data sector of the second head to positions of the plurality of data sectors that correspond to the plurality of commands stored in the second queue, respectively.

9. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
based on a first command and a second command stored in the second queue, the first arithmetic unit calculates a first access cost equivalent to a time to arrange the second head from a position of a first data sector specified by the first command to a position of a second data sector specified by the second command, and transfers the first access cost and the second access cost to the second arithmetic unit, and
the second arithmetic unit stores the first command and the second command in the second queue, calculates a third access cost equivalent to a time to arrange the second head from a position of a fourth data sector to the position of the first data sector, and a fourth access cost equivalent to a time to arrange the second head from the position of the fourth data sector to the position of the second data sector, calculates a fifth access cost obtained by adding the first access cost and the third access cost and a sixth access cost obtained by adding the second access cost and the fourth access cost, and subsequently processes a command corresponding to a smallest access cost, of the fifth access cost and the sixth access cost.

10. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
based on a first command and a second command stored in the second queue, the first arithmetic unit calculates a first access cost equivalent to a time to arrange the second head from a position of a first data sector specified by the first command to a position of a second data sector specified by the second command, and transfers the first access cost and the second access cost to the second arithmetic unit, and
the second arithmetic unit stores the first command and the second command in the second queue, calculates a third access cost equivalent to a time to arrange the second head from a position of a fourth data sector to the position of the first data sector, and a fourth access cost equivalent to a time to arrange the second head from the position of the fourth data sector to the position of the second data sector, calculates a fifth access cost obtained by weighting and adding the first access cost and the third access cost and a sixth access cost obtained by weighting and adding the second access cost and the fourth access cost, and subsequently processes a command corresponding to a smallest access cost, of the fifth access cost and the sixth access cost.

11. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
based on a plurality of commands stored in the second queue, the first arithmetic unit calculates at least one first access cost equivalent to a time to arrange the second head from a current position of the data sector of the second head to a position of at least one data sector that corresponds to at least one command, of the plurality of commands stored in the second queue, and transfers the first access cost to the second arithmetic unit, and the second arithmetic unit stores a plurality of commands in the second queue, calculates at least one second access cost equivalent to a time to arrange the second head from the current position of the data sector of the second head to a position of at least one different data sector that corresponds to at least one different command other than at least one command processed by the first arithmetic unit, of the plurality of commands stored in the second queue, and selects a command to be next processed, based on the first access cost and the second access cost.

12. The magnetic disk device of claim 11, wherein the positions of the data sectors are represented by a combination of at least two of a cylinder number, a head number, a sector number, a position of the first disk or the second disk in a radial direction, and an angle of the first disk or the second disk.

13. The magnetic disk device of claim 11, wherein the first access cost includes a seek time and a rotation await time to arrange the second head from a current position of a data sector of the second head to a position of at least one data sector that corresponds to at least one command, of a plurality of commands stored in the second queue, and the second access cost includes a seek time and a rotation await time to arrange the second head from the current position of the data sector of the second head to a position of at least one different data sector that corresponds to at least one different command other than at least one command processed by the first arithmetic unit, of the plurality of commands stored in the second queue.

14. A magnetic disk device, comprising:
a first disk;
a second disk;
a first head writing data to the first disk and reading data from the first disk;
a second head writing data to the second disk and reading data from the second disk;
a first actuator comprising the first head;
a second actuator comprising the second head;
a first arithmetic unit executing a first reordering process of a command stored in a first queue corresponding to the first actuator; and
a second arithmetic unit executing a second reordering process of a command stored in a second queue corresponding to the second actuator,
the first arithmetic unit executing the second reordering process,
the second arithmetic unit executing the first reordering process, wherein
based on a first command and a second command stored in the second queue, the first arithmetic unit calculates a first access cost equivalent to a time to arrange the second head from a position of a first data sector to a position of a second data sector specified by the first command, and transfers the first access cost to the second arithmetic unit, and the second arithmetic unit stores the first command and the second command in the second queue, calculates a second access cost equivalent to a time to arrange the second head from a position of the first data sector to a position of a third data sector specified by the second command, and subsequently processes a command corresponding to a smallest access cost of the first access cost and the second access cost.

15. A method of a reordering process applied to a magnetic disk device, the magnetic disk device comprising:
a first disk;
a second disk;
a first head writing data to the first disk and reading data from the first disk;
a second head writing data to the second disk and reading data from the second disk;
a first actuator comprising a first head;
a second actuator comprising a second head;
a first arithmetic unit executing a first reordering process of a command stored in a first queue corresponding to the first actuator; and
a second arithmetic unit executing a second reordering process of a command stored in a second queue corresponding to the second actuator, the method comprising:
executing the second reordering process by the first arithmetic unit; and
executing the first reordering process by the second arithmetic unit, further comprising:
executing the second reordering process by the first arithmetic unit when the command number stored in the first queue is smaller than or equal to a first lower limit and the command number stored in the second queue is larger than or equal to a first upper limit, and
executing the first reordering process by the second arithmetic int when the command number stored in the second queue is smaller than or equal to a second lower limit and the command number stored in the first queue is larger than or equal to a second upper limit.

16. The method of claim 15, further comprising:
transferring first information for the first reordering process from the first arithmetic unit to the second arithmetic unit when the command number stored in the second queue is smaller than or equal to the second lower limit and the command number stored in the first queue is larger than or equal to the second upper limit, and
transferring second information for the second reordering process from the second arithmetic unit to the first arithmetic unit when the command number stored in the first queue is smaller than or equal to the first lower limit and the command number stored in the second queue is larger than or equal to the first upper limit.

* * * * *